(12) United States Patent
Watanabe et al.

(10) Patent No.: US 6,723,469 B1
(45) Date of Patent: Apr. 20, 2004

(54) ALKALINE BATTERY WITHOUT MERCURY AND ELECTRONIC APPARATUS POWERED THEREBY

(75) Inventors: Shunji Watanabe, Tokyo (JP); Tsugio Sakai, Sendai (JP); Hideo Sakamoto, Sendai (JP)

(73) Assignee: Siixmicro Parts Ltd., Miyagi (JP)

(*) Notice: Subject to any disclaimer, the term of this patent is extended or adjusted under 35 U.S.C. 154(b) by 0 days.

(21) Appl. No.: 08/593,266

(22) Filed: Jan. 29, 1996

Related U.S. Application Data

(63) Continuation of application No. 08/101,716, filed on Aug. 3, 1993.

(30) Foreign Application Priority Data

| Aug. 4, 1992 | (JP) | 4-207925 |
| Aug. 4, 1992 | (JP) | 4-207926 |
| Aug. 4, 1992 | (JP) | 4-207927 |
| Aug. 5, 1992 | (JP) | 4-209008 |
| Sep. 7, 1992 | (JP) | 4-238263 |
| Sep. 7, 1992 | (JP) | 4-238264 |
| Jan. 26, 1993 | (JP) | 5-011210 |
| Jan. 28, 1993 | (JP) | 5-012956 |
| Apr. 19, 1993 | (JP) | 5-091684 |
| Jun. 30, 1993 | (JP) | 5-162964 |
| Nov. 20, 1993 | (JP) | 4-311707 |

(51) Int. Cl.$^7$ .............................................. H01M 4/42
(52) U.S. Cl. ................... 429/231; 429/229; 429/206
(58) Field of Search ........................ 429/229, 207, 429/206, 231

(56) References Cited

U.S. PATENT DOCUMENTS

| 3,642,539 A | * 2/1972 | Kawakami | 429/207 |
| 3,653,965 A | * 4/1972 | Lee | 429/206 X |
| 4,376,810 A | * 3/1983 | Takeda et al. | 429/229 |
| 4,563,403 A | * 1/1986 | Julian | 429/207 X |
| 4,812,374 A | * 3/1989 | Kagawa et al. | 429/229 |
| 5,139,900 A | * 8/1992 | Tada et al. | 429/229 |
| 5,168,018 A | * 12/1992 | Yoshizawa et al. | 429/206 |
| 5,348,816 A | * 9/1994 | Shinoda et al. | 429/229 |

FOREIGN PATENT DOCUMENTS

| DE | 1086309 | | 8/1960 | |
| EP | 457354 | | 11/1991 | |
| EP | 474382 | | 3/1992 | |
| FR | 2567327 | | 1/1986 | |
| FR | 2634594 | | 1/1990 | |
| GB | 2020478 | | 11/1979 | |
| JP | 48-27099 | * | 8/1973 | 429/207 |
| JP | 51-32363 | * | 9/1976 | 429/229 |
| JP | 53-25833 | * | 3/1978 | 429/229 |
| JP | 60-236462 | * | 11/1985 | 429/229 |

OTHER PUBLICATIONS

Patent Abstracts of Japan, vol. 5, No. 192 (E–085) Dec. 8, 1981.

Patent Abstracts of Japan, vol. 18, No. 221 (E–1540) Apr. 20, 1994.

J. Electroanal. Chem., vol. 180, No. 1–2, 1984, Lausanne, Netherlands, pp. 495–510, L. Binder et al., "Corrosion of Zinc Electrode Mixtures in Alkaline Media".

* cited by examiner

*Primary Examiner*—Carol Chaney
(74) *Attorney, Agent, or Firm*—Adams & Wilks

(57) ABSTRACT

An alkaline battery comprises a negative electrode having an active material comprised of mercuryless zinc powder, and an electrolyte. In one embodiment, the electrolyte contains one or more indium compounds selected from the group consisting of indium sulfate, indium sulfamate and indium chloride. In another embodiment, the negative electrode contains one or more indium compounds selected from the group consisting of indium sulfate, indium sulfamate and indium chloride. An improved alkaline battery is achieved which does not pose environmental problems, in which corrosion of the zinc powder by the electrolyte during storage of the battery is suppressed, and in which a good discharge performance of the battery is maintained.

22 Claims, 19 Drawing Sheets

ALKALINE BATTERY WITHOUT MERCURY AND ELECTRONIC APPARATUS POWERED THEREBY

This is a continuation application of parent application Ser. No. 08/101,716 filed Aug. 3, 1993.

BACKGROUND OF THE INVENTION

The present invention relates to an alkaline battery which uses mercuryless zinc powder as a negative electrode active material, and uses silver oxide, manganese dioxide, oxygen or the like as a positive electrode active material, and a clock or watch which uses the alkaline battery.

Conventional alkaline batteries suffer from the drawbacks in that zinc powder used in the alkaline battery is corroded and dissolved by an alkaline electrolyte solution, and in that the generation of hydrogen gas and the self-discharge in battery performance accompanying therewith are large. In addition, a battery is formed by a collector such as copper or the like which contacts with zinc, and hydrogen gas has been also generated therefrom. In the prior art, as a countermeasure to prevent the above, zinc is mercurated with mercury having a high hydrogen overvoltage, or zinc oxide is added to an electrolyte solution up to approximate saturation.

However, environmental pollution due to mercury from used dry batteries has become a problem in recent years, and various studies for reducing mercury have been performed. Among processes undertaken during the studies are the formation zinc alloys, plating of a collector, and addition of an organic or inorganic inhibitor to an electrolyte solution.

The formation of zinc alloys has been performed for a fairly long time, and metals such as bismuth, indium, lead and the like have been investigated. Many patent applications pertaining to this process have been also filed, for example, Japanese Patent Publication No. 25-27822 (1950), Japanese Patent Publication No. 33-3204 (1958), Japanese Patent Publication No. 63-3942 (1988), and Japanese Patent Application Laid-Open No. 1-10861 (1989).

As the inorganic inhibitor, indium oxide and indium hydroxide as the indium compound have been frequently studied, and many patent applications have been also filed, including for example, Japanese Patent Publication No. 51-36450 (1976), Japanese Patent Application Laid-Open No. 49-93831 (1974), Japanese Patent Application Laid-Open No. 49-112125 (1974), Japanese Patent Application Laid-Open No. 59-186255, Japanese Patent Application Laid-Open No. 59-186256 (1984), and Japanese Patent Application Laid-open No. 4-26061 (1992). The use of a compound of alkaline earth metal as the inorganic inhibitor is addressed in Japanese Patent Application Laid-Open No. 49-8727 (1974), Japanese Patent Application Laid-Open No. 49-93831 (1974), and Japanese Patent Application Laid-Open No. 49-121926 (1974). The use of organic inhibitors is addressed in Japanese Patent Application Laid-Open No. 2-86064 (1990), and Japanese Patent Application Laid-Open No. 3-29270 (1991).

On the other hand, with respect to the process of plating a collector, the surface has been coated with indium or tin having a high hydrogen overvoltage by means of a method of plating or the like, and the formation of a battery due to the contact with zinc is prevented so as to suppress the generation of hydrogen. Such process is addressed in Japanese Patent Application Laid-Open No. 52-74834 (1977), Japanese Patent Application Laid-Open No. 52-98929, Japanese Patent Application Laid-Open No. 60-221958 (1985), and Japanese Patent Publication No. 52-42211 (1977).

In the prior art, investigation has been made as to each individual technique as described above, however, because the strong anticorrosion agent mercury has been used, optimization by combination of the characteristics of each technique has not been frequently performed.

Mercury, which is added in order to prevent corrosion and dissolution of zinc, is not only expensive from a viewpoint of cost, but is also associated with the problem of environmental pollution. In addition, the addition of zinc oxide also includes such a task that the viscosity of the electrolyte is raised, and the conductivity is lowered.

Indium oxide and indium hydroxide as the inorganic inhibitor also includes many problems.

Indium oxide is extremely difficult to dissolve in the electrolyte solution which is a caustic alkali, and hydrogen gas is consequently generated due to the contact of indium oxide with zinc powder or the collector. This is considered to be due to the fact that the solubility of indium oxide is poor, it is impossible to supply indium ion of a degree to sufficiently coat the zinc surface and the collector surface, and indium oxide becomes conductive due to inevitable impurities during production contacts with zinc and the collector, resulting in formation of a local battery.

It is said that as compared with indium oxide, indium hydroxide to some extent dissolves in an electrolyte solution of caustic alkali, and its solubility relates to the size and crystallinity of particles. However, as compared with indium compounds such as indium sulfate, indium sulfamate, indium chloride and the like, it is extremely difficult to dissolve. Thus, the same problems are associated as with of indium oxide. In addition, indium as an amphoteric compound generates polyion together with hydroxide ion (those similar to the description in Inorganic Chemistry Series 7, Coordinate Stereochemistry, written by Yoichi NIIMURA, published by Baihukan Co. Ltd., 65–66), and increases the viscosity of the electrolyte solution, so that it lowers the conductivity of the electrolyte solution and deteriorates battery performance.

Considerable advantageous effects are appreciated in the use of the indium compound as the inhibitor which is easier to dissolve in the electrolyte solution as compared with the case in which the conventional scarcely soluble inhibitor is used. However, in order to further utilize the characteristic of the indium compound, it is necessary to also solve problems as follows.

The electrode potential of zinc is lower than the deposition potential of indium, so that when indium ion is present in the electrolyte, indium is deposited as metal on zinc and the collector contacting with zinc. However, hydrogen generation is accompanied as a competitive reaction in accordance with the deposition reaction of indium, and this has been the cause of deficiencies such as liquid leakage and expansion of the alkaline battery. In addition, there has been such a problem that indium ion which is not deposited precipitates as hydroxide and decreases the conductivity of the electrolyte solution.

Other than the indium compound, compounds of metals having a relatively high hydrogen overvoltage such as tin and lead are used as the inhibitor, however, there have been problems as follows.

Metal ion, which is supplied from the metal compounds of these metals to the electrolyte solution, is reduced on the surface of zinc and the collector, and deposited as metal. However, when the surface is coated with one species of metal, crystal grains become coarse, it is impossible to homogeneously coat the surface, and the effect is reduced. It is difficult to suppress the hydrogen generation and improve the discharge characteristic by means of a single metal. In addition, the compounds of indium and the like are expensive, so that the use of only one species becomes expensive from a viewpoint of cost.

With respect to the corrosion and dissolution of zinc, there is considered a case in which zinc itself is corroded by water and the hydroxyl group in the alkaline solution, and a case in which a local battery is formed by the contact with metals such as copper, brass and the like of the collector which are nobler than zinc resulting in dissolution. Thus, attempts have been frequently made to add a metal having a high hydrogen overvoltage to zinc to form an alloy so as to suppress corrosion and dissolution. It is known that the effect thereof is remarkably expressed especially when indium is added. When zinc is used in which indium is added in a relatively high concentration by, for example, not less than 400 ppm, a part of indium and zinc is once dissolved by the contact with copper and the like of the collector. It is considered that the corrosion and dissolution of zinc are suppressed by a mechanism that the dissolved indium ion is then deposited on the collector, and a film of indium is formed on the collector. However, there has been such a problem that the amount of indium ion to be reduced on the collector is extremely small in the initial state of the contact between zinc and the collector so that hydrogen is reduced and hydrogen gas is generated.

An attempt has been made to suppress the corrosion and dissolution of zinc and the collector using a compound of metal nobler than zinc as the inhibitor. However, in the case of conventional zinc in which there are impurities such as iron, it is necessary to use a large amount of the inhibitor, and it has been impossible to suppress the corrosion and dissolution of zinc unless, for example, large amount of lead monoxide, which is a non-pharmaceutical harmful substance and may cause environmental pollution, is used. Further, there has also been such a problem that when large amounts of lead monoxide and an indium compound are added, needle-like crystals are deposited which break through a separator to cause a short circuit.

In recent applications, mercurated zinc has been used in a coin or button type silver oxide battery which prevents hydrogen gas generation and self-discharge of the battery.

In recent years, efforts have been made to improve the additives used in zinc powder, the separators, the sealing agents, the gelling agents and the elimination of mercury for cylindrical alkaline batteries. However, in the case of a coin or button-type silver oxide battery in which there is no escape for the hydrogen gas due to the structure of the battery, there are problems such as the occurrence of expansion and liquid leakage due to gas pressure, self-discharge of the battery and achieving the elimination of mercury.

The foregoing describes problems associated with conventional inhibitors and the amount of water in the battery. Although improvements with conventional inhibitors has resulted in improvements in the characteristics of the alkaline battery, it has not been possible to achieve the effective removal of mercury. Further, improvements thereof will be described hereinafter.

When only a conventional inorganic inhibitor is used, such problems arise in that the inhibitor is not homogeneously distributed on the collector because of a fairly small amount of the electrolyte solution in an actual battery and no metal coating is given, and bubbles generate between a negative electrode combined agent and the collector.

The manufacture of the collector using a metal such as indium or tin, or plating the collector with these metals is fairly effective in solving the above described problems.

However, when tin is used, although it is possible to suppress the hydrogen gas generation as compared with a case in which a collector of copper is used, no effect of a degree equivalent to the case of the use of mercury has been obtained.

When indium is used, although the effect is certainly larger than that of tin, there has been such a problem that the raw material is expensive, thus increasing the manufacturing cost. In the case of indium plating, there have been such problems that the application process is poor, no homogeneous film is provided, impurities remain on the surface, and the effect is weakened.

In addition, when no inhibitor is used and the collector is only coated with a metal, there has been such a problem that a countermeasure is insufficient for preventing hydrogen gas formation.

Further, it has been impossible to ensure sufficient prevention self-discharge even when fluorocarbon/polyoxyethylene series, polyoxyethylene alkylamide and the like are used which are organic inhibitors considered to be effective in the prior art.

Namely, it has been found that there is such a problem that no sufficient effect is obtained using each of the corrosion preventing methods in the prior art. As a result of reconsideration of the role of each inhibitor, it has been found that better effects are obtained by using a collector coated with zinc or a metal having a hydrogen overvoltage higher than that of zinc, together with the use of various inhibitors.

When a higher battery capacity is desired, a decrease in the battery capacity due to the absence of mercury must be compensated. In the case of a cylindrical alkaline dry battery, it is desired to increase the quantity of zinc powder as the active material. However, there has been such a problem that in the case of the button-type or coin-type alkaline battery in which there is no room from a viewpoint of space, such accomplishment is almost impossible.

On the other hand, in a clock or watch which uses an alkaline battery containing mercury, the battery containing mercury is recovered at retail stores in the case of a battery exchange. However, there has been such a problem that when the main body of the clock or watch is discarded, the mercury which is also discarded contributes to environmental pollution. Particularly with the continuing decrease in price of clocks and watches, there is the possibility that the number of clocks or watches to be discarded due to the service life expiration of the batteries increases.

SUMMARY OF THE INVENTION

An object of the present invention is to provide an alkaline battery which does not contain mercury.

Another object of the present invention is to provide an alkaline battery comprising mercuryless zinc powder as a negative electrode active material.

Still another object of the present invention is to provide an apparatus using an alkaline battery which does not contain mercury.

A further object of the present invention is to provide an apparatus using an alkaline battery comprising mercuryless zinc powder as a negative electrode active material.

When an indium compound such as indium sulfate, indium sulfamate, indium chloride or the like is added as an inhibitor into an electrolyte solution or a negative electrode active material, so as to allow indium ion to exist in the electrolyte solution in an amount sufficient to coat zinc and the collector, indium can be immediately deposited on zinc and the negative electrode collector. By coating the zinc and the collector with indium having a high hydrogen overvoltage, it is possible to prevent corrosion and dissolution of the two.

Further, in order to effectively utilize these inhibitors, a complexing agent is added into the electrolyte solution beforehand, and indium ion which is generated by dissolution of the indium compound is subjected to complexing. Thus it is possible to prevent hydrogen gas formation during deposition of indium and the decrease in the conductivity of the electrolyte solution due to precipitation of indium which is not deposited as a hydroxide.

The problem caused by the use of the inhibitor of only one species of the compound of metal can be solved by adding two or more species of compounds selected from an indium compound, a tin compound containing tetravalent tin and lead oxide into the electrolyte solution or the negative electrode active material, and depositing metal contained in these compounds as an allow onto zinc and the negative electrode collector. Characteristics, which cannot be obtained by a single metal coating, are obtained by depositing the two or more species of metals. electrode active material, so as to allow indium ion to exist in the electrolyte solution in an amount sufficient to coat zinc and the collector, indium can be immediately deposited on zinc and the negative electrode collector. By coating zinc and the collector with indium having a high hydrogen overvoltage, it is possible to prevent corrosion and dissolution of them.

Further, in order to effectively utilize these inhibitors, a complexing agent is added into the electrolyte solution beforehand, and indium ion which is generated by dissolution of the indium compound is subjected to complexing, thereby it is possible to solve the tasks of the hydrogen gas formation during deposition of indium and the decrease in the conductivity of the electrolyte solution due to precipitation of not deposited indium as hydroxide.

The problem caused by the use of the inhibitor of only one species of the compound of metal can be solved by adding two or more species of compounds selected from an indium compound, a tin compound containing tetravalent tin and lead oxide into the electrolyte solution or the negative electrode active material, and depositing metal contained in these compounds as an alloy onto zinc and the negative electrode collector. Characteristics, which cannot be obtained by single metal coating, are obtained by depositing the two or more species of metals.

When zinc in which indium is added in a relatively high concentration is used, it is considered that the corrosion and dissolution of zinc or the collector are suppressed owing to a mechanism that indium ion dissolved from zinc is deposited on the collector, and a film of indium is formed on the collector. However, in the initial stage of the contact between zinc and the collector, the amount of indium ion to be reduced on the collector is extremely small. Thus, when the one or more species of the compounds selected from the indium compound which is nobler than zinc, the tin compound containing tetravalent tin and lead oxide are added as the inhibitor into the electrolyte solution or the negative electrode active material, and the metal ion is allowed to exist in the electrolyte solution in an amount sufficient to coat zinc and the collector, then it is possible to immediately deposit lead onto zinc and the negative electrode collector, and it is possible to suppress the generation of hydrogen. In this case, depending on the amount of indium in the zinc powder it is preferable that the adding amount of the inhibitor is about 10–1000 ppm with respect to the zinc powder. If the adding amount is small, it,is impossible to sufficiently coat zinc and the collector, while if the adding amount is too large, there is such a bad effect that needle-like crystals penetrate through a separator to cause a short circuit.

When mercuryless zinc powder in which the content of iron is not more than 4 ppm with respect to a weight of zinc is used, one or more species of compounds selected from an indium compound nobler than zinc, a tin compound containing tetravalent tin and lead oxide are added as the inhibitor into the electrolyte solution or the negative electrode active material, and ion is allowed to exist in the electrolyte solution in an amount sufficient to coat zinc and the collector, then it is possible to immediately deposit a coating film of metal which is nobler than zinc on zinc and the negative electrode collector, and it is possible to suppress the corrosion and dissolution of zinc and the hydrogen generation accompanying therewith. In this case, it is preferable that the adding amount of the inhibitor be about 10–1000 ppm with respect to the zinc powder. If the adding amount too small, it is impossible to sufficiently coat zinc and the collector, and there is such a bad effect that needle-like crystals penetrate through a separator to cause a short circuit.

Using mercuryless zinc containing at least one species of metals of gallium, indium, lead, bismuth, aluminum, calcium and the like which are said to have an effect of increasing the hydrogen overvoltage and an effect of adjusting the particle shape during manufacturing of particles as the negative electrode active material, in the case of an electrolyte solution of the potassium hydroxide type, the amount of water in the battery is 0.31–0.57 mg (or 0.31–0.57 $\mu$L at ordinary temperature) per a weight of 1 mg of mercuryless zinc, or in the case of an electrolyte solution of sodium hydroxide type, the amount of water in the battery is 0.32–0.59 mg (or 0.32–0.59 $\mu$L at ordinary temperature) per a weight of 1 mg of mercuryless zinc, thereby it is possible to produce a coin or button type silver oxide battery in which the gas generation amount is not more than 0.03 $\mu$L/g/day, and the self-discharge rate is not more than 4%/year.

Further, in order to approximate the performance of the battery containing mercury, it is necessary to combine and use various techniques.

Mercuryless zinc alloy powder added with metals of indium, lead, bismuth, calcium, aluminum and the like and a gelling agent for holding moisture in the battery are used as a negative electrode combined agent, a collector having the outermost layer which is coated with zinc or metal having a hydrogen overvoltage higher than that of zinc is used, and an inhibitor selected from an indium compound, lead oxide, hydroxide of alkaline earth metal, and a surfactant having polyoxyethylene group is added into the electrolyte solution or the negative electrode active material, thereby it is possible to obtain a battery in which the hydrogen gas generation is less, and the electric characteristics are good.

Especially, with respect to the coating of the collector, an alloy layer containing zinc as an essential element and containing one or more species selected from indium, lead and tin as a selective element is provided, thereby it is possible to provide an alkaline battery which is advantageous from a viewpoint of cost and in which the hydrogen gas generation can be suppressed.

Further, there are such problems due to the elimination of mercury that the self-discharge increases and the capacity decreases. However, since the zinc alloy layer of the collector is made thick to some extent, it is possible to increase the capacity of the battery without significantly changing the spacing in a battery casing.

Indium compounds such as indium sulfate, indium sulfamate, indium chloride and the like dissolve in a concentrated caustic alkali solution, which forms alkaline complex ion capable of cathode reduction referred to in the plating.

The alkaline complex ion of indium is subjected to zinc surface reduction representing a potential lower than a reduction potential of itself, and indium is immediately deposited as metal. In addition, the collector comprised of a material such as copper or the like contacts with zinc, so that the same potential as that of zinc is obtained, and indium is deposited in the same manner. When the surfaces of zinc and the collector are initially coated with indium, all of the surfaces achieve the same potential of indium, and the electrochemical driving force is lost, so that further deposition of indium is ceased. However, when the zinc surface is newly exposed by discharge, indium which exists as the alkaline complex ion is immediately reduced and deposited.

The inhibitor of the indium compound functions more effectively by adding the complexing agent. This is due to the fact that the alkaline complex ion of indium and hydrated indium ion are unstable, so that they precipitate with no complexing agent to be insoluble in the electrolyte solution, or even if they are dissolved, they precipitate as hydroxide due to minute environmental changes, or they are apt to change into a viscous solution such as polyion (those similar to the description in Inorganic Chemistry Series 7, Coordinate Stereochemistry, written by Yoichi NIIMURA, published by Baihukan Co. Ltd., 65–66). In addition, the alkaline complex ion of indium and the hydrated indium ion are unstable and have low deposition potentials, but they have wide ranges of the potential, and the hydrogen gas generation is also induced during the deposition. Thus, when the complexing is performed with tartarate or EDTA, a stable complex ion is provided; it is possible to narrow the range of the deposition potential of indium, it is possible to separate from the deposition potential of hydrogen, and it is possible to deposit only indium without the accompanying generation of hydrogen.

Other than indium, tin and lead also have smaller ionization tendencies than zinc, so that when ions of these metals are allowed to exist in the electrolyte solution, it is possible to deposit these metals on the zinc surface. In addition, because the collector contacts with zinc, the same potential as that of zinc is obtained, and the above-mentioned metal is deposited. The function for further suppression of the corrosion and dissolution by mixing the indium compound, the tin compound containing tetravalent tin, lead oxide and the like is not certain, however, the following facts can be considered.

One is the fact that alloy formation may take place when these metals are deposited on zinc and the collector. During the alloy formation, fine crystals of the deposited metal are produced, and the surfaces of zinc and the collector are coated with homogeneous films having no deficiency. For example, in the case of an alloy of indium-tin, fine crystals are produced when a composition near the eutectic point of about 50:50 in an atomic % is aimed. In the case of an alloy of the three component system, crystals become more complicated, and coarse formation of crystal grains is prevented, so that it becomes easy to obtain a homogeneous film.

The other is the fact that characteristics possessed by each of the metals can be simultaneously utilized by mixing. Particularly in the case of lead, if it is used alone needle-like crystals are deposited and it becomes impossible to homogeneously coat the surfaces of zinc and the collector. However, during assembly of the battery, when the electrolyte solution containing tetravalent tin is first added and subsequently the electrolyte solution containing lead oxide is added, the zinc and the collector are coated with indium and tin which form relatively homogeneous films and then are coated with a film having needle-like crystals of lead. The homogeneous films of indium and tin suppress the corrosion and dissolution of zinc or the collector, and the film of lead having needle-like crystals strengthens the electrical contact between the zinc and the collector, and enhances shock resistance and discharge characteristics.

In the case of a negative electrode active material such as pure zinc and the like in which the hydrogen generation is large, it is difficult to form a homogeneous film due to the hydrogen generation which occurs as a competitive reaction with respect to the deposition of metal on the surface, and the effect of deposited metal becomes less. Thus, using a negative electrode active material in which zinc is added with indium, bismuth, lead, aluminum, calcium, gallium and the like, effectively suppresses the generation of hydrogen to some extent.

Attempts have been made to add zinc with a metal having a high hydrogen overvoltage to form an alloy so as to suppress corrosion and dissolution. It is known that the effect thereof is remarkably expressed especially when indium is added. When zinc is used in which indium is added in a relatively high concentration, for example, not less than 400 ppm, a part of indium and zinc is once dissolved due to the contact with copper or the like of the collector. It is considered that the corrosion and dissolution of zinc is suppressed by a mechanism in which dissolved indium ion is deposited on the collector, and a film of indium is formed on the collector. However, in the initial stage of the contact between zinc and the collector, the amount of indium ion to be reduced on the collector is extremely small. Thus, when one or more species of the compounds selected from the indium compound which is nobler than zinc, the tin compound containing tetravalent tin and lead oxide are added as the inhibitor into the electrolyte solution or the negative electrode active material, and the metal ion is allowed to exist in the electrolyte solution in an amount sufficient to coat zinc and the collector, then it is possible to immediately deposit lead onto zinc and the negative electrode collector, and it is possible to suppress the hydrogen generation.

When iron is abundant in zinc, there are provided many places in which iron is exposed on the zinc surface. Zinc and iron on the surface form a local battery in the electrolyte solution, zinc dissolves, and hydrogen is generated from iron. At the place in which hydrogen is generated, the coating film by the inhibitor is difficult to be formed, and it is difficult to obtain the effect of the inhibitor.

When mercuryless zinc powder in which the content of iron is not more than 4 ppm with respect to a weight of zinc is used, one or more species of the compounds selected from the indium compound nobler than zinc, the tin compound containing tetravalent tin and lead oxide are added as the inhibitor into the electrolyte solution or the negative electrode active material, and the ion is allowed to exist in the electrolyte solution in an amount sufficient to coat zinc and the collector, then it is possible to immediately deposit the film of metal nobler than zinc onto zinc and the negative electrode active material, and it is possible to suppress the corrosion and dissolution of zinc and the hydrogen generation accompanying therewith.

It is preferable that the adding amount of the inhibitor be about 10–1000 ppm with respect to the zinc powder. If the adding amount is less, it is impossible to sufficiently coat zinc and the collector, and there is such a bad effect that needle-like crystals penetrate through the separator to cause a short circuit.

It is generally said that gallium, indium, lead and bismuth have high hydrogen overvoltages, and when they are added to zinc, the hydrogen gas generation is suppressed. It is said that aluminum and calcium smoothen the surface during the production of zinc powder by atomization, reduce the surface area of the zinc powder, and suppress the hydrogen gas generation in the same manner.

In addition, although the function is not certain, the electrolyte solution is made as much as permitted by liquid leakage, thereby it is possible to suppress the hydrogen gas generation and the self-discharge. Further, by increasing the electrolyte solution, it also becomes possible to increase the absolute amount of the inhibitor to be added in order to suppress the hydrogen gas generation and the self-discharge, and it is considered that the inhibitor effect is also increased.

In order to allow the mercuryless battery to approximate the performance of a battery in which mercurated zinc is contained, it is necessary that features of various techniques are understood, and that they are combined and used. Functions of individual techniques will be shown hereinafter.

Generally speaking, the addition of metals such as indium, lead, bismuth, calcium, aluminum and the like into zinc is to prevent the corrosion and dissolution and suppress the hydrogen gas generation. However, the role of each metal added varies. The metal having a high hydrogen overvoltage such as indium, lead and bismuth forms an alloy with zinc, increases the hydrogen overvoltage, and prevents the corrosion and dissolution. On the other hand, calcium and aluminum smoothen the alloy surface during manufacturing by atomization, which level potential distribution, and decrease the surface area of zinc particles, so that they are effective in the prevention of the corrosion and dissolution. In addition, when hydrogen is generated on the zinc surface by the corrosion and dissolution, no inhibitor is supplied there and no effect of the inhibitor can be also exhibited. Also in this meaning, the alloy formation of zinc by the addition of metals according to the present invention is important.

The cross-linked type polyacrylic water-absorbing polymer to be used as the gelling agent has a strong moisture holding property, which prevents the electrolyte solution from evaporation and unnecessary movement toward the separator and the positive electrode side. Thus, it is possible to allow the inhibitor to be distributed all over and suppress the increase in the internal resistance due to shortage of liquid at the last stage of discharge.

The reason why the layer of zinc or metal having a hydrogen overvoltage higher than that of zinc is formed at the outermost layer of the collector is to prevent the fact that the mercuryless zinc powder as the negative electrode active material contacts with copper of the collector to form a battery, and hydrogen gas is also generated from it.

In addition, when the layer of zinc or metal having a hydrogen overvoltage higher than that of zinc is formed after the press processing of a negative electrode casing containing the collector, it is possible to shield impurities such as iron and the like adhered to the collector side during the processing.

Especially, it is effective to provide the alloy layer containing zinc as the essential element and containing one or more species selected from indium, lead and tin as the selective element on the collector surface. This is due to the fact that the potential of the collector surface becomes substantially the same as that of the mercuryless zinc surface as the negative electrode active material. Thus, even when the collector contacts with the mercuryless zinc powder as the negative electrode active material, it is avoided that a local battery is formed and hydrogen gas is generated from it.

It is supposed that, even if only zinc is plated on the collector, the potential difference may disappear and an effect may be expected, however, zinc deposited by plating or the like is extremely active and easy to be corroded, so that little effect is provided for suppressing the hydrogen gas formation. Thus, it is necessary to plate an alloy in which indium and lead are added into zinc by not less than several 10 ppm. In the plating process, for the plating solution, several 10 to several 1000 ppm of the indium compound, lead compound and tin compound are added into general zinc plating solutions may be needed, and for the positive electrode, an alloy of zinc may be used. For example, indium sulfate may be added in the case of a plating solution of the zinc sulfate type, while indium cyanide may be added in the case of a plating solution of the cyanide type.

As the inhibitor, there are the inorganic type and the organic type. Among them, the inorganic inhibitor is roughly classified into two species. One is a compound of metal which is nobler than zinc and has a higher hydrogen overvoltage. For example, it is the above-mentioned indium compound such as indium sulfate, indium sulfamate, indium chloride, indium hydroxide or the like, and they are dissolved in a concentrated caustic alkaline solution, and form alkaline complex ion capable of cathode reduction referred to in the plating. The alkaline complexion of indium is reduced at the zinc surface representing a potential lower than the reduction potential of itself, and indium is immediately deposited as metal. When zinc is initially coated with indium, all of the surface becomes to have the potential of indium, and the electrochemical driving force is lost, so that further deposition of indium is ceased. However, when the zinc surface is newly exposed by discharge, indium which exists as the alkaline complex ion is immediately reduced and deposited. Thus, there are provided such effects that the hydrogen gas generation is less even when the discharge is stopped on the way to store, and the self-discharge rate is made small.

Due to the fact that a potential lower than the reduction potential of itself is indicated also on the collector such as copper or the like contacting with zinc, the alkaline complex ion of indium is reduced, and indium is immediately deposited as for metal. However, the amount of the electrolyte solution is fairly less in an actual battery, so that the inhibitor is not homogeneously distributed on the collector to provide no metal coating, and when there are bubbles between the negative electrode combined agent and the collector, such a place only where no metal coating is provided at all is made, and it has been impossible to exhibit a sufficient effect. Lead monoxide and the tetravalent tin compound are included in the inorganic inhibitor of this type.

The other inorganic inhibitor is oxide and hydroxide of metal baser than zinc or non-metal. Although the function is not certain, effects are provided in the suppression of the hydrogen gas generation and the improvement in electric characteristics, and as the representative one, there is barium hydroxide or the like which is hydroxide of alkaline earth metal. However, when a collector which having no layer of zinc or metal having a hydrogen overvoltage higher than that of zinc for t h e outermost layer is used, the hydrogen gas generation due to the contact between the collector and zinc is too large, and little effect thereof is expressed.

The surfactant of organic type suppresses the corrosion and dissolution of zinc because the hydrophilic group adheres to the zinc surface a nd the hydrophobic group suppresses the approach of water and hydroxyl group to the surface. The effect is similar to that of a hydroxide of alkaline metal, and it is desirable to combine and use with the collector having the layer of zinc or metal having a hydrogen overvoltage higher than that of zinc for the outermost layer.

In addition, although the function is not certain, when polyoxyethylene alkylamide, barium hydroxide and the like are combined and used, a remarkable hydrogen gas generation suppressing effect is obtained. However, organic surfactants have a possibility to be excessively adhered onto the surfaces of zinc and the collector and inhibit the reduction on the surface in the combination with the indium compound or lead monoxide, so that it is desirable that the adding amount is made as small as possible within a range which can provide the effect.

It has been found out that there are roles of each one such that the coating of zinc or metal having a hydrogen overvoltage higher than that of zinc onto the collector suppresses the hydrogen gas generation due to the contact between zinc and the collector, the indium compound and lead monoxide suppress the self-discharge after partial discharge, and the alkaline earth hydroxide improves electric characteristics, and the maximum effect is obtained when they are combined and used. Namely, when the alkaline battery is manufactured by using the collector having the layer of zinc or metal having a hydrogen overvoltage higher than that of zinc for the outermost layer, it is possible to obtain the one in which the self-discharge rate is small before use and after partial discharge, and the electric characteristic is good.

When the collector is coated with a zinc alloy, the zinc alloy becomes the negative electrode active material as it is, so that by thickening the zinc alloy layer on the collector surface, it is possible to make up a battery capacity reduced by elimination of mercury. For example, when a collector having a diameter of 6 mm is plated by 10 $\mu$m, the amount of the negative electrode active material increases by 2 mg because the specific gravity of zinc is 7.13. Provided that the amount of the negative electrode active material as zinc powder is 30 mg, it is possible to increase the capacity by about 6.7% without changing the space in the battery can so much. However, as compared with the powdery negative electrode active material, the surface area is small, so that no large current can be expected. However, it is most suitable for increasing the capacity of a batteries which perform minute discharge such as batteries for clocks and watches.

In addition, to thicken the zinc alloy plating is advantageous also in the processing of battery cans. Generally, the negative electrode can having the negative electrode collector is manufactured by punching a hoop material in many cases. In this case, if the zinc alloy has plated rather thickly beforehand at the side of hoop material for serving as the collector, the probability to expose metal such as for example copper as a base substrate during processing is reduced.

DETAILED DESCRIPTION OF THE PREFERRED EMBODIMENTS

Figure 1:
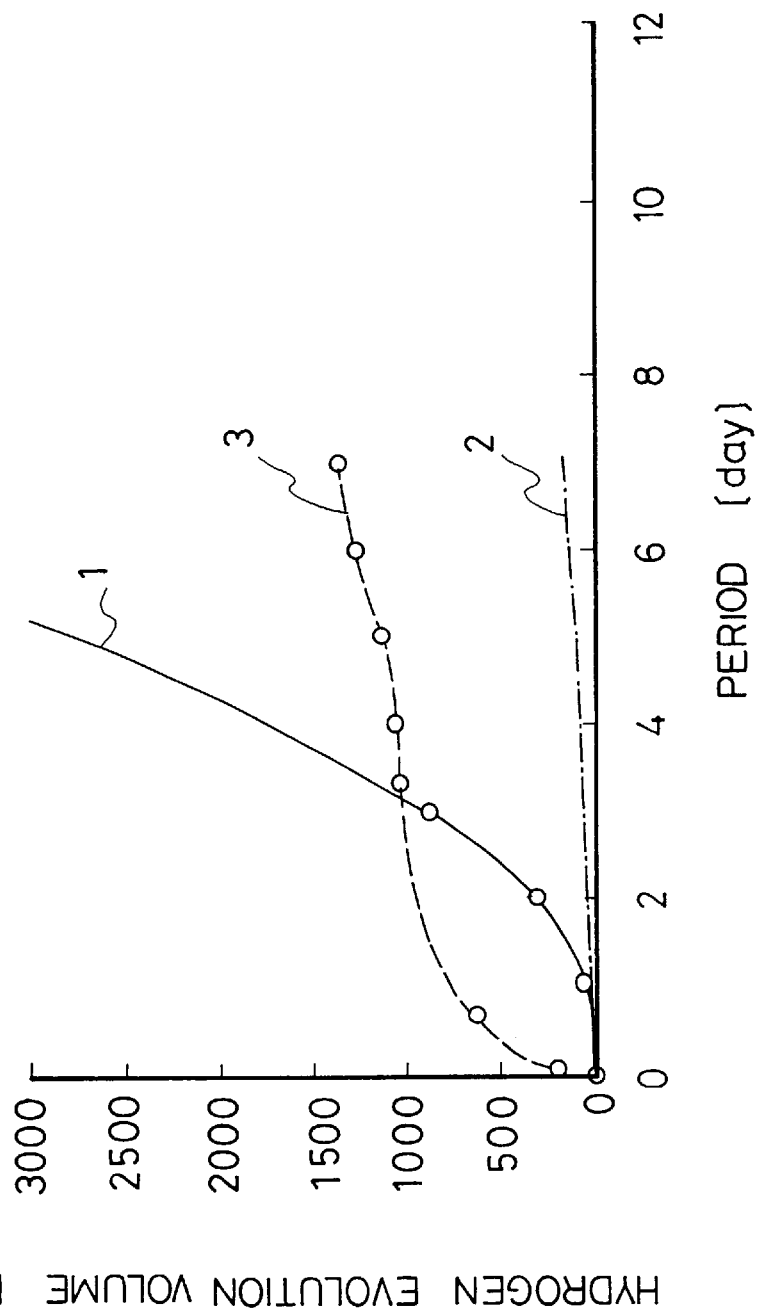
FIG. 1 shows the generated amount of hydrogen gas with respect to days passed.

The present invention will be explained hereinafter in accordance with Embodiments.

The effect of the case in which the indium compound of the present invention is used will be explained in accordance with the Embodiments 1–3, and the Comparative example 1.

Embodiment 1

Into a specially prepared test tube having a volume of 25 ml and graduated to know the gas generation amount were added beforehand 2 g of zinc powder containing 500 ppm of each of bismuth, indium and lead manufactured by the atomization method, and a copper piece as the same material as a collector having an area of 0.6 cm$^2$ and a thickness of 0.1 mm, an electrolyte solution to be tested was added thereto to heat to 60° C., and the volume of generated hydrogen gas was measured for 7 days. The number of test repeating was made to 10 times, and an average value thereof was used as a result. The electrolyte solution was prepared such that by making, a solution in which potassium hydroxide was 30% by weight and zinc oxide was added up to approximate saturation in the case of the potassium hydroxide type, or a solution in which sodium hydroxide was 25% by weight and zinc oxide was added up to approximate saturation in the case of the sodium hydroxide type, as a base, an indium compound was added thereto.

Indium sulfate made by Nihon Kagaku Sangyo Co., Ltd., indium sulfamate 35% solution also made by Nihon Kagaku Sangyo Co., Ltd., indium chloride made by Wako Pure Chemical Industries., Ltd., and indium cyanide made by Ito Pharmaceutical Co., Ltd. were used. The adding amount of the indium compound was 1000 ppm with respect to the electrolyte solution. Results are shown in the hydrogen generation amount in Table 1. The unit is $\mu L/g/day$.

COMPARATIVE EXAMPLE 1

With the same test as in Embodiment 1, the measurements were performed for one in which no indium compound of the present invention was added, and one in which indium oxide was added by 1000 ppm with respect to the electrolyte solution. Indium oxide made by Kanto Chemical Co., Ltd. was used. Results are shown in the hydrogen generation amount in table 1 in the same manner. The unit is $\mu L/g/day$.

TABLE 1

Hydrogen evolution volume and comparison of discharge capacity of experimental cell

| | Electrolyte | Indium compound 1000 ppm | Hydrogen evolution volume $\mu L/g/day$ | Comparison of discharge capacity |
|---|---|---|---|---|
| Examples of the invention | | | | |
| 1 | KOH | InSO$_4$ Indium sulfate | 24.29 | 102 |
| 2 | KOH | In (NH$_2$SO$_3$)$_3$ Indium Sulfamate | 30.51 | 102 |
| 3 | KOH | Indium chloride | 35.40 | 101 |
| 4 | KOH | Indium cyanide | 20.66 | 103 |
| 5 | NaOH | InSO$_4$ Indium sulfate | 18.11 | 102 |
| 6 | NaOH | In (NH$_2$SO$_3$)$_3$ Indium Sulfamate | 27.43 | 102 |
| 7 | NaOH | Indium chloride | 29.67 | 102 |
| 8 | NaOH | Indium cyanide | 14.21 | 103 |
| Examples for comparison | | | | |
| 9 | KOH | — | 516.63 | 100 |
| 10 | KOH | Indium oxide | 196.10 | 97 |
| 11 | NaOH | — | 420.36 | 100 |
| 12 | NaOH | Indium oxide | 150.88 | 97 |

FIG. 1, the hydrogen gas generation amount with respect to the number of test days of the samples using the electrolyte solution of the potassium hydroxide series, is show. It has been found that in the case of no addition of the indium compound shown in 1 in the figure, the hydrogen generation amount increases exponentially with respect to the number of test days. It is understood that in the case of addition of the indium sulfate in 2 in the figure which is the indium compound of the present invention, the generation of hydrogen gas is suppressed. In the case of addition of the indium oxide in 3 in the figure, the hydrogen gas generation in the former half is high. This is considered to be due to the fact that the solubility of indium oxide is bad, the supply of indium ion to the electrolyte solution is not sufficient, and a long time is required to coat the surfaces of zinc and copper.

In addition, it is considered that the reason why a bad result is given in the former half as compared with no addition is that indium oxide also contacts with zinc and the collector, and a local battery is formed. Indium cyanide presented a good result from a viewpoint of characteristics, however, it is desirable not to use it because there is the possibility of occurrence of a new environmental pollution problem.

Embodiment 2

Into a positive electrode can were added a part of an electrolyte solution and 116 mg of a pellet (silver oxide content of 98%) which was molded by adding a combined agent into silver oxide, and a separator of polyethylene and a separator of cellophane were set in place. Next, a gasket of nylon was pushed and fitted into the positive electrode can, an impregnating agent, a gelling agent, 30 mg of zinc powder, an inhibitor and the like were added, the remainder of the electrolyte solution was added dropwise, and then a negative electrode can was set in place to seal the battery and then 100 pieces for every kind of button type silver oxide batteries were manufactured. The same zinc as in Embodiment 1 and the electrolyte solution in Table 1 were used, and the battery size was that of the SR621 type.

However, the added amount of indium was 1000 ppm with respect to the amount of zinc. Results are shown in the discharge index in Table 1. Discharge characteristics were measured using a resistance of 200 Ω by means of the direct current method, when the electrolyte solution was of the potassium hydroxide series, or the pulse method, when the electrolyte solution was of the sodium hydroxide series. In any case, no addition of the inhibitor was regarded to have a discharge index of 100. As understood also from the results, it has been found that the indium compound of the present invention is effective also in the discharge characteristics.

Embodiment 3

Figure 2:
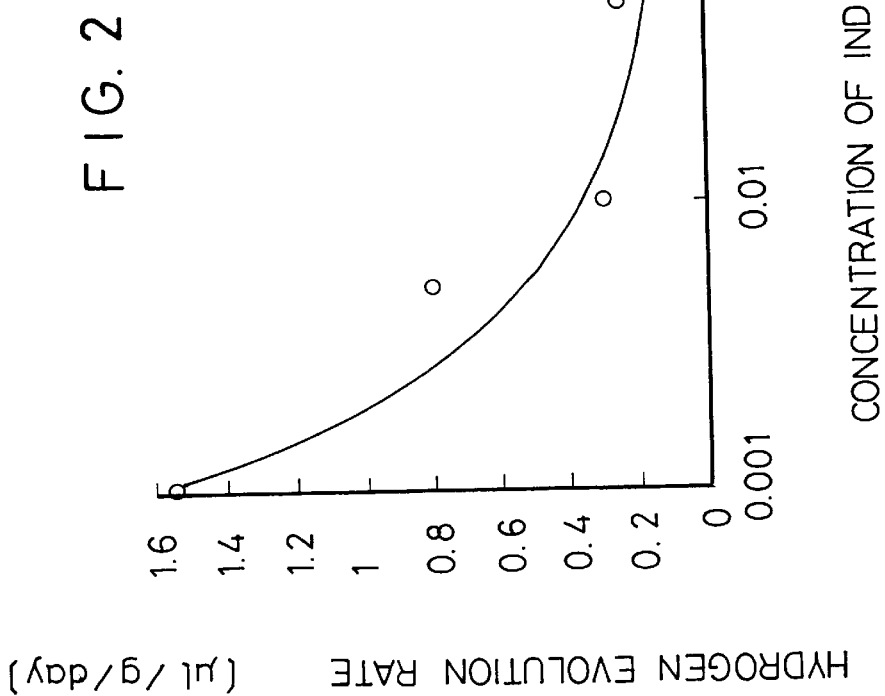
FIG. 2 shows the hydrogen gas generate d amount with respect to the indium sulfate concentration.

Using a gasket of polypropylene specially prepared for allowing hydrogen to penetrate in the same manner as described for Embodiment 2, a button type silver oxide battery was manufactured. Ten pieces of the manufactured silver oxide batteries were put into a vessel made of glass filled with liquid paraffin in a high temperature tank, a collecting tube having graduations at an upper portion was attached, and the amount of generated hydrogen gas was measured. This state was maintained at 60° C. for 20 days which which correspond to a term of about 1 year, and the hydrogen gas generation amount after 20 days was investigated. With respect to the inhibitor, the test was performed using indium sulfate at a concentration of 10 ppm to 5% with respect to the weight of zinc. Evaluation results are shown in FIG. 2. According to the figure, it is understood that the inhibitor effectively works at 100 ppm to 1%.

The gasket of polypropylene was returned to one made of nylon, and a button type silver oxide battery was manufactured in a range of an indium sulfate concentration of 100 ppm to 1% in which the gas generation was less. Ten pieces of the manufactured batteries were put into a vessel made of glass filled with liquid paraffin in a high temperature tank maintained at 25° C. in the same manner, and a collecting tube for generating hydrogen gas was attached to the upper portion. Hydrogen gas generation, expansion of the can and liquid leakage were not observed after 20 days at 60° C. For indium sulfate, it was effective in the concentration of 100 ppm to 1% with respect to zinc, however, the same effect was observed also in the case of other indium compounds by adjusting the mole number and determining the concentration range.

In the actual trial production of batteries, there is given a value smaller than the hydrogen gas generation amount in the experiment in Embodiment 1. In respect to this fact, it is considered that the copper piece used in Embodiment 1 is different from a structure of an actual collector, and a part of generated hydrogen gas has been consumed by the reduction of silver oxide and the like. The method in Embodiment 1 is different in the amount order of hydrogen gas generation, but it is sufficient as a method for observing substituted characteristics for predicting hydrogen generation in an actual battery.

In accordance with Embodiments 4–7, the effect of the case in which the indium compound and the complexing agent of the present invention are used will be explained.

Embodiment 4

For an electrolyte solution of 30% by weight of potassium hydroxide, using a platinum electrode of 1 cm$^2$ as the working electrode, a platinum electrode of 1 cm$^2$ as the counter electrode in the same manner, and a comparative electrode HC-205C made by Toa Electronics Ltd. as the reference electrode, the current-potential curve during deposition of indium was determined. The potential was scanned from the plus side to the minus side at a speed of 100 mV/second. The current for each potential represents the reaction at the electrode, and for example, if the reduction reaction such as deposition of indium and generation of hydrogen gas occurs, a current caused thereby flows.

Figure 3:
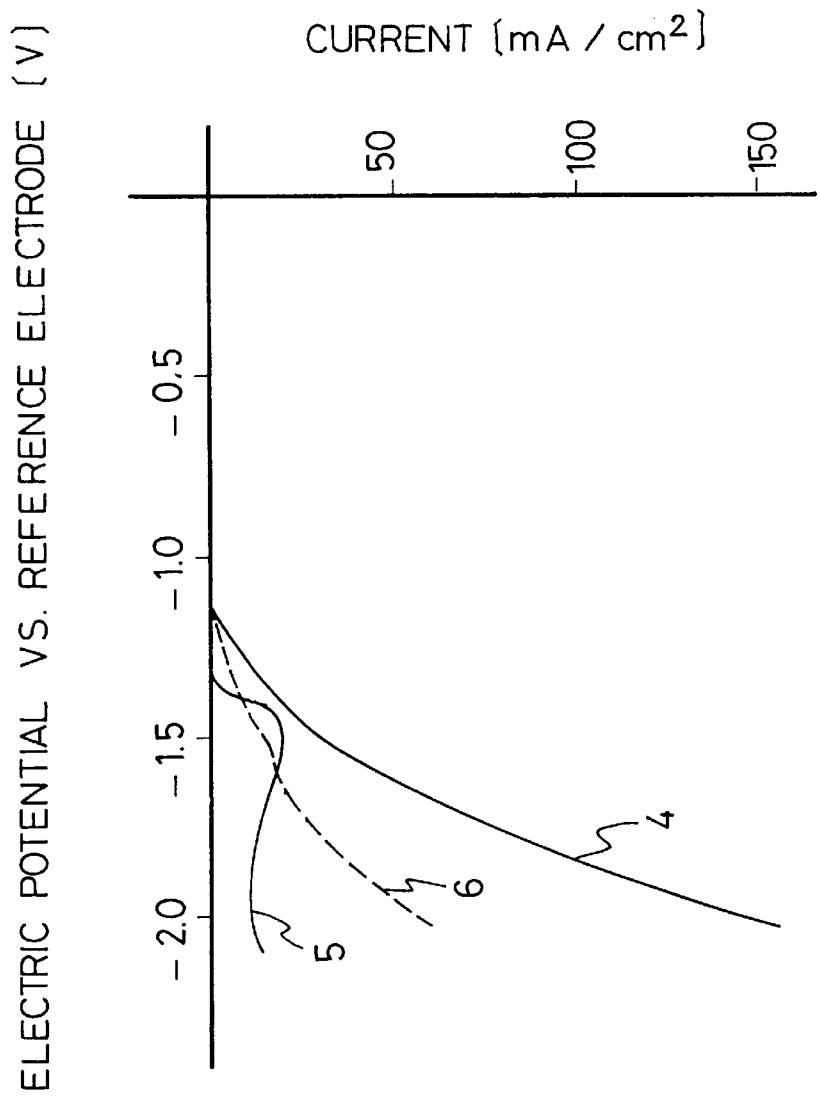
FIG. 3 shows current-potential curves at ordinary temperature in the potassium hydroxide solution.

Results are shown in FIG. 3. 4 in the figure is a case where indium sulfamate was added to the electrolyte solution by 0.1 mol/L, in this case, the current began to flow from the vicinity of −1.1 V with respect to the reference electrode, and indium was deposited accompanying hydrogen generation. 5 is a current-potential curve of a case in which 0.1 mol/L of potassium tartarate was added to the electrolyte solution, and then 0.1 mol/L of indium sulfamate was added. It was found that indium was deposited at the vicinity of −1.4 V, and hydrogen was generated under the vicinity of −2.0 V. This is considered such that since indium having a high hydrogen overvoltage was deposited on the electrode surface, the potential for hydrogen generation was shifted toward the minus side.

Thereby, the potential of deposition of indium could be separated from that of hydrogen generation. It is considered that also in the case of an actual battery, if indium is deposited previously, the hydrogen gas generation further becomes smaller. In the case where indium sulfamate and potassium tartarate are added to the electrolyte solution, when indium sulfamate is added previously, indium hydroxide and polyion are generated to become cloudy, while when potassium tartarate is added previously, no turbidity occurs.

In 6 in FIG. 3 is shown a current-potential curve of a case where indium sulfamate was added to the electrolyte solution by 0.1 mol/L, and then 0.1 mol/L of potassium tartarate was added. A small peak probably considered as indium is observed in the vicinity of −1.4 V in the figure, however, indium is deposited accompanying hydrogen generation from the vicinity of −1.1 V with respect to the reference electrode in the same manner as the case of no addition of potassium tartarate, and the effect of addition of the complexing agent becomes small. This also can be said for other indium compounds and complexing agents, and in order to immediately form the complex ion of indium and prevent precipitation, it is necessary to dissolve the complexing agent previously in the electrolyte solution.

Embodiment 5

Figure 4:
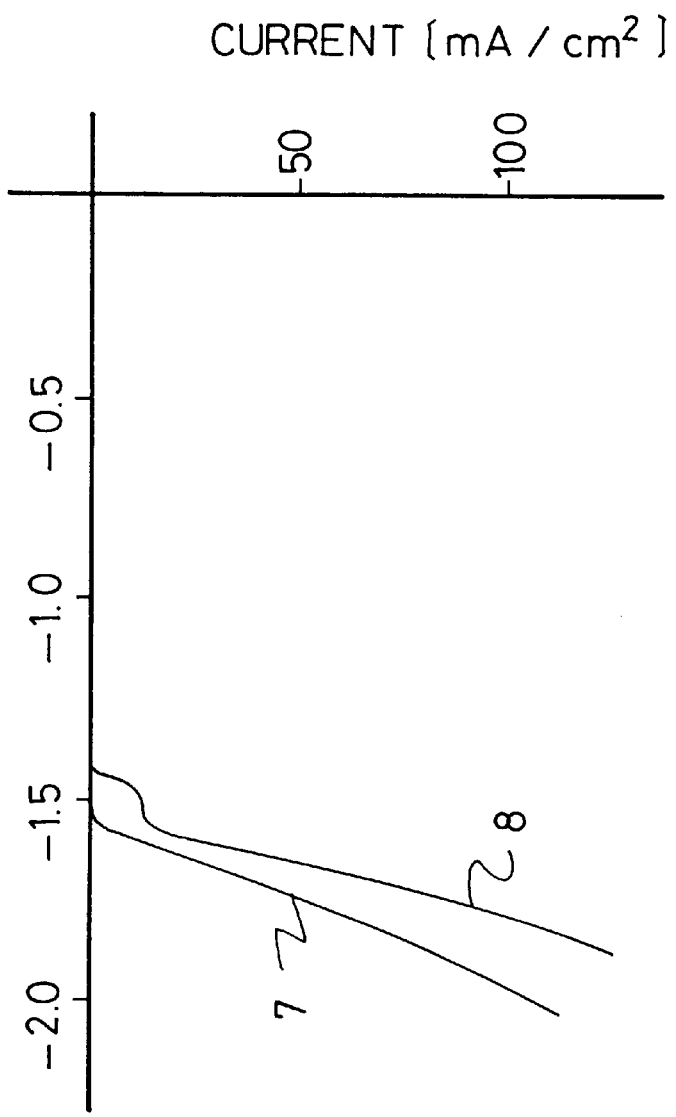
FIG. 4 shows current-potential curves at ordinary temperature in the potassium hydroxide solution in which zinc oxide is dissolved up to approximate saturation.

For an electrolyte solution of 30% by weight of potassium hydroxide in which zinc oxide was added up to approximate saturation, using a platinum electrode of 1 cm$^2$ as the working electrode, a platinum electrode of 1 cm$^2$ as the counter electrode in the same manner, and a comparative electrode HC-205C made by Toa Electronics Ltd. as the reference electrode, the current-potential curve during deposition of indium was determined. Results are shown in FIG. 4. 7 in the figure is a case where indium sulfamate was added to the electrolyte solution by 0.1 mol/L, and metal was deposited accompanying hydrogen generation from the vicinity of −1.56 V with respect to the reference electrode. The deposition potential of metal is lower than that of a case of no addition of zinc oxide, so that there is a possibility that it is an alloy of zinc and indium.

8 is a current-potential curve of a case where 0.1 mol/L of potassium tartarate was added to the electrolyte solution, and then 0.1 mol/L of indium sulfamate was added. There is a peak considered as the deposition of indium at the vicinity of −1.5 V, and then metal was deposited accompanying hydrogen generation from the vicinity of −1.56 V. In order to confirm the deposited substance at the vicinity of −1.5 V, the potential was held at −1.5 V for 30 seconds, and the deposited metal was immersed in nitric acid. If it was zinc, it might be instantly dissolved, but it was difficult to dissolve, so that the deposited substance is postulated to be indium or an alloy having a large amount of indium.

As a result of the measurement, the electrode potential of zinc was −1.509 V with respect to the reference electrode. It just corresponds to a potential at which only indium or an alloy having a large amount of indium is deposited in a solution containing a complexing agent. Namely, indium or the alloy having a large amount of indium is deposited on zinc and the collector contacting with zinc, which prevents zinc and the collector from corrosion and dissolution.

Embodiment 6

Into a specially prepared test tube having a volume of 25 ml and graduated to determine the gas generation amount, there was added 2 g of zinc powder containing 500 ppm of each of bismuth, indium and lead manufactured by the atomization method, and a copper piece having the same material as the collector having an area of 0.6 cm$^2$ and a thickness of 0.1 mm, an electrolyte solution to be tested was then added thereto to heat to 60° C. and the volume of generated hydrogen gas was measured for 7 days. The number of repetitions of the test was 10, and an average value thereof was used as a result.

The electrolyte solution was prepared by preparing a solution in which potassium hydroxide was 30% by weight and zinc oxide was added up to approximate saturation in the case of the potassium hydroxide series, or a solution in which sodium hydroxide was 25% by weight and zinc oxide was added up to approximate saturation in the case of the sodium hydroxide series, as a base, and a complexing agent and an indium compound were added thereto.

Indium sulfate made by Nihon Kagaku Sangyo Co., Ltd., indium sulfamate 35% solution also made by Nihon Kagaku Sangyo Co., Ltd., indium chloride made by Wako Pure Chemical Industries., Ltd., and indium cyanide made by Ito Pharmaceutical Co., Ltd. were used.

The adding amount of the indium compound was 1000 ppm with respect to the electrolyte solution, and the adding amount of the complexing agent was made 2-fold excessive in a mole ratio of indium ion.

Results in the case where the indium compound was added without adding of the complexing agent are shown in Table 2. The hydrogen gas generation amount is shown in Table 3 in the case where the complexing agent was added.

cyanide type has a possibility to lead to a new environmental pollution problem, so that it is not desirable to use it.

TABLE 2

Hydrogen evolution volume without complexing agent and comparison of discharge capacity of experimental cell

| Examples of the invention | Electrolyte | Indium compound 1000 ppm | Complexing agent | Hydrogen evolution volume μL/g/day | Comparison of discharge capacity |
|---|---|---|---|---|---|
| 1 | KOH | Indium sulfate | — | 24.29 | 100 |
| 2 | KOH | Indium sulfamate | — | 30.51 | 100 |
| 3 | KOH | Indium chloride | — | 35.40 | 100 |
| 4 | KOH | Indium cyanide | — | 20.66 | 100 |
| 5 | NaOH | Indium sulfate | — | 18.11 | 100 |
| 6 | NaOH | Indium sulfamate | — | 27.43 | 100 |
| 7 | NaOH | Indium chloride | — | 29.67 | 100 |
| 8 | NaOH | Indium cyanide | — | 14.21 | 100 |

TABLE 3

Comparison of hydrogen evolution volume with complexing agent and comparison of discharge capacity of experimental cell

| Examples of the invention | Electrolyte | Indium compound 1000 ppm | Complexing agent | Hydrogen evolution volume μL/g/day | Comparison of discharge capacity |
|---|---|---|---|---|---|
| 9 | KOH | Indium sulfate | Potassium tartrate | 98 | 102 |
| 10 | KOH | Indium sulfamate | Potassium tartrate | 99 | 101 |
| 11 | KOH | Indium chloride | Potassium tartrate | 98 | 103 |
| 12 | KOH | Indium cyanide | Potassium tartrate | 99 | 102 |
| 13 | NaOH | Indium sulfate | Sodium tartrate | 98 | 102 |
| 14 | NaOH | Indium sulfamate | Sodium tartrate | 97 | 103 |
| 15 | NaOH | Indium chloride | Sodium tartrate | 98 | 101 |
| 16 | NaOH | Indium cyanide | Sodium tartrate | 98 | 102 |
| 17 | KOH | Indium sulfate | EDTA | 98 | 102 |
| 18 | KOH | Indium sulfamate | EDTA | 98 | 102 |
| 19 | KOH | Indium chloride | EDTA | 99 | 103 |
| 20 | KOH | Indium cyanide | EDTA | 98 | 103 |
| 21 | NaOH | Indium sulfate | EDTA | 97 | 101 |
| 22 | NaOH | Indium sulfamate | EDTA | 99 | 102 |
| 23 | NaOH | Indium chloride | EDTA | 98 | 102 |
| 24 | NaOH | Indium cyanide | EDTA | 97 | 102 |
| 25 | KOH | Indium sulfate | Glycine | 99 | 101 |
| 26 | KOH | Indium sulfamate | Glycine | 99 | 100 |
| 27 | KOH | Indium chloride | Glycine | 99 | 101 |
| 28 | KOH | Indium cyanide | Glycine | 99 | 101 |
| 29 | NaOH | Indium sulfate | Glycine | 99 | 101 |
| 30 | NaOH | Indium sulfamate | Glycine | 99 | 100 |
| 31 | NaOH | Indium chloride | Glycine | 99 | 101 |
| 32 | NaOH | Indium cyanide | Glycine | 98 | 101 |
| 33 | KOH | Indium sulfate | Potassium cyanide | 97 | 103 |
| 34 | KOH | Indium sulfamate | Potassium cyanide | 97 | 103 |
| 35 | KOH | Indium chloride | Potassium cyanide | 97 | 103 |
| 36 | KOH | Indium cyanide | Potassium cyanide | 97 | 104 |
| 37 | NaOH | Indium sulfate | Sodium cyanide | 97 | 103 |
| 38 | NaOH | Indium sulfamate | Sodium cyanide | 97 | 102 |
| 39 | NaOH | Indium chloride | Sodium cyanide | 97 | 102 |
| 40 | NaOH | Indium cyanide | Sodium cyanide | 96 | 103 |

The hydrogen generation index is the value in which the hydrogen generation amount in the test using the same electrolyte solution except for the complexing agent is regarded as 100.

When the hydrogen gas generation amount is observed, so as postulated from the current-potential curve, it is understood that the hydrogen generation is suppressed. Although the effect is observed also in the cyanide series, however, the Embodiment 7

Into a positive electrode can there were added part of an electrolyte solution and 116 mg of a pellet (silver oxide content of 98%) which was molded by putting a combined agent into silver oxide, and a separator of polyethylene and a separator of cellophane were set in place. Next, a gasket of nylon was pushed and fitted into the positive electrode can, an impregnating agent, a gelling agent, 30 mg of zinc powder, an inhibitor and the like were added, the remainder of the electrolyte solution was added dropwise, and then a negative electrode can was set in place to seal the battery and 100 pieces were manufactured for every kind of button type silver oxide batteries. The same zinc as in Embodiment 6 and the electrolyte solution in Table 2 were used, and the battery size selected was as that of the SR621 type.

However, the amount of indium added was 1000 ppm with respect to the amount of zinc, and the amount of the complexing agent added was 2-fold in a mole ratio of indium ion. Discharge characteristics were measured using a resistance of 200 Ω by means of the direct current method when the electrolyte solution was the potassium hydroxide series or the pulse method when it was the sodium hydroxide series. In any case, no addition of the complexing agent was regarded to have a discharge index of 100. Results are shown with the right discharge index in Table 2. The effect of glycine is rather small, however, the effect was observed for all of the tested complexing agents.

The foregoing description has been made on the basis of an embodiment for the representative indium compound and the complexing agent as described above, however, the effects of the indium compound and the complexing agent can be easily postulated if the current-potential curve is determined in the same manner as shown in embodiments 4 and 5. It is understood that other indium compounds and complexing agents exhibiting the same effects can be applied to the present invention. In addition, an example for the silver battery has been described in Embodiment 4, however, the same effect can be expected even in the case of alkaline manganese batteries using zinc, air batteries and the like.

In addition, in the case of a negative electrode active material such as pure zinc and the like in which hydrogen generation is large, a homogeneous film is difficult to be formed due to hydrogen generation which occurs on the surface as a competitive reaction against indium deposition, and the effect of indium deposition becomes small. Thus, it is effective to use a negative electrode active material in which the hydrogen generation is suppressed to some extent by adding indium, bismuth, lead, aluminum, gallium, calcium and the like into zinc.

In Embodiment 8–11, the case in which two or more species selected from the group consisting of the indium compound, the tin compound containing tetravalent tin and lead oxide are used as the inhibitor of the present invention will be explained.

Embodiment 8

Into a specially prepared test tube having a volume of 25 ml graduated to measure the amount of gas generated, there were added 2 g of zinc powder containing 500 ppm of each of bismuth, indium and lead manufactured by the atomization method, and a copper piece as the same material as a collector having an area of 0.6 cm$^2$ and a thickness of 0.1 mm, an electrolyte solution to be tested was added,thereto to heat to 60° C. and the volume of generated hydrogen gas was measured for 7 days.

The number of test repetitions was 10, and the average value thereof was used as a result. The electrolyte solution was prepared such that by adding as a base a solution in which potassium hydroxide was 30% by weight and zinc oxide was added up to approximate saturation in the case of the potassium hydroxide series, or a solution in which sodium hydroxide was 25% by weight and zinc oxide was added up to approximate saturation in the case of the sodium hydroxide series, and compound selected from indium sulfate, indium sulfamate, sodium stannate and lead oxide were added thereto.

Indium sulfate and sodium stannate made by Nihon Kagaku Sangyo Co., Ltd., indium sulfamate 35% solution also made by Nihon Kagaku Sangyo Co., Ltd., and lead oxide made by Wako Pure Chemical, Ltd. were used. The added amount of the compounds was 1000 ppm in total with respect to the electrolyte solution. The results of the amounts of hydrogen generated are shown in Table 4.

TABLE 4

Hydrogen evolution volume and comparison of discharge capacity of experimental cell

| Examples of the invention | Amount of added compound | | | | Electrolyte | The number of copper pieces: soaked in electrolyte | Hydrogen evolution μ/g/day | Comparison of discharge capacity |
|---|---|---|---|---|---|---|---|---|
| | Indium sulfate | Indium sulfamate | Lead oxide | Sodium stannate | | | | |
| 1 | 1000 | | | | KOH | 0 | 37.86 | — |
| 2 | | 1000 | | | KOH | 0 | 27.14 | — |
| 3 | | | 1000 | | KOH | 0 | 157.36 | — |
| 4 | | | | 1000 | KOH | 0 | 26.81 | — |
| 5 | 1000 | | | | KOH | 5 | 24.29 | 102 |
| 6 | | 1000 | | | KOH | 5 | 30.51 | 102 |
| 7 | | | 1000 | | KOH | 5 | 55.56 | 103 |
| 8 | | | | 1000 | KOH | 5 | 39.15 | 101 |
| 9 | 500 | | 500 | | KOH | 5 | 21.43 | 103 |
| 10 | 500 | | | 500 | KOH | 5 | 35.71 | 102 |
| 11 | | | 500 | 500 | KOH | 5 | 50.00 | 103 |
| 12 | | 500 | 500 | | KOH | 5 | 18.57 | 103 |
| 13 | | 500 | | 500 | KOH | 5 | 46.43 | 102 |
| 14 | 333 | | 333 | 333 | KOH | 5 | 42.86 | 103 |
| 15 | | 333 | 333 | 333 | KOH | 5 | 42.86 | 103 |
| 16 | 1000 | | | | NaOH | 0 | 35.26 | — |
| 17 | | 1000 | | | NaOH | 0 | 23.85 | — |
| 18 | | | 1000 | | NaOH | 0 | 103.45 | — |
| 19 | | | | 1000 | NaOH | 0 | 24.17 | — |
| 20 | 1000 | | | | NaOH | 5 | 22.14 | 102 |

TABLE 4-continued

Hydrogen evolution volume and comparison of discharge capacity of experimental cell

| Examples of the invention | Amount of added compound | | | | | The number of copper pieces: soaked in electrolyte | Hydrogen evolution μ/g/day | Comparison of discharge capacity |
|---|---|---|---|---|---|---|---|---|
| | Indium sulfate | Indium sulfamate | Lead oxide | Sodium stannate | Electro-lyte | | | |
| 21 | | 1000 | | | NaOH | 5 | 27.51 | 102 |
| 22 | | | 1000 | | NaOH | 5 | 48.23 | 103 |
| 23 | | | | 1000 | NaOH | 5 | 35.12 | 101 |
| 24 | 500 | | 500 | | NaOH | 5 | 18.82 | 103 |
| 25 | 500 | | | 500 | NaOH | 5 | 31.48 | 102 |
| 26 | | | 500 | 500 | NaOH | 5 | 44.22 | 103 |
| 27 | | 500 | 500 | | NaOH | 5 | 16.11 | 103 |
| 28 | | 500 | | 500 | NaOH | 5 | 39.64 | 102 |
| 29 | 333 | | 333 | 333 | NaOH | 5 | 37.26 | 103 |
| 30 | | 333 | 333 | 333 | NaOH | 5 | 35.12 | 103 |
| 31 | | | | | KOH | 5 | 516.63 | 100 |

Figure 5:
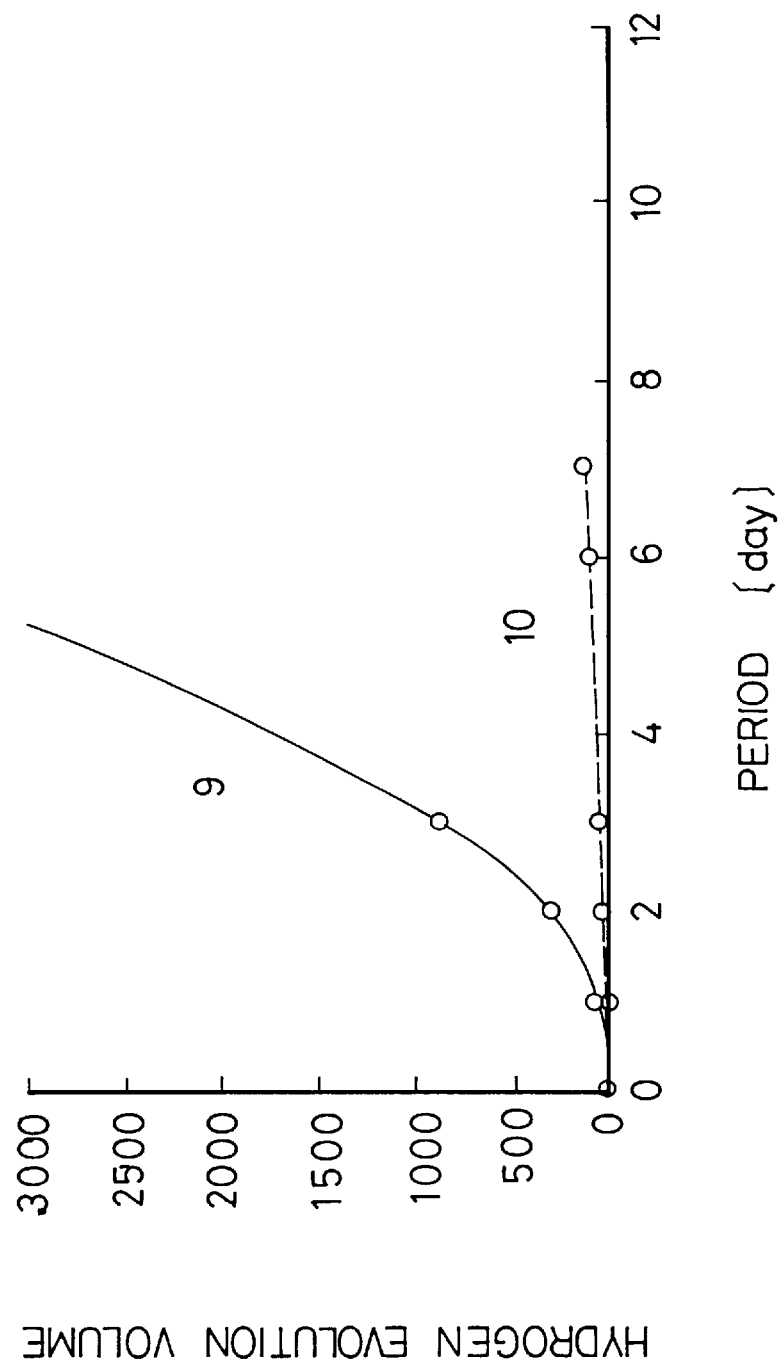
FIG. 5 shows the hydrogen gas generation amount with respect to days passed.

For comparison, experiment results without addition of the copper plate in the same experiment as Embodiment 8 are shown in examples 1–4 and 16–19 of Table 4. In addition, a result of no addition of the compound is shown in example 31 of Table 4. The amount of hydrogen gas generated with respect to the number of test days for example 31 in Table 4 and example 12 in Table 4 as a combination of indium sulfamate and lead oxide whose gas generation was small is shown in FIG. 5. It is understood that in the case of no addition of the compound, the amount of hydrogen generated increases with respect to the number of test days exponentially, and it is understood that in the case of the addition of indium sulfamate and lead oxide, the generation of hydrogen gas is suppressed.

As seen from the data of examples 3 and 4 in Table 4, lead oxide provides a relatively large amount of hydrogen generation. This is considered to be due to the fact that when lead is deposited, needle-like crystals are generated, making it impossible to homogeneously coat the surfaces of zinc and the collector. From a viewpoint of the combination, it is understood that the combination of the compound of indium and lead oxide is especially good, suppressing hydrogen generation and improving the discharge characteristics.

Embodiment 9

Into a positive electrode can were added a part of an electrolyte solution and 116 mg of a pellet (silver oxide content of 98%) which was molded by adding a combined agent into silver oxide. A separator of polyethylene and a separator of cellophane were then set in place. Next, a gasket of nylon was pushed and fitted into the positive electrode can, an impregnating agent, a gelling agent, and 30 mg of zinc powder were added, in the remainder of the electrolyte solution a compound selected from the group consisting of indium-sulfate, indium sulfamate, sodium stannate and lead oxide was added dropwise, and then a negative electrode can was set in place to seal the battery and 100 pieces were manufactured for every kind of button type silver oxide batteries.

The same zinc as in embodiment 8 and the electrolyte solution composition in Table 4 were used, and the battery size selected was as that of the SR621 type. However, the added amount of the compound was 1000 ppm with respect to the zinc amount. Results are shown in the discharge index in Table 4. Discharge characteristics were measured using a resistance of 200 Ω by means of the direct current method when the electrolyte solution was the potassium hydroxide series or the pulse method when the electrolyte solution was the sodium hydroxide series. In any case, no addition of the inhibitor was regarded to have a discharge index of 100. As understood also from the results, it has been found that the present invention is effective also in the discharge characteristics.

Especially, when lead oxide is added to the electrolyte solution the discharge index is superior over conventional methods in that there is an improvement in the electric contact by needle-like crystals. From a viewpoint of the combination, it is understood that the combination of the compound of indium and lead oxide is especially good, suppressing hydrogen generation and improving the discharge characteristics. It will be appreciated that indium suppresses the gas generation from zinc and the collector, and that lead oxide improves the discharge characteristics.

Embodiment 10

Figure 6:
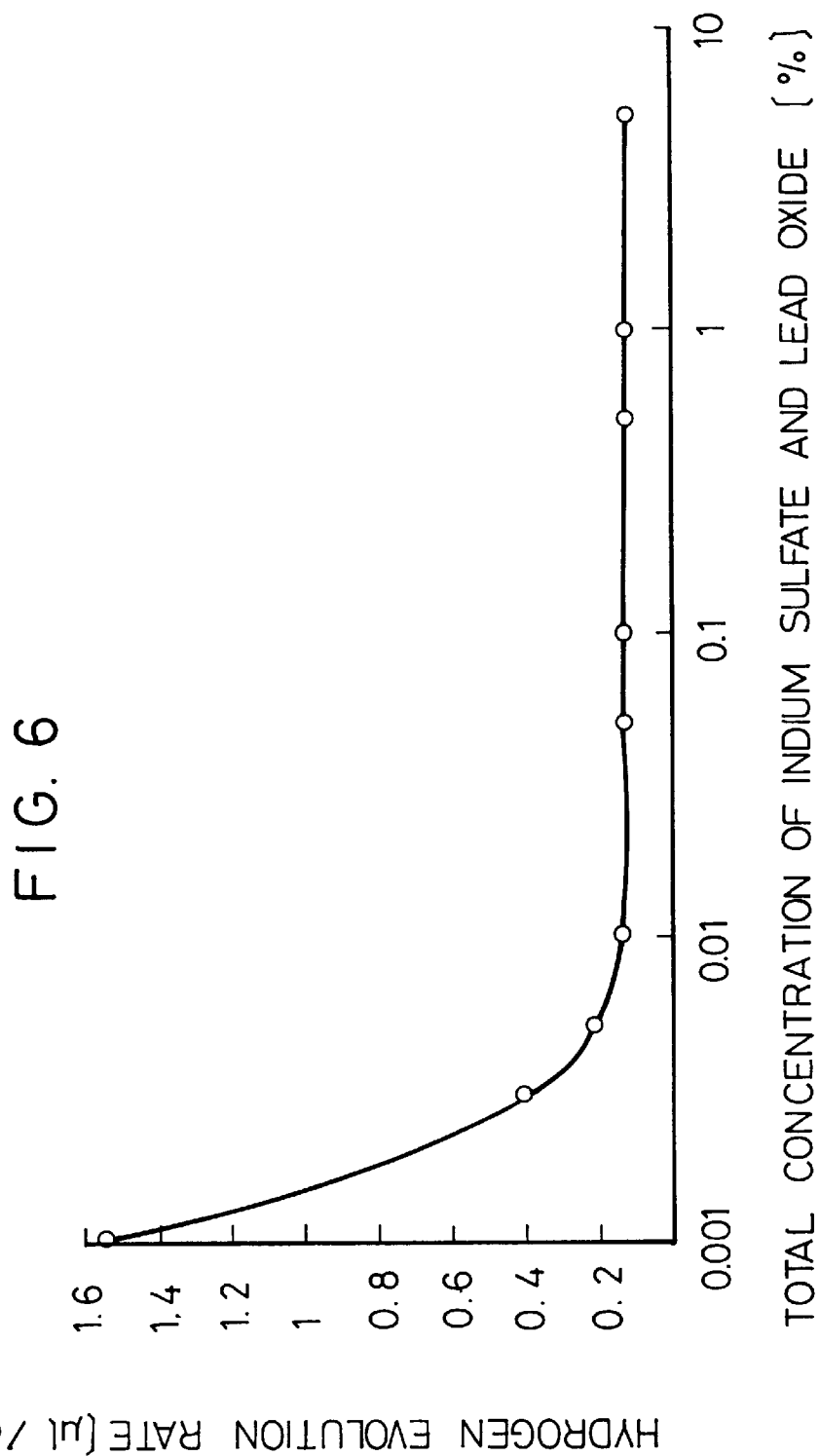
FIG. 6 shows the hydrogen gas generation amount with respect to the indium sulfate concentration.

Using a gasket of polypropylene specially prepared for allowing hydrogen to penetrate in the same manner as Embodiment 9, a button type silver oxide battery was manufactured. Ten pieces of the manufactured silver oxide batteries were placed into a vessel made of glass filled with liquid paraffin in a high temperature tank, a collecting tube having graduations at an upper portion was attached, and the amount of generated hydrogen gas was measured. In this state, the battery was maintained at 60° C. for 20 days, which is so as said to correspond to a term of about 1 year, and the hydrogen gas generation amount after 20 days was investigated. With respect to the added compound, the test was performed using indium sulfate and lead oxide in a weight ratio of 1:1 at a concentration of 10 ppm to 5% in total with respect to the weight of zinc. Evaluation results are shown in FIG. 6. According to the figure, it is understood that the added compound effectively works at 50 ppm to 1%.

The gasket of polypropylene was returned to one made of nylon, and a button type silver oxide battery was manufactured in a range of concentration of 50 ppm to 1% using indium sulfate and lead oxide in which the gas generation was less. Ten pieces of the manufactured batteries were put in a vessel made of glass filled with liquid paraffin in a high temperature tank maintained at 60° C. in the same manner, and a collecting tube for generating hydrogen gas was attached to the upper portion. Hydrogen gas generation, expansion of the can and liquid leakage were not observed after 20 days at 60° C.

Indium sulfate and lead oxide were effective for zinc at the concentration of 50 ppm to 1%, however, the same effect was observed also in the case of other combinations of compounds by adjusting the mole number and determining the concentration range.

In the actual trial production of batteries, a hydrogen gas generation value smaller than the hydrogen gas generation amount in the experiment in Embodiment 8 was observed. That is, it is considered that the copper piece used in Embodiment 8 is different from the structure of an actual collector, a part of generated hydrogen gas having been consumed by the reduction of silver oxide, and the like. The method in Embodiment 8 is different in the amount order of hydrogen gas generation, but it is sufficient as a method for observing substituted characteristics for predicting hydrogen generation in an actual battery.

Embodiment 11

Using a gasket of polypropylene specially prepared for allowing hydrogen to penetrate in the same manner as Embodiment 9, a button type silver oxide battery was manufactured. However, two kinds of electrolyte solutions, one of indium sulfate and another of lead oxide of 50 ppm with respect to zinc, were prepared and they were added by dividing into two times with changing the order. With respect to the manufactured button type silver oxide batteries, the test was performed at 60° C. for 20 days in the same manner as Embodiment 9. The hydrogen generation amount was 0.10 $\mu$L/g/day for one in which indium sulfate was added, and it was 0.15 $\mu$L/g/day for one in which lead oxide was added. As understood from the results, an electrolyte solution in which indium sulfate was added has a larger effect for the hydrogen gas generation.

In accordance with Embodiments 12–14, the effect of the case where zinc containing indium is used with one or more species of compounds selected from the indium compound, a compound containing tetravalent tin and lead oxide as the inhibitor of the present invention will be explained.

Embodiment 12

Into a specially prepared test tube having a volume of 25 ml graduated to indicate the amount of gas generation, 2 g of zinc powder containing indium manufactured by the atomization method and a copper piece of the same material as a collector having an area of 0.6 cm$^2$ and a thickness of 0.1 mm were added, an electrolyte solution to be tested was then added thereto and heated to 60° C. and the volume of generated hydrogen gas was measured for 7 days. The number of repetition of the test was 10, and an average value thereof was used as a result. The electrolyte solution was prepared by making a solution in which potassium hydroxide was 30% by weight and zinc oxide were added up to approximate saturation in the case of the potassium hydroxide series, or a solution in which sodium hydroxide was 25 % by weight and zinc oxide were added up to approximate saturation in the case of the sodium hydroxide series as a base, and an inhibitor according to the present invention, such as lead monoxide and the like, was added thereto.

In Table 5, the adding amount of indium into the zinc powder the generation amount of hydrogen gas with respect to the adding amount of lead monoxide are shown. The adding amount of lead monoxide is shown by ppm with respect to the electrolyte solution. Results are also shown in the hydrogen generation amount in Table 5.

TABLE 5

Hydrogen volume generated from zinc powder

| Experimental No. | Electrolyte | Indium content of zinc powder ppm | Concentration of PbO in electrolyte ppm | Hydrogen evolution volume $\mu$L/g/day |
|---|---|---|---|---|
| 1 | KOH | 200 | 0 | 603.31 |
| 2 | KOH | 200 | 10 | 398.88 |
| 3 | KOH | 200 | 50 | 102.56 |
| 4 | KOH | 200 | 100 | 14.29 |
| 5 | KOH | 200 | 500 | 87.01 |
| 6 | KOH | 200 | 1000 | 105.70 |
| 7 | KOH | 200 | 5000 | 122.43 |
| 8 | KOH | 500 | 0 | 516.92 |
| 9 | KOH | 500 | 10 | 30.01 |
| 10 | KOH | 500 | 50 | 20.13 |
| 11 | KOH | 500 | 100 | 6.21 |
| 12 | KOH | 500 | 500 | 14.73 |
| 13 | KOH | 500 | 1000 | 40.56 |
| 14 | KOH | 500 | 5000 | 143.32 |
| 15 | KOH | 1800 | 0 | 99.21 |
| 16 | KOH | 1800 | 10 | 10.05 |
| 17 | KOH | 1800 | 50 | 5.33 |
| 18 | KOH | 1800 | 100 | 5.05 |
| 19 | KOH | 1800 | 500 | 10.11 |
| 20 | KOH | 1800 | 1000 | 31.01 |
| 21 | KOH | 1800 | 5000 | 142.58 |
| 22 | NaOH | 200 | 0 | 55.01 |
| 23 | NaOH | 200 | 10 | 327.38 |
| 24 | NaOH | 200 | 50 | 70.25 |
| 25 | NaOH | 200 | 100 | 10.67 |
| 26 | NaOH | 200 | 500 | 62.98 |
| 27 | NaOH | 200 | 1000 | 85.22 |
| 28 | NaOH | 200 | 5000 | 110.12 |
| 29 | NaOH | 500 | 0 | 501.39 |
| 30 | NaOH | 500 | 10 | 25.52 |
| 31 | NaOH | 500 | 50 | 16.33 |
| 32 | NaOH | 500 | 100 | 3.99 |
| 33 | NaOH | 500 | 500 | 9.63 |
| 34 | NaOH | 500 | 1000 | 25.42 |
| 35 | NaOH | 500 | 5000 | 103.44 |
| 36 | NaOH | 1800 | 0 | 82.54 |
| 37 | NaOH | 1800 | 10 | 10.11 |
| 38 | NaOH | 1800 | 50 | 4.87 |
| 39 | NaOH | 1800 | 100 | 4.51 |
| 40 | NaOH | 1800 | 500 | 8.73 |
| 41 | NaOH | 1800 | 1000 | 24.42 |
| 42 | NaOH | 1800 | 5000 | 121.12 |

Figure 7:
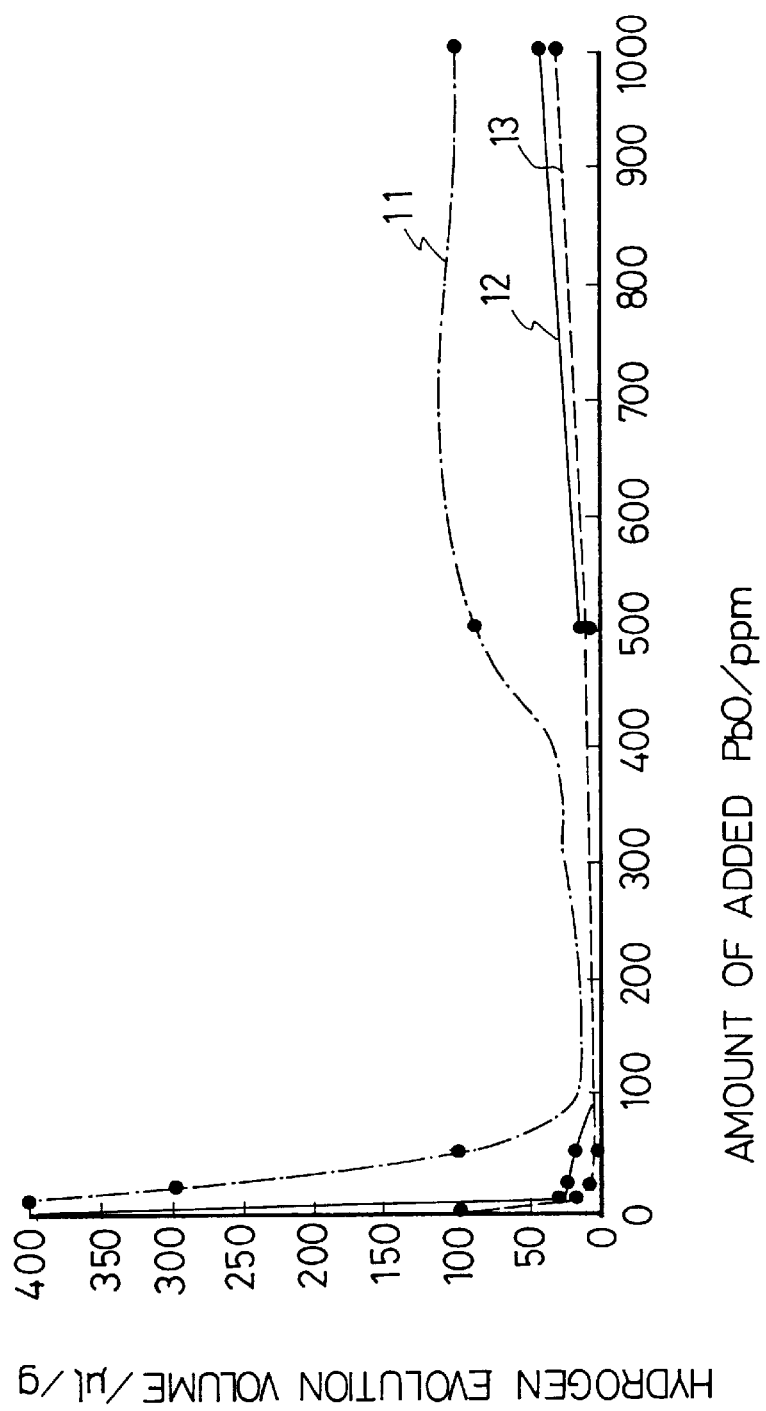
FIG. 7 is a figure showing the generation amount of hydrogen gas with respect to the amount of lead monoxide added into the electrolyte solution of the present invention.

The hydrogen gas generation results in the electrolyte solution of the potassium hydroxide series are sown in FIG. 7. 1 in the figure is a case where zinc powder added with 200 ppm of indium was used, and there is an effect of suppressing hydrogen generation at an adding amount of lead monoxide of about 100–400 ppm. 2 is a case where zinc powder added with 500 ppm of indium was used, and there is an effect of suppressing hydrogen generation at an adding amount of lead monoxide of not less than 10 ppm. 3 is a case where zinc powder added with 1800 ppm of indium was used, and there is an effect in a concentration range equivalent to that in 2. Especially when indium is added in a high concentration in such a manner, the effect at an adding amount of lead monoxide of not more than 100 ppm is remarkable, and it is possible to reduce the added amount of lead to reduce environmental pollution.

Embodiment 13

Into a positive electrode can there were added a part of an electrolyte solution and 116 mg of a pellet (silver oxide content of 98%) which was molded by adding a combined agent into silver oxide, and a separator of polyethylene and a separator of cellophane were set in place. Next, a gasket of nylon was pushed and fitted into the positive electrode can, an impregnating agent, a gelling agent, 30 mg of zinc powder, an inhibitor and the like were added, the remainder of the electrolyte solution was added dropwise, and then a negative electrode can was set in place to seal the battery and 100 pieces for every kind of button type silver oxide batteries were manufactured. The battery size was made as that of an SR621 type. The electrolyte solution was made again so as to allow the added amount of lead monoxide to be an amount with respect to the zinc amount. They were stored at 60° C. for 20 days, and results of measurement of the self-discharge rate are shown in Table 6.

TABLE 6

Self-discharge rate of cell and hydrogen evolution rate

| Experi-mental No. | Electro-lyte | Indium content of zinc powder ppm | Amount of PbO added to electrolyte (PbO weight to zinc weight) ppm | Self-discharge rate % | Hydrogen evolution rate μL/g/day |
|---|---|---|---|---|---|
| 1 | KOH | 200 | 0 | 12.1 | 1.23 |
| 2 | KOH | 200 | 10 | 9.9 | 0.95 |
| 3 | KOH | 200 | 50 | 7.4 | 0.88 |
| 4 | KOH | 200 | 100 | 4.1 | 0.50 |
| 5 | KOH | 200 | 500 | 8.7 | 0.71 |
| 6 | KOH | 200 | 1000 | 9.1 | 0.91 |
| 7 | KOH | 200 | 5000 | 15.8 | 1.56 |
| 8 | KOH | 500 | 0 | 11.2 | 1.11 |
| 9 | KOH | 500 | 10 | 4.2 | 0.56 |
| 10 | KOH | 500 | 50 | 3.5 | 0.41 |
| 11 | KOH | 500 | 100 | 2.5 | 0.35 |
| 12 | KOH | 500 | 500 | 2.9 | 0.32 |
| 13 | KOH | 500 | 1000 | 3.6 | 0.47 |
| 14 | KOH | 500 | 5000 | 18.9 | 1.49 |
| 15 | KOH | 1800 | 0 | 10.3 | 1.02 |
| 16 | KOH | 1800 | 10 | 2.2 | 0.30 |
| 17 | KOH | 1800 | 50 | 1.7 | 0.25 |
| 18 | KOH | 1800 | 100 | 1.5 | 0.22 |
| 19 | KOH | 1800 | 500 | 2.1 | 0.28 |
| 20 | KOH | 1800 | 1000 | 3.7 | 0.39 |
| 21 | KOH | 1800 | 5000 | 16.6 | 1.70 |
| 22 | NaOH | 200 | 0 | 10.3 | 1.15 |
| 23 | NaOH | 200 | 10 | 8.2 | 0.90 |
| 24 | NaOH | 200 | 50 | 6.5 | 0.74 |
| 25 | NaOH | 200 | 100 | 3.3 | 0.42 |
| 26 | NaOH | 200 | 500 | 7.5 | 0.72 |
| 27 | NaOH | 200 | 1000 | 8.1 | 0.86 |
| 28 | NaOH | 200 | 5000 | 13.2 | 1.35 |
| 29 | NaOH | 500 | 0 | 10.2 | 1.00 |
| 30 | NaOH | 500 | 10 | 4.0 | 0.44 |
| 31 | NaOH | 500 | 50 | 2.9 | 0.32 |
| 32 | NaOH | 500 | 100 | 2.2 | 0.30 |
| 33 | NaOH | 500 | 500 | 2.3 | 0.29 |
| 34 | NaOH | 500 | 1000 | 3.1 | 0.48 |
| 35 | NaOH | 500 | 5000 | 16.7 | 1.38 |
| 36 | NaOH | 1800 | 0 | 8.9 | 0.90 |
| 37 | NaOH | 1800 | 10 | 1.9 | 0.31 |
| 38 | NaOH | 1800 | 50 | 1.3 | 0.21 |
| 39 | NaOH | 1800 | 100 | 0.9 | 0.19 |
| 40 | NaOH | 1800 | 500 | 1.5 | 0.25 |
| 41 | NaOH | 1800 | 1000 | 2.9 | 0.33 |
| 42 | NaOH | 1800 | 5000 | 12.3 | 1.54 |

As seen also from the results, it is understood that the reduction in the battery capacity is suppressed by adding 100–1000 ppm of lead monoxide in the case of the zinc powder added with 500 ppm of indium, or 10–1000 ppm of lead monoxide in the case of the zinc powder added with 1800 ppm of indium. The decrease in the battery capacity by the addition of lead monoxide at the high concentration is considered to be due to the fact that needle-like crystals of lead grew on account of the excessive addition of lead monoxide, causing a possible short circuit.

Embodiment 14

A button type silver oxide battery was manufactured in the same manner as Embodiment 13 except that a gasket of polypropylene specially prepared for allowing hydrogen to penetrate was used. Ten pieces of the manufactured silver oxide batteries were put into a Vessel made of glass filled with liquid paraffin in a high temperature tank, a collecting tube having graduations at an upper portion was attached, and the amount of generated hydrogen gas was measured. In this state, the mixture was maintained at 60° C. for 20 days, which is said to correspond to a term of about 1 year, and the hydrogen gas generation amount after 20 days was investigated. Results are shown in Table 6.

As understood from the foregoing Embodiments, the hydrogen generation is mild and the self-discharge is also less in the case of the sodium hydroxide series as compared with the potassium hydroxide series with respect to the electrolyte solution. In addition, the more the indium content in the zinc powder is, the better results are obtained, and the smaller the adding amount of lead monoxide is.

In the actual trial production of batteries, there is given a value smaller than the hydrogen gas generation amount in the experiment in Embodiment 12. In this fact, it is considered that the copper piece used in Embodiment 12 is different from a structure of an actual collector, a part of generated hydrogen gas has been consumed by the reduction of silver oxide and the like.

The method in Embodiment 12 is different in the amount order of hydrogen gas generation, but it is sufficient as a method for observing substituted characteristics for predicting hydrogen generation in an actual battery.

The same experiment was performed for indium compounds, tin compounds containing tetravalent tin, and mixtures thereof other than lead monoxide. Results thereof are substantially the same as those in the case of lead monoxide, and it has been found that the reduction in the battery capacity is suppressed by adding 100–1000 ppm of the inhibitor in the case of the zinc powder added with 500 ppm of indium, or 10–1000 ppm of the inhibitor in the case of the zinc powder added with 1800 ppm of indium.

In accordance with Embodiments 15–17, the effect will be explained in the case where zinc containing not more than 4 ppm of iron and one or more species of compounds selected from the indium compound, the tin compound containing tetravalent tin, and lead oxide as the inhibitor of the present invention were used.

Embodiment 15

As the zinc powder, one containing 100 ppm of gallium manufactured by the atomization method, 200 ppm of indium, 500 ppm of lead and 450 ppm of aluminum, and further containing 5 ppm of iron was used. The concentration of iron in the zinc powder was adjusted by performing iron removal by means of a magnet. The concentration after the iron removal was confirmed by the atomic absorption method.

The hydrogen generation test was performed such that into a specially prepared test tube having a volume of 25 ml and graduated to indicate the amount of gas generation there were placed 2 g of zinc powder and a copper piece of the same material as a collector having an area of 0.6 cm$^2$ and a thickness of 0.1 mm, an electrolyte solution to be tested was added thereto to heat to 60° C. and the volume of hydrogen gas generated was measured for 7 days. The number of repetition of the test was 10, and an average value thereof was used as a result. The electrolyte solution was prepared by making a solution in which potassium hydroxide was 30% by weight and zinc oxide was added up to approximate saturation in the case of the potassium hydroxide series, or a solution in which sodium hydroxide was 25% by weight and zinc oxide was added up to approximate saturation in the case of the sodium hydroxide series, and a base lead monoxide or the like was added thereto as the inhibitor.

The concentration of iron in the zinc powder and the generated amount of hydrogen gas with respect to the adding amount of the inhibitor are shown in Table 7. The adding amount of the inhibitor is shown by ppm with respect to the electrolyte solution. Results are also shown in the hydrogen generation amount in Table 7.

TABLE 7

Hydrogen volume generated from zinc powder

| Experimental No. | Electrolyte | Content of Fe in zinc powder ppm | Concentration of PbO in electrolyte ppm | Hydrogen evolution rate μL/g/day |
|---|---|---|---|---|
| 1 | KOH | 5 | 0 | 570.00 |
| 2 | KOH | 5 | 10 | 53.75 |
| 3 | KOH | 5 | 50 | 56.25 |
| 4 | KOH | 5 | 100 | 79.29 |
| 5 | KOH | 5 | 500 | 120.85 |
| 6 | KOH | 5 | 1000 | 158.92 |
| 7 | KOH | 5 | 5000 | 284.28 |
| 8 | KOH | 4 | 0 | 508.94 |
| 9 | KOH | 4 | 10 | 21.14 |
| 10 | KOH | 4 | 50 | 16.13 |
| 11 | KOH | 4 | 100 | 20.15 |
| 12 | KOH | 4 | 500 | 45.21 |
| 13 | KOH | 4 | 1000 | 50.56 |
| 14 | KOH | 4 | 5000 | 201.73 |
| 15 | KOH | 2 | 0 | 516.92 |
| 16 | KOH | 2 | 10 | 12.50 |
| 17 | KOH | 2 | 50 | 12.50 |
| 18 | KOH | 2 | 100 | 14.29 |
| 19 | KOH | 2 | 500 | 30.21 |
| 20 | KOH | 2 | 1000 | 53.57 |
| 21 | KOH | 2 | 5000 | 162.85 |
| 22 | NaOH | 5 | 0 | 423.85 |
| 23 | NaOH | 5 | 10 | 42.36 |
| 24 | NaOH | 5 | 50 | 40.23 |
| 25 | NaOH | 5 | 100 | 66.34 |
| 26 | NaOH | 5 | 500 | 100.25 |
| 27 | NaOH | 5 | 1000 | 132.58 |
| 28 | NaOH | 5 | 5000 | 278.90 |
| 29 | NaOH | 4 | 0 | 396.37 |
| 30 | NaOH | 4 | 10 | 19.36 |
| 31 | NaOH | 4 | 50 | 12.72 |
| 32 | NaOH | 4 | 100 | 15.64 |
| 33 | NaOH | 4 | 500 | 38.38 |
| 34 | NaOH | 4 | 1000 | 47.25 |
| 35 | NaOH | 4 | 5000 | 190.01 |
| 36 | NaOH | 2 | 0 | 43.56 |
| 37 | NaOH | 2 | 10 | 11.23 |
| 38 | NaOH | 2 | 50 | 10.12 |
| 39 | NaOH | 2 | 100 | 12.93 |
| 40 | NaOH | 2 | 500 | 27.81 |
| 41 | NaOH | 2 | 1000 | 42.21 |
| 42 | NaOH | 2 | 5000 | 130.10 |

Figure 8:
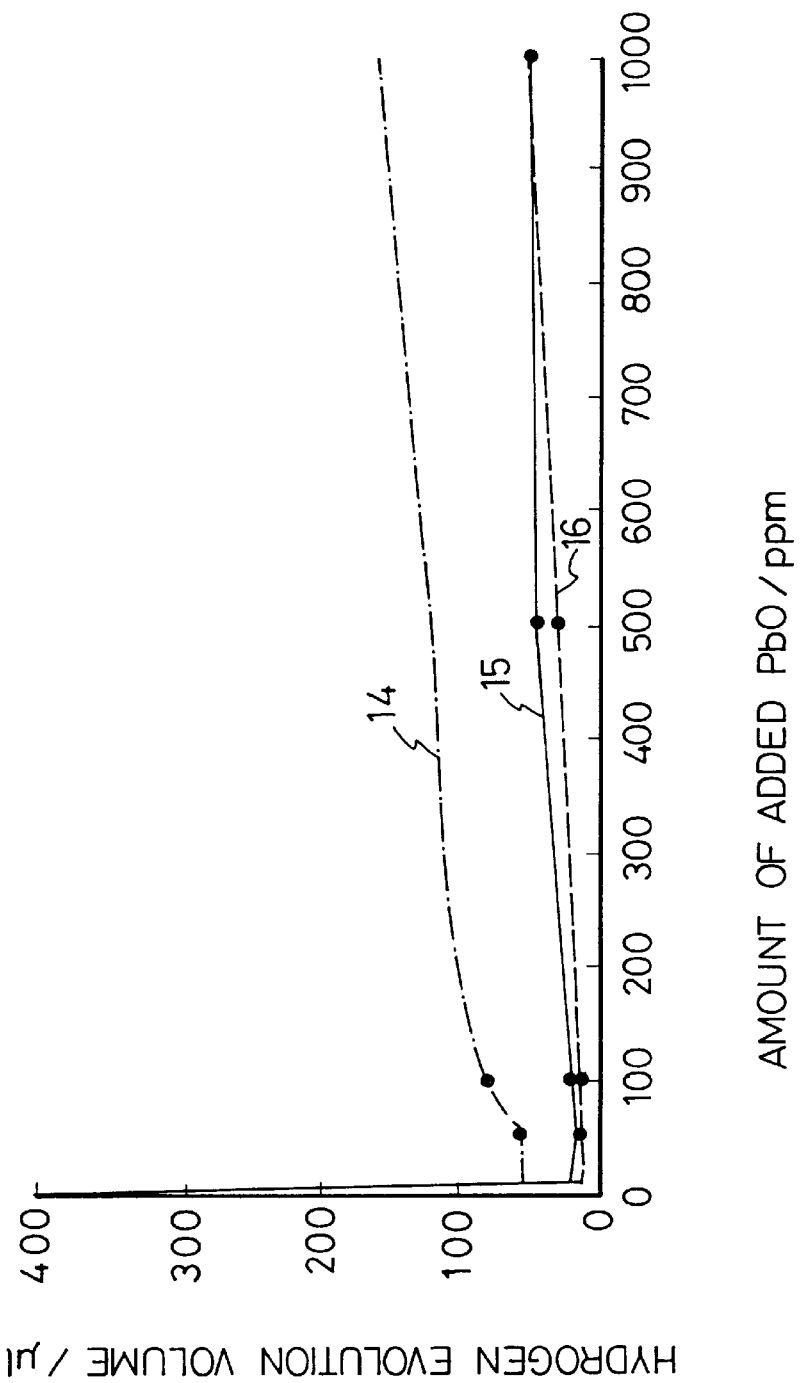
FIG. 8 is a figure showing the generation amount of hydrogen gas with respect to the amount of lead monoxide added into the electrolyte solution.

Hydrogen gas generation results in the electrolyte solution of the potassium hydroxide series are shown in FIG. 8. 1 in the figure is a case in which the zinc powder having a concentration of iron of 5 ppm was used, and the hydrogen generation amount is generally large as compared with the following two. 2 is a case in which the zinc powder having a concentration of iron of 4 ppm was used, and there is an effect of hydrogen generation suppression when an amount of lead monoxide of not less than 10 ppm was added. 3 is a case in which the zinc powder having a concentration of iron of 2 ppm was used, and there is a hydrogen generation suppression effect in a concentration range equivalent to that of 2. Especially, when the added amount of iron as an impurity was not more than 4 ppm, the effect of an added amount of lead monoxide of not more than 100 ppm is evident, and it is possible to reduce the added amount of lead as an environmental pollution substance.

The experiment has been described in the present Embodiment in which iron removal was performed by a magnet, and the concentration of iron is lowered. However, in an experiment regarding zinc which was removed from iron by means of purification during the production steps for zinc powder, substantially the same results were obtained.

Embodiment 16

Into a positive electrode can were added a part of an electrolyte solution and 116 mg of a pellet (silver oxide content of 98%) which was molded by adding a combined agent into silver oxide, and a separator of polyethylene and a separator of cellophane were set in place. Next, a gasket of nylon was pushed and fitted into the positive electrode can, an impregnating agent, a gelling agent, 30 mg of zinc powder, an inhibitor and the like were added. The remainder of the electrolyte solution was then added dropwise, and then a negative electrode can was set in place to seal the foregoing arrangement and 100 pieces of every kind of button type silver oxide battery was manufactured. The battery size made of the SR621 type. The electrolyte solution was made again so that the adding amount of lead monoxide to be an amount with respect to the zinc amount.

They were stored at 60° C. for 20 days which is said to correspond to 1 year at ordinary temperature, and the self-discharge rate was measured, results of which are shown in Table 8.

TABLE 8

Self-discharge rate of cell and hydrogen evolution rate

| Experimental No. | Electrolyte | Content of Fe in zinc powder ppm | Concentration of PbO in electrolyte ppm | Self-discharge rate % | Hydrogen evolution rate μL/g/day |
|---|---|---|---|---|---|
| 1 | KOH | 5 | 0 | 13.2 | 0.98 |
| 2 | KOH | 5 | 10 | 8.7 | 0.76 |
| 3 | KOH | 5 | 50 | 7.2 | 0.79 |
| 4 | KOH | 5 | 100 | 4.0 | 0.48 |
| 5 | KOH | 5 | 500 | 8.6 | 0.64 |
| 6 | KOH | 5 | 1000 | 8.5 | 0.77 |
| 7 | KOH | 5 | 5000 | 16.2 | 1.48 |
| 8 | KOH | 4 | 0 | 13.0 | 0.89 |
| 9 | KOH | 4 | 10 | 3.8 | 0.45 |
| 10 | KOH | 4 | 50 | 3.5 | 0.37 |
| 11 | KOH | 4 | 100 | 2.2 | 0.33 |
| 12 | KOH | 4 | 500 | 2.8 | 0.29 |
| 13 | KOH | 4 | 1000 | 3.9 | 0.40 |
| 14 | KOH | 4 | 5000 | 17.6 | 1.42 |
| 15 | KOH | 2 | 0 | 11.0 | 0.82 |
| 16 | KOH | 2 | 10 | 2.2 | 0.24 |
| 17 | KOH | 2 | 50 | 1.5 | 0.23 |
| 18 | KOH | 2 | 100 | 1.4 | 0.21 |
| 19 | KOH | 2 | 500 | 2.2 | 0.25 |
| 20 | KOH | 2 | 1000 | 3.5 | 0.33 |
| 21 | KOH | 2 | 5000 | 17.2 | 1.62 |
| 22 | NaOH | 5 | 0 | 10.1 | 0.92 |

TABLE 8-continued

Self-discharge rate of cell and hydrogen evolution rate

| Experi-mental No. | Electro-lyte | Content of Fe in zinc powder ppm | Concentration of PbO in electrolyte ppm | Self-discharge rate % | Hydrogen evolution rate μL/g/day |
|---|---|---|---|---|---|
| 23 | NaOH | 5 | 10 | 8.0 | 0.72 |
| 24 | NaOH | 5 | 50 | 5.5 | 0.67 |
| 25 | NaOH | 5 | 100 | 4.1 | 0.40 |
| 26 | NaOH | 5 | 500 | 7.4 | 0.65 |
| 27 | NaOH | 5 | 1000 | 7.2 | 0.73 |
| 28 | NaOH | 5 | 5000 | 14.2 | 1.28 |
| 29 | NaOH | 4 | 0 | 9.2 | 0.80 |
| 30 | NaOH | 4 | 10 | 3.7 | 0.35 |
| 31 | NaOH | 4 | 50 | 2.0 | 0.29 |
| 32 | NaOH | 4 | 100 | 2.0 | 0.29 |
| 33 | NaOH | 4 | 500 | 2.2 | 0.26 |
| 34 | NaOH | 4 | 1000 | 3.2 | 0.41 |
| 35 | NaOH | 4 | 5000 | 15.2 | 1.31 |
| 36 | NaOH | 2 | 0 | 7.1 | 0.72 |
| 37 | NaOH | 2 | 10 | 1.5 | 0.25 |
| 38 | NaOH | 2 | 50 | 0.8 | 0.19 |
| 39 | NaOH | 2 | 100 | 0.7 | 0.18 |
| 40 | NaOH | 2 | 500 | 1.1 | 0.23 |
| 41 | NaOH | 2 | 1000 | 2.9 | 0.28 |
| 42 | NaOH | 2 | 5000 | 9.8 | 1.46 |

As seen also from the results, it is understood that the self-discharge rate can be suppressed to be not more than 4% by adding 10–1000 ppm of lead monoxide in the battery using zinc powder having iron of not more than 4 ppm. The decrease in the battery capacity by the addition of lead monoxide at the high concentration was considered due to the fact that needle-like crystals of lead grew on account of excessive addition, which may cause a short circuit.

Embodiment 17

A button type silver oxide battery was manufactured in the same manner as Embodiment 16 except that a specially prepared gasket of polypropylene which allows hydrogen to penetrate was used. Ten pieces of manufactured silver oxide batteries were put into a vessel made of glass filled with liquid paraffin in a high temperature tank, a collecting tube having graduations at the upper portion was attached, and the amount of generated hydrogen gas was measured. This state was maintained at 60° C. for 20 days which is said to correspond to a term of about 1 year, and the hydrogen gas generation amount after 20 days was investigated. Results are shown in Table 8.

As understood from Embodiments, the hydrogen generation is mild and the self-discharge is also less in the case of the sodium hydroxide series as compared with the potassium hydroxide series with respect to the electrolyte solution. In addition, the lower the iron content in the zinc powder is, the better the results are which are obtained, and the smaller the added amount of lead monoxide is.

In the actual trial production of batteries, a hydrogen gas generation value smaller than the hydrogen gas generation amount in the experiment in Embodiment 15 is obtained. This is due to the fact that the copper piece used in Embodiment 15 is different from the structure of an actual collector and that a part of generated hydrogen gas has been consumed by the reduction of silver oxide and the like.

The method in Embodiment 15 is different in the amount of order of hydrogen gas generation, but it is sufficient as a method for observing substituted characteristics for predicting hydrogen generation in an actual battery.

The same experiment was performed for indium compounds, tin compounds containing tetravalent tin, and mixtures thereof other than lead monoxide. Results thereof are substantially the same as those in the case of lead monoxide, and it has been found that the self-discharge rate can be suppressed to be not more than 4% by adding 10–1000 ppm of the inhibitor.

In the present invention, the description has been made for iron which is easiest to contaminate and has a high risk of hydrogen generation, however, it is understood that it is preferable to use one in which impurities such as nickel, cobalt; antimony and the like are reduced as much as possible. In addition, in the case of the negative electrode active material such as zinc and the like in which hydrogen generation is large, a homogeneous film is difficult to be formed due to the hydrogen generation which occurs as a competitive reaction against lead deposition onto the surface, and the effect of lead deposition becomes small. Thus, it is more effective to use a negative electrode active material in which zinc is added with indium, bismuth, lead, aluminum, gallium, calcium and the like so as to suppress the hydrogen generation to some extent.

In accordance with the following Embodiments 18–21, the effect of the case in which the moisture in the battery is controlled will be explained.

Embodiment 18

Into a positive electrode can were added a part of an electrolyte solution and a pellet (silver oxide content of 98%) which was molded by putting a combined agent into silver oxide, and a separator of polyethylene and a separator of cellophane were set in place.

Next, a gasket of specially prepared polypropylene for allowing hydrogen to penetrate was pushed and fitted into the positive electrode can, and an impregnating agent, a gelling agent, zinc powder, an inhibitor and the like were added. The remainder of the electrolyte solution was added dropwise, and then a negative electrode can was set in place to perform sealing resulting in the manufacture of a button type silver oxide battery.

The electrolyte solution was prepared in which a base was prepared by making a solution in which potassium hydroxide was 30% by weight and zinc oxide was added up to approximate saturation in the case of the potassium hydroxide series, or a solution in which sodium hydroxide was 25% by weight and zinc oxide was added up to approximate saturation in the case of the sodium hydroxide series, and the inhibitor was optionally added thereto. The amount of inhibitor added was 1000 ppm with respect to the zinc weight, and it was dissolved in the electrolyte solution.

Ten pieces of the manufactured coin or button silver oxide batteries were placed into a vessel made of glass filled with liquid paraffin in a high temperature tank, a collecting tube having graduations at the upper portion was attached, and the amount of generated hydrogen was measured. In this state, the vessel was maintained at 60° C. for 20 days, which is said to correspond to a term of about 1 year, and the hydrogen gas generation amount and the self-discharge rate after 20 days were investigated. The battery capacity was measured by connecting a resistance of 25 Ω and having it discharge. The self-discharge rate was calculated from the change in the battery capacity before and after the storage at 60° C. for 20 days using the same kind of batteries.

The size of the coin or button silver oxide battery manufactured and evaluated, the content of metal in the zinc powder used, the electrolyte solution, the moisture amount, the inhibitor added, and the hydrogen generation amount and the self-discharge rate after the storage at 60° C. for 20 days are shown in Table 9 and Table 10.

generation amount per one day with respect to the zinc amount is shown at the right of each of the columns for 60° C. for 20 days and ordinary temperature for 1 year in the

TABLE 9

Hydrogen evolution rate and self-discharge rate of cell

| Experi-mental No. | Cell type | Composition added metal (ppm vs zinc) | | | | | Electro-lyte | Amount of water added to zinc of 1 mg | Inhibitor | After 20 days storage at 60° C. | | After 1 year storage at room temperature | |
|---|---|---|---|---|---|---|---|---|---|---|---|---|---|
| | | Ga | In | Pb | Bi | Al | | | | Hydrogen evolution rate µl/g/day | Self-discharge rate % | Hydrogen evolution rate µl/g/day | Self-discharge rate % |
| 1 | SR626 | | 500 | 500 | 500 | | NaOH | 0.448 | — | 0.37 | 3.00 | 0.00 | 3.10 |
| 2 | SR626 | | 500 | 500 | 500 | | KOH | 0.428 | — | 0.39 | 2.50 | 0.00 | 2.50 |
| 3 | SR626 | | | 500 | 500 | | NaOH | 0.448 | — | 0.41 | 2.70 | 0.00 | 2.60 |
| 4 | SR626 | | | 500 | 500 | | KOH | 0.428 | — | 0.47 | 2.40 | 0.00 | 2.50 |
| 5 | SR626 | 100 | 200 | 500 | | 450 | NaOH | 0.448 | — | 0.40 | 2.50 | 0.00 | 2.60 |
| 6 | SR626 | 100 | 200 | 500 | | 450 | KOH | 0.428 | — | 0.46 | 2.60 | 0.00 | 2.60 |
| 7 | SR621 | | 500 | 500 | 500 | | NaOH | 0.459 | — | 0.38 | 2.10 | 0.00 | 2.10 |
| 8 | SR621 | | 500 | 500 | 500 | | KOH | 0.440 | — | 0.40 | 3.10 | 0.00 | 3.30 |
| 9 | SR621 | | | 500 | 500 | | NaOH | 0.459 | — | 0.43 | 2.80 | 0.00 | 2.70 |
| 10 | SR621 | | | 500 | 500 | | KOH | 0.440 | — | 0.45 | 2.70 | 0.00 | 2.70 |
| 11 | SR516 | | 500 | 500 | 500 | | NaOH | 0.476 | — | 0.35 | 2.80 | 0.00 | 2.70 |
| 12 | SR516 | | 500 | 500 | 500 | | KOH | 0.455 | — | 0.37 | 2.80 | 0.00 | 2.60 |
| 13 | SR516 | | | 500 | 500 | | NaOH | 0.476 | — | 0.41 | 2.90 | 0.00 | 2.50 |
| 14 | SR516 | | | 500 | 500 | | KOH | 0.455 | — | 0.45 | 3.00 | 0.00 | 2.90 |
| 15 | SR527 | | 500 | 500 | 500 | | NaOH | 0.488 | — | 0.38 | 2.70 | 0.00 | 2.80 |
| 16 | SR527 | | 500 | 500 | 500 | | KOH | 0.463 | — | 0.39 | 2.60 | 0.00 | 2.60 |
| 17 | SR527 | | | 500 | 500 | | NaOH | 0.488 | — | 0.43 | 2.50 | 0.00 | 2.40 |
| 18 | SR527 | | | 500 | 500 | | KOH | 0.463 | — | 0.47 | 2.70 | 0.00 | 2.60 |
| 19 | SR726 | | 500 | 500 | 500 | | NaOH | 0.441 | — | 0.35 | 2.10 | 0.00 | 2.50 |

TABLE 10

Hydrogen evolution rate and self-discharge rate of cell

| Experi-mental No. | Cell type | Composition added metal (ppm vs zinc) | | | | | Electro-lyte | Amount of water added to zinc of 1 mg | Inhibitor | After 20 days storage at 60° C. | | After 1 year storage at room temperature | |
|---|---|---|---|---|---|---|---|---|---|---|---|---|---|
| | | Ga | In | Pb | Bi | Al | | | | Hydrogen evolution rate µl/g/day | Self-discharge rate % | Hydrogen evolution rate µl/g/day | Self-discharge rate % |
| 20 | SR726 | | 500 | 500 | 500 | | KOH | 0.423 | — | 0.36 | 1.50 | 0.00 | 2.00 |
| 21 | SR726 | | | 500 | 500 | | NaOH | 0.441 | — | 0.37 | 1.90 | 0.00 | 1.80 |
| 22 | SR726 | | | 500 | 500 | | KOH | 0.423 | — | 0.45 | 2.20 | 0.00 | 2.10 |
| 23 | SR1120 | | 500 | 500 | 500 | | NaOH | 0.441 | — | 0.35 | 1.90 | 0.00 | 2.10 |
| 24 | SR1120 | | 500 | 500 | 500 | | KOH | 0.423 | — | 0.34 | 2.60 | 0.00 | 2.10 |
| 25 | SR1120 | | | 500 | 500 | | NaOH | 0.441 | — | 0.37 | 2.30 | 0.00 | 2.20 |
| 26 | SR1120 | | | 500 | 500 | | KOH | 0.423 | — | 0.38 | 2.40 | 0.00 | 2.50 |
| 27 | SR626 | | 500 | 500 | 500 | | NaOH | 0.448 | Indium sulfate | 0.33 | 2.50 | 0.00 | 2.50 |
| 28 | SR626 | | 500 | 500 | 500 | | KOH | 0.428 | Indium sulfate | 0.35 | 2.30 | 0.00 | 2.60 |
| 29 | SR626 | | | 500 | 500 | | NaOH | 0.448 | Indium sulfate | 0.38 | 2.70 | 0.00 | 2.50 |
| 30 | SR626 | | | 500 | 500 | | KOH | 0.428 | Indium sulfate | 0.42 | 2.80 | 0.00 | 2.90 |
| 31 | SR626 | 100 | 200 | 500 | | 450 | NaOH | 0.448 | Indium sulfate | 0.37 | 2.70 | 0.00 | 2.70 |
| 32 | SR626 | 100 | 200 | 500 | | 450 | KOH | 0.428 | Indium sulfate | 0.41 | 2.80 | 0.00 | 2.80 |
| 33 | SR626 | | | 500 | | | NaOH | 0.448 | Indium sulfate | 0.39 | 2.80 | 0.00 | 2.70 |
| 34 | SR626 | | | 500 | | | KOH | 0.428 | Indium sulfate | 0.42 | 2.60 | 0.00 | 2.60 |
| 35 | SR626 | | | 500 | | | NaOH | 0.448 | Indium sulfamate | 0.42 | 2.70 | 0.00 | 2.50 |
| 36 | SR626 | | | 500 | | | KOH | 0.428 | Indium sulfamate | 0.45 | 2.70 | 0.00 | 2.40 |
| 37 | SR626 | | | 500 | | | NaOH | 0.448 | PbO | 0.42 | 2.50 | 0.00 | 2.90 |
| 38 | SR626 | | | 500 | | | KOH | 0.428 | PbO | 0.44 | 2.50 | 0.00 | 2.20 |

In Table 9 and Table 10, with respect to the added metal composition, the weight of zinc is expressed by ppm. The moisture amount is represented in terms of how many mg of water was contained with respect to 1 mg of zinc. The unit for the hydrogen generation amount is µ/g/day, the hydrogen table, and the unit for the self-discharge rate is shown by %. In sulfate indicates indium sulfate, In-sulfamate indicates indium sulfamate, and PbO indicates lead oxide. It is understood that all are suppressed to be not more than 0.03 µL/g/day when the hydrogen generation amount is calculated into a value at ordinary temperature. In addition, it was also possible to make the self-discharge rate to be not more than 4%/year.

Embodiment 19

In order to know whether or not the storage at 60° C. for 20 days in Embodiment 18 corresponds to 1 year at ordinary temperature, a test for 1 year was actually performed.

The gasket used in Embodiment 18 was exchanged into one made of nylon being used in ordinary production of silver oxide batteries, and coin or button silver oxide batteries were manufactured in the same manner. Ten pieces of the manufactured silver oxide batteries were placed into a vessel made of glass filled with liquid paraffin in a high temperature tank maintained at 25° C., and a collecting tube for generating hydrogen gas was attached at the upper portion. This state was maintained for 1 year, and the hydrogen generation amount and the self-discharge rate after 1 year were investigated. The measurement method was the same as that in Embodiment 18. Results of the hydrogen generation amount and the self-discharge rate are shown at the right ends in Table 9 and Table 10.

As a result of the test, no gas generation was observed in any sample. This is considered to be due to the fact that a minute amount of hydrogen generated in the battery was consumed by the reduction of silver oxide. The self-discharge rate was substantially the same as those preserved at 60° C. for 20 days, and all had self-discharge values of not more than 4%.

Embodiment 20

As for the electrolyte solution, in the case of the potassium hydroxide series, zinc oxide was added to potassium hydroxide up to approximate saturation was used. The amount of added electrolyte solution per 1 mg of zinc was changed from 0.37 to 0.96 mg which was from 0.25 to 0.65 mg as calculated into the amount of water, using zinc containing 500 ppm of each of indium, lead and bismuth and a gasket of polypropylene in the same manner as Embodiment 18, a silver oxide battery of the SR626 size was made, and the storage test was performed at 60° C. for 20 days.

Figure 9:
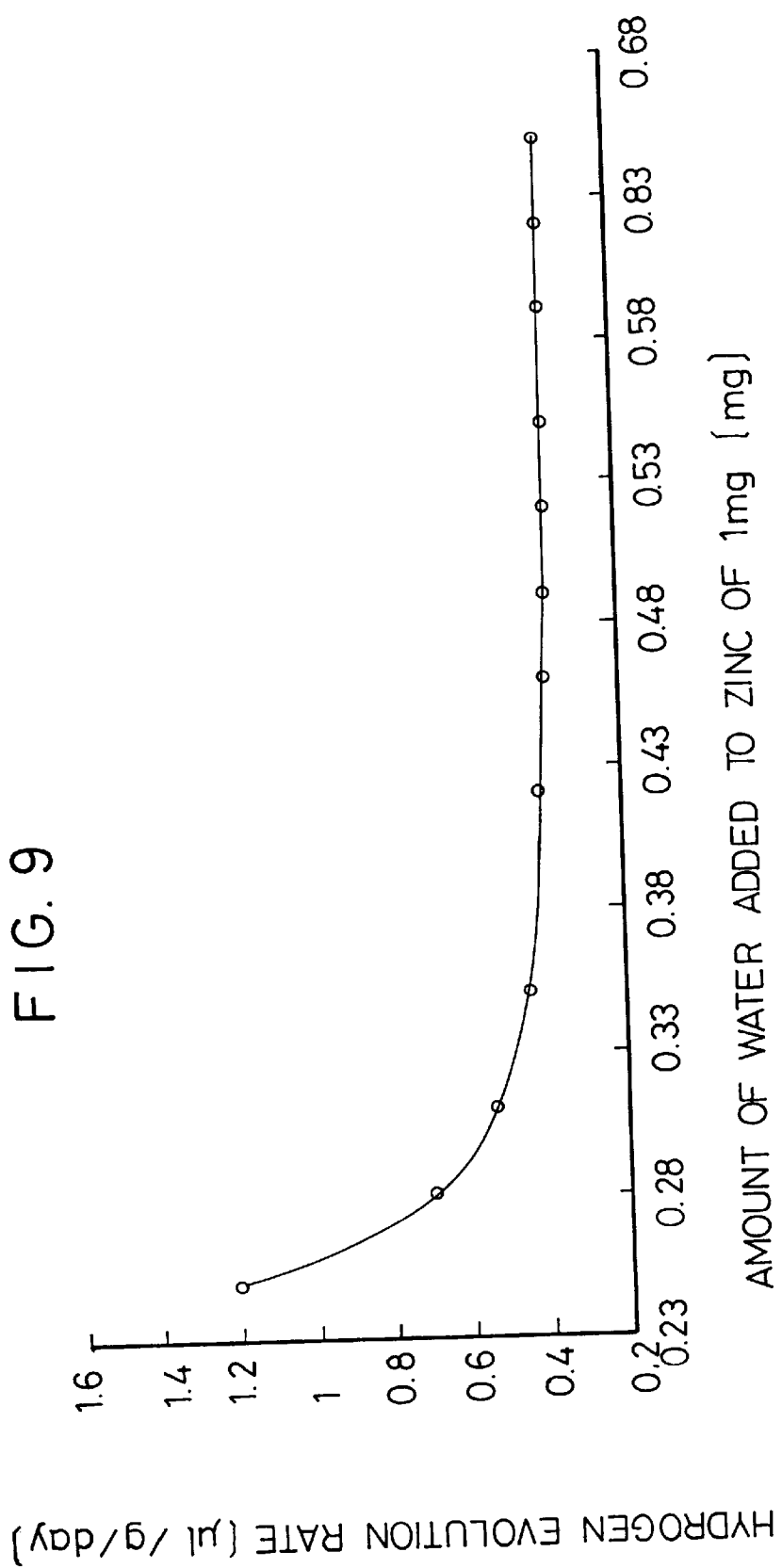
FIG. 9 shows the hydrogen generation amount with respect to the amount of water added per 1 mg of zinc when the electrolyte solution of the potassium hydroxide type is used.

The hydrogen generation amount with respect to the added amount of water is shown in FIG. 9. The hydrogen generation amount indicates an amount generated from 1 g of zinc per one day, and the unit is $\mu$L/g/day. According to the result, it is understood that when the amount of water is not less than 0.31 mg, the hydrogen generation amount is lowered to not more than 0.54 $\mu$L/g/day (0.03 $\mu$L/g/day as calculated into a value at ordinary temperature). In addition, when the amount of water was not less than 0.57 mg, the occurrence of liquid leakage was observed.

Figure 10:
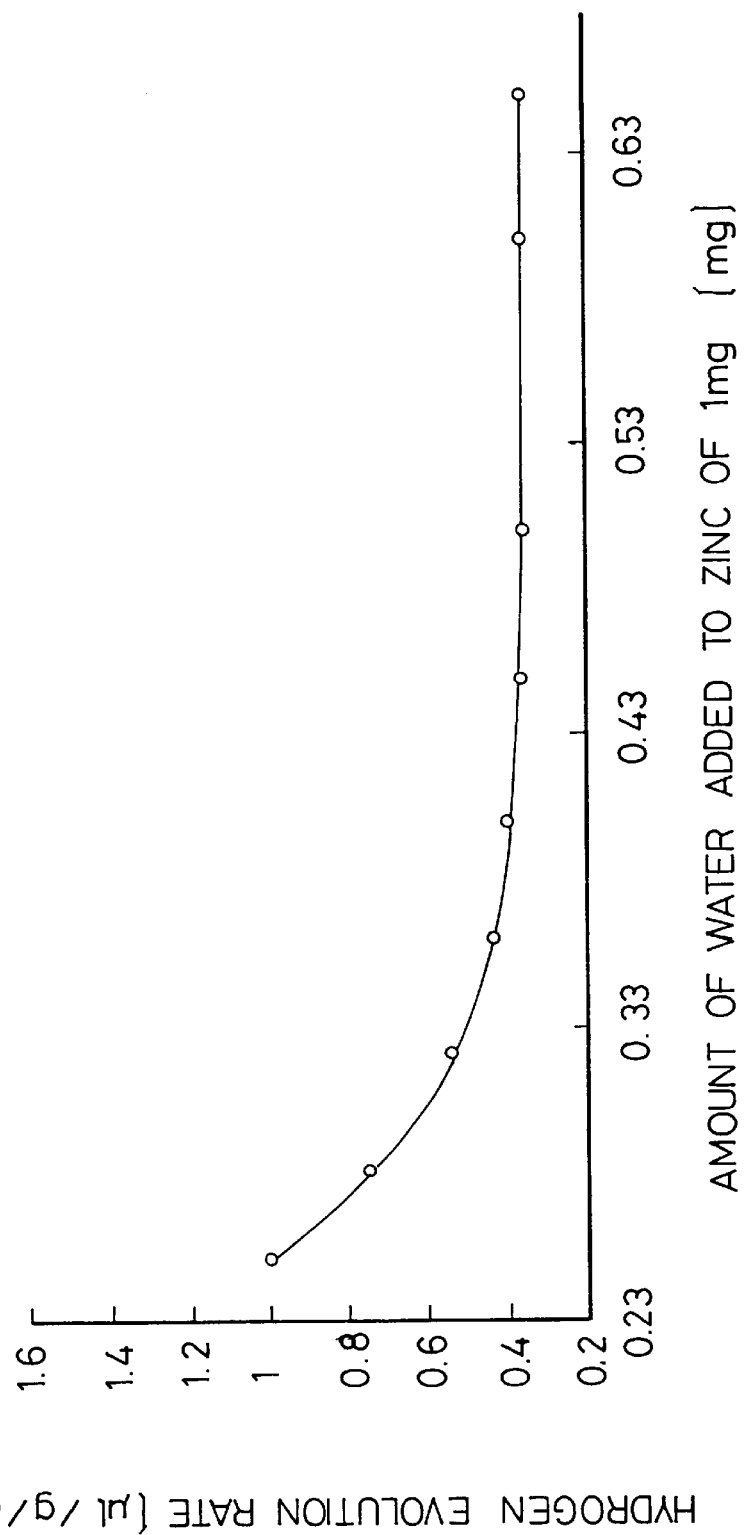
FIG. 10 shows the hydrogen generation amount with respect to the amount of water added per 1 mg of zinc when the electrolyte solution of the sodium hydroxide type is used.

In the same manner. When an electrolyte solution of the sodium hydroxide series was used, the amount of the electrolyte solution added per 1 mg of zinc was changed from 0.36 to 0.92 mg which is from 0.25 to 0.65 mg when it is calculated into the amount of water, and the storage test was performed at 60° C. for 20 days. A result is shown in FIG. 10. It is understood that when the amount of water is not less than 0.32 mg, the hydrogen generation amount is lowered to not more than 0.54 $\mu$L/g/day. In addition, when the amount of water became not less than 0.59 mg, the occurrence of liquid leakage was observed.

Namely, it is desirable that the amount of water to be added per 1 mg of zinc is 0.31–0.57 mg when the electrolyte solution is the potassium hydroxide series and 0.32–0.59 mg when it is the sodium hydroxide series.

Embodiment 21

In order to know whether or not there is actually a problem in the range of the amount of water in which the hydrogen generation is not more than 0.54 $\mu$L/g/day and there is no liquid leakage in Embodiment 20, the storage test at ordinary temperature for 1 year was performed and tried using the method in Embodiment 19. In the case of the potassium hydroxide series, the electrolyte solution was added in an amount such that the amount of water added per 1 mg of zinc became 0.31, 0.44 and 0.57 mg. In the same manner, in the case of the sodium hydroxide series, the electrolyte solution was added so that the amount of water became 0.32, 0.45 and 0.59 mg. A nylon gasket was used in the same manner as Embodiment 20, and 10 pieces of silver oxide batteries were manufactured, respectively. According to the results of the storage test at ordinary temperature for 1 year for the manufactured silver oxide batteries, there was no hydrogen generation, the self-discharge rates were also not more than 4% for all batteries, and it has been found that there is no practical problem.

In accordance with Embodiments 22–24, the effect of the case in which each technique is combined will be explained.

Before actually investigating characteristics with batteries, a specially prepared test tube was used to investigate the amount of hydrogen gas generated from each of the inhibitors and the plated copper plates. The method therefor will be described hereinafter.

Into the specially prepared test tube having a volume of 25 ml and graduated to determine the gas generation amount there was placed 2 g of zinc powder containing 500 ppm of each of bismuth, indium and lead manufactured by the atomization method and a copper piece of the same material as a collector having an area of 0.6 cm$^2$ and a thickness of 0.1 mm. An electrolyte solution to be tested was added thereto to heat to 60° C. and the volume of generated hydrogen gas was measured for 7 days. The number of test repetitions was 10, and an average value thereof was used as a result. The electrolyte solution was prepared by making a solution in which potassium hydroxide was 30% by weight and zinc oxide was added up to approximate saturation in the case of the potassium hydroxide series, or a solution in which sodium hydroxide was 25% by weight and zinc oxide was added up to approximate saturation in the case of the sodium hydroxide series as a base. An inhibitor was optionally added thereto.

Embodiment 22

The hydrogen generation from zinc was measured by the combination of a copper plate coated by electric plating and the substitution plating and the inhibitor. The plating treatment is shown hereinafter.

* Indium (In) plating
  method: electric plating
  plating bath: 25° C.
    : indium sulfate 60 g/l
    : sodium sulfate 10 g/l
  plating film thickness: 0.3 $\mu$m
* Tin (Sn) plating
  method: electric plating
  plating bath: 70° C.
    : potassium stannate 100 g/l
    : potassium hydroxide 15 g/l
    : potassium acetate 5 g/l plating film thickness: 0.3 μm
* zinc indium (Zn—In) plating
method: contact plating (copper plate and zinc are placed into the following plating bath heated to 60° C. and left for 1 hour)
plating bath: KOH 30%
: ZnO saturation
: indium sulfate 0.3%
plating film thickness: 0.3 μm The type of plating performed onto the copper plate and the hydrogen gas generation measurement result with respect to the inhibitor used are show for the case in which an electrolyte solution of the KOH series was used in Table 11 and that of the NaOH type was used in Table 12.

TABLE 11

Hydrogen evolution rate with plated copper plate

| Experimental No. | Kind of plating | Electrolyte | Inhibitor (concentration: 100 ppm) | Hydrogen evolution rate μL/g/day |
|---|---|---|---|---|
| 1 | In | KOH | — | 31.43 |
| 2 | In | KOH | Indium sulfate | 14.28 |
| 3 | In | KOH | Indium sulfamate | 12.41 |
| 4 | In | KOH | Indium hydroxide | 16.73 |
| 5 | In | KOH | Lead oxide | 17.85 |
| 6 | In | KOH | Barium hydroxide | 8.57 |
| 7 | In | KOH | Carbon fluoride.POE | 12.14 |
| 8 | Sn | KOH | — | 35.78 |
| 9 | Sn | KOH | Indium sulfate | 16.11 |
| 10 | Sn | KOH | Indium sulfamate | 17.72 |
| 11 | Sn | KOH | Indium hydroxide | 16.53 |
| 12 | Sn | KOH | Lead oxide | 17.91 |
| 13 | Sn | KOH | Barium hydroxide | 10.89 |
| 14 | Sn | KOH | Carbon fluoride.POE | 14.38 |
| 15 | Zn.In | KOH | — | 32.34 |
| 16 | Zn.In | KOH | Indium sulfate | 15.27 |
| 17 | Zn.In | KOH | Indium sulfamate | 13.35 |
| 18 | Zn.In | KOH | Indium hydroxide | 18.83 |
| 19 | Zn.In | KOH | Lead oxide | 16.82 |
| 20 | Zn.In | KOH | Barium hydroxide | 11.30 |
| 21 | Zn.In | KOH | Carbon fluoride.POE | 13.01 |

TABLE 12

Hydrogen evolution rate with plated copper plate

| Experimental No. | Kind of plating | Electrolyte | Inhibitor (concentration: 100 ppm) | Hydrogen evolution rate μL/g/day |
|---|---|---|---|---|
| 22 | In | NaOH | — | 29.41 |
| 23 | In | NaOH | Indium sulfate | 14.75 |
| 24 | In | NaOH | Indium sulfamate | 10.58 |
| 25 | In | NaOH | Indium hydroxide | 15.37 |
| 26 | In | NaOH | Lead oxide | 14.14 |
| 27 | In | NaOH | Barium hydroxide | 7.82 |
| 28 | In | NaOH | Carbon fluoride.POE | 9.34 |
| 29 | Sn | NaOH | — | 30.10 |
| 30 | Sn | NaOH | Indium sulfate | 15.03 |
| 31 | Sn | NaOH | Indium sulfamate | 15.28 |
| 32 | Sn | NaOH | Indium hydroxide | 15.38 |
| 33 | Sn | NaOH | Lead oxide | 14.53 |
| 34 | Sn | NaOH | Barium hydroxide | 8.72 |
| 35 | Sn | NaOH | Carbon fluoride.POE | 12.43 |
| 36 | Zn.In | NaOH | — | 32.83 |
| 37 | Zn.In | NaOH | Indium sulfate | 14.98 |
| 38 | Zn.In | NaOH | Indium sulfamate | 13.19 |
| 39 | Zn.In | NaOH | Indium hydroxide | 14.13 |
| 40 | Zn.In | NaOH | Lead oxide | 14.27 |

TABLE 12-continued

Hydrogen evolution rate with plated copper plate

| Experimental No. | Kind of plating | Electrolyte | Inhibitor (concentration: 100 ppm) | Hydrogen evolution rate μL/g/day |
|---|---|---|---|---|
| 41 | Zn.In | NaOH | Barium hydroxide | 9.98 |
| 42 | Zn.In | NaOH | Carbon fluoride.POE | 9.84 |

The concentration of the inhibitor is shown by a value with respect to the electrolyte solution. As the surfactant of the fluorocarbon(carbon fluoride)-polyoxyethylene (POE) series, one having a carbon number of fluorocarbon of 10 and a polymerization degree of POE of 50 was used. Usually, the same effect can be obtained if one having a carbon number of fluorocarbon of 4–20 and a polymerization degree of POE of 30–100 is used.

Figure 11:
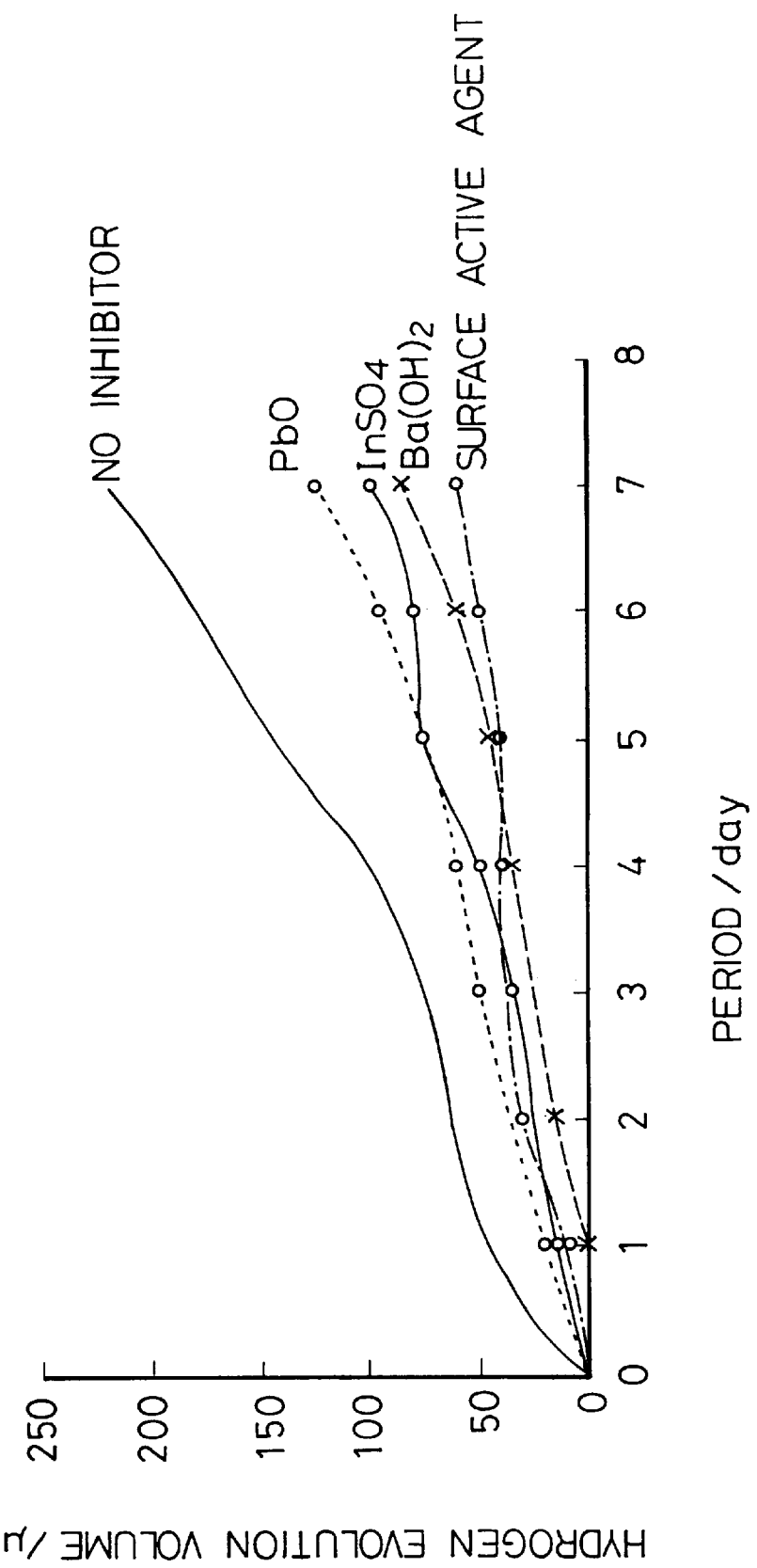
FIG. 11 shows the generation amount of hydrogen gas with respect to days passed when the inhibitor of the present invention is added to the plated copper plate.

As compared with the Embodiment in which no inhibitor is added, in the Embodiment in which the inhibitor of the present invention is added, the hydrogen gas generation amount decreases from about 1/3 to 112, and it is understood that there is an effect in relation to suppression of the hydrogen gas generation. The difference due to the plating or the inhibitor is not presented so much. In addition, the hydrogen gas generation amount with respect to the number of test days is shown in FIG. 11 as for the case in which indium plated copper plates are used. As for the indium compound, only indium sulfate is shown in the figure.

In the present Embodiment, the result of the case using one having a plating film thickness of 0.3 μm has been shown, however, in practice, also when one having a film thickness of 0.1–1 μm was used, there was little difference in the result.

Figure 12:
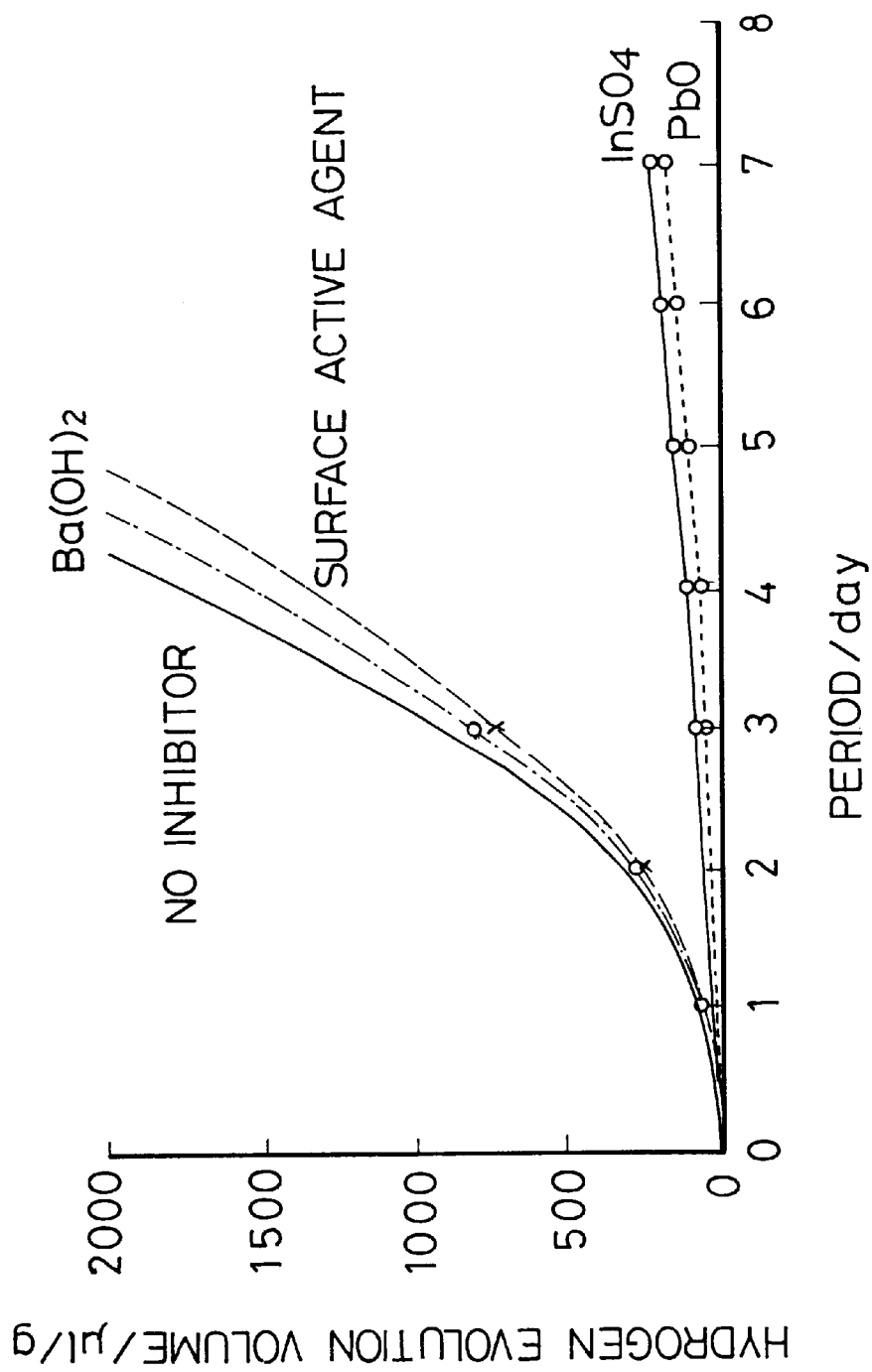
FIG. 12 shows the generation amount of hydrogen gas with respect to days passed when the inhibitor of the present invention is added to the non-plated copper plate.

COMPARATIVE EXAMPLE 2 comparison, an experiment was performed using non-plates in the same procedure as Embodiment 22. Experiment results are shown in Table 13 and FIG. 12.

TABLE 13

Hydrogen evolution rate with unplated copper plate

| Example No. | Electrolyte | Inhibitor (concentration: 100 ppm) | Hydrogen evolution rate μL/g/day |
|---|---|---|---|
| 1 | KOH | — | 516.00 |
| 2 | KOH | Indium sulfate | 30.56 |
| 3 | KOH | Indium sulfamate | 28.73 |
| 4 | KOH | Indium hydroxide | 29.07 |
| 5 | KOH | Lead oxide | 24.15 |
| 8 | KOH | Barium hydroxide | 480.32 |
| 7 | KOH | Carbon fluoride.POE | 465.29 |
| 8 | NaOH | — | 450.24 |
| 9 | NaOH | Indium sulfate | 25.86 |
| 10 | NaOH | Indium sulfamate | 27.59 |
| 11 | NaOH | Indium hydroxide | 25.48 |
| 12 | NaOH | Lead oxide | 20.25 |
| 13 | NaOH | Barium hydroxide | 400.44 |
| 14 | NaOH | Carbon fluoride.POE | 392.91 |

It is understood that in the case in which no inhibitor is added and barium hydroxide or the surfactant of the fluorocarbon-polyoxyethylene series is added, the hydrogen gas generation amount increases exponentially with respect to the number of test days. On the other hand, is understood that in the case where indium sulfate and lead oxide are added, the generation of hydrogen gas is suppressed. This is due to the fact that the compound of indium or lead function to coat the copper plate, but barium hydroxide and the surfactant have function.

Embodiment 23

Using a copper plate plated in the same manner as Embodiment 22, the hydrogen gas generation in the case where inhibitors have been combined was measured using an electrolyte solution of the KOH series. Results are show in Table 14.

TABLE 14

Hydrogen evolution rate with indium plated copper plate and inhibitor

| Experi-mental No. | Concentration of inhibitor ppm | | | | Hydrogen evolution rate $\mu L/g/day$ |
|---|---|---|---|---|---|
| | Indium sulfate | Lead oxide | Indium hydroxide | Carbon fluoride.POE | |
| 43 | 100 | 100 | 0 | 0 | 15.82 |
| 44 | 100 | 0 | 100 | 0 | 10.10 |
| 45 | 100 | 0 | 0 | 100 | 13.41 |
| 46 | 0 | 100 | 100 | 0 | 14.64 |
| 47 | 0 | 100 | 0 | 100 | 15.54 |
| 48 | 0 | 0 | 100 | 100 | 12.47 |
| 49 | 100 | 100 | 100 | 0 | 14.87 |
| 50 | 100 | 100 | 0 | 100 | 12.21 |
| 51 | 100 | 0 | 100 | 100 | 13.05 |
| 52 | 100 | 100 | 100 | 100 | 13.94 |

In the column for the inhibitor in the table, the concentration of each inhibitor added to the electrolyte solution with respect to the electrolyte solution is shown. It is understood that the hydrogen gas generation is of a low level similar to the foregoing Embodiments, and there is no substantial bad effect even when a plurality of inhibitors are used.

Next, a battery was actually manufactured, and the effects of the plating on the collector and the inhibitor were investigated.

Embodiment 24

Into appositive electrode can were added a part of an electrolyte solution and 116 mg of a pellet (silver oxide content of 98%) which was molded by putting a combined agent into which silver oxide, and a separator of polyethylene and a separator of cellophane were set in place. Next, a gasket of nylon was pushed and fitted into the positive electrode can, and an impregnating agent, a gelling agent, and 30 mg of zinc powder were added. The remainder of the electrolyte solution was optionally added and an inhibitor was added dropwise. Then a negative electrode can was set in place to perform sealing to manufacture 100 pieces for every kind of button type silver oxide batteries.

The type and the film thickness of the plating onto the negative electrode can, the type and the concentration of added inhibitor, the closed circuit voltage and the discharge rate are shown in Tables 15 and 16.

TABLE 15

Characteristics of cell with KOH electrolyte

| Experi-mental No. | Kind of plating | Concentration of inhibitor ppm | | | | Self-discharge rate % | | Closed circuit voltage V | |
|---|---|---|---|---|---|---|---|---|---|
| | | Indium sulfate | Lead oxide | barium hydroxide | Cabon fluoride POE | Fresh cell | A part-discharged cell | Fresh cell | A part-discharged cell |
| 53 | — | 0 | 0 | 0 | 0 | 5.6 | 9.4 | 1.159 | 1.180 |
| 54 | In | 0 | 0 | 0 | 0 | 4.5 | 6.2 | 1.165 | 1.192 |
| 55 | In | 1000 | 0 | 0 | 0 | 2.6 | 2.7 | 1.169 | 1.198 |
| 56 | In | 0 | 1000 | 0 | 0 | 2.7 | 2.8 | 1.168 | 1.197 |
| 57 | In | 0 | 0 | 1000 | 0 | 2.5 | 4.9 | 1.185 | 1.198 |
| 58 | In | 0 | 0 | 0 | 1000 | 2.9 | 5.1 | 1.165 | 1.185 |
| 59 | In | 1000 | 1000 | 0 | 0 | 2.5 | 2.6 | 1.168 | 1.198 |
| 60 | In | 1000 | 0 | 1000 | 0 | 2.4 | 2.6 | 1.185 | 1.239 |
| 61 | In | 1000 | 0 | 0 | 1000 | 2.5 | 2.7 | 1.168 | 1.198 |
| 62 | In | 0 | 1000 | 0 | 1000 | 2.6 | 2.7 | 1.167 | 1.197 |
| 63 | In | 0 | 1000 | 1000 | 0 | 2.7 | 2.7 | 1.167 | 1.238 |
| 64 | In | 0 | 1000 | 1000 | 1000 | 2.6 | 2.6 | 1.186 | 1.238 |
| 65 | In | 1000 | 1000 | 1000 | 0 | 2.6 | 2.7 | 1.186 | 1.129 |
| 66 | In | 1000 | 1000 | 0 | 1000 | 2.7 | 2.7 | 1.168 | 1.198 |
| 67 | In | 1000 | 0 | 1000 | 1000 | 2.6 | 2.6 | 1.185 | 1.238 |
| 68 | In | 1000 | 1000 | 1000 | 1000 | 2.6 | 2.7 | 1.185 | 1.238 |
| 69 | Sn | 0 | 0 | 0 | 0 | 5.7 | 10.5 | 1.160 | 1.181 |
| 70 | Sn | 1000 | 0 | 0 | 0 | 4.7 | 6.8 | 1.166 | 1.193 |
| 71 | Sn | 0 | 1000 | 0 | 0 | 2.7 | 2.7 | 1.171 | 1.198 |
| 72 | Sn | 0 | 0 | 1000 | 0 | 2.7 | 2.8 | 1.170 | 1.198 |
| 73 | Sn | 0 | 0 | 0 | 1000 | 2.6 | 5.0 | 1.186 | 1.197 |
| 74 | Sn | 1000 | 1000 | 0 | 0 | 3.0 | 5.3 | 1.165 | 1.187 |
| 75 | Sn | 1000 | 0 | 1000 | 0 | 2.6 | 2.7 | 1.169 | 1.199 |
| 76 | Sn | 1000 | 0 | 0 | 1000 | 2.4 | 2.5 | 1.187 | 1.240 |
| 77 | Sn | 0 | 1000 | 0 | 1000 | 2.4 | 2.8 | 1.169 | 1.200 |
| 78 | Sn | 0 | 1000 | 1000 | 0 | 2.5 | 2.6 | 1.168 | 1.197 |
| 79 | Sn | 0 | 1000 | 1000 | 1000 | 2.7 | 2.8 | 1.169 | 1.240 |
| 80 | Sn | 1000 | 1000 | 1000 | 0 | 2.5 | 2.8 | 1.188 | 1.240 |
| 81 | Sn | 1000 | 1000 | 0 | 1000 | 2.8 | 2.8 | 1.186 | 1.131 |

TABLE 15-continued

Characteristics of cell with KOH electrolyte

| Experi-mental No. | Kind of plating | Concentration of inhibitor ppm ||||  Self-discharge rate % || Closed circuit voltage V ||
|---|---|---|---|---|---|---|---|---|---|
| | | Indium sulfate | Lead oxide | barium hydroxide | Cabon fluoride POE | Fresh cell | A part-discharged cell | Fresh cell | A part-discharged cell |
| 82 | Sn | 1000 | 0 | 1000 | 1000 | 2.8 | 2.8 | 1.170 | 1.199 |
| 83 | Sn | 1000 | 1000 | 1000 | 1000 | 2.7 | 2.6 | 1.186 | 1.239 |
| 84 | Zn.In | 0 | 0 | 0 | 0 | 5.7 | 9.8 | 1.166 | 1.193 |
| 85 | Zn.In | 1000 | 0 | 0 | 0 | 4.9 | 7.1 | 1.170 | 1.199 |
| 86 | Zn.In | 0 | 1000 | 0 | 0 | 2.8 | 2.7 | 1.170 | 1.197 |
| 87 | Zn.In | 0 | 0 | 1000 | 0 | 2.9 | 2.9 | 1.187 | 1.199 |
| 88 | Zn.In | 0 | 0 | 0 | 1000 | 2.6 | 4.8 | 1.166 | 1.184 |
| 89 | Zn.In | 1000 | 1000 | 0 | 0 | 2.9 | 5.3 | 1.168 | 1.200 |
| 90 | Zn.In | 1000 | 0 | 1000 | 0 | 2.6 | 2.7 | 1.186 | 1.240 |
| 91 | Zn.In | 1000 | 0 | 0 | 1000 | 2.6 | 2.7 | 1.170 | 1.199 |
| 92 | Zn.In | 0 | 1000 | 0 | 1000 | 2.6 | 2.9 | 1.168 | 1.199 |
| 93 | Zn.In | 0 | 1000 | 1000 | 0 | 2.7 | 2.7 | 1.168 | 1.238 |
| 94 | Zn.In | 0 | 1000 | 1000 | 1000 | 2.9 | 2.9 | 1.188 | 1.240 |
| 95 | Zn.In | 1000 | 1000 | 1000 | 0 | 2.8 | 2.8 | 1.188 | 1.131 |
| 96 | Zn.In | 1000 | 1000 | 0 | 1000 | 2.6 | 2.9 | 1.168 | 1.200 |
| 97 | Zn.In | 1000 | 0 | 1000 | 1000 | 2.9 | 2.8 | 1.187 | 1.239 |
| 98 | Zn.In | 1000 | 1000 | 1000 | 1000 | 2.7 | 2.7 | 1.186 | 1.239 |

TABLE 16

Characteristics of cell with NaOH electrolyte

| Experi-mental No. | Kind of plating | Concentration of inhibitor ppm |||| Self-discharge rate % || Closed circuit voltage V ||
|---|---|---|---|---|---|---|---|---|---|
| | | Indium sulfate | Lead oxide | barium hydroxide | Cabon fluoride POE | Fresh cell | A part-discharged cell | Fresh cell | A part-discharged cell |
| 99 | — | 0 | 0 | 0 | 0 | 5.3 | 9.0 | 1.158 | 1.180 |
| 100 | In | 0 | 0 | 0 | 0 | 4.2 | 5.9 | 1.164 | 1.193 |
| 101 | In | 1000 | 0 | 0 | 0 | 2.2 | 2.3 | 1.169 | 1.199 |
| 102 | In | 0 | 1000 | 0 | 0 | 2.2 | 2.4 | 1.167 | 1.197 |
| 103 | In | 0 | 0 | 1000 | 0 | 2.2 | 4.6 | 1.187 | 1.199 |
| 104 | In | 0 | 0 | 0 | 1000 | 2.5 | 4.8 | 1.166 | 1.186 |
| 105 | In | 1000 | 1000 | 0 | 0 | 2.1 | 2.3 | 1.169 | 1.199 |
| 106 | In | 1000 | 0 | 1000 | 0 | 1.9 | 2.2 | 1.186 | 1.239 |
| 107 | In | 1000 | 0 | 0 | 1000 | 2.0 | 2.5 | 1.169 | 1.197 |
| 108 | In | 0 | 1000 | 0 | 1000 | 2.3 | 2.6 | 1.169 | 1.196 |
| 109 | In | 0 | 1000 | 1000 | 0 | 2.3 | 2.2 | 1.169 | 1.238 |
| 110 | In | 0 | 1000 | 1000 | 1000 | 2.0 | 2.1 | 1.187 | 1.237 |
| 111 | In | 1000 | 1000 | 1000 | 0 | 2.4 | 2.4 | 1.186 | 1.131 |
| 112 | In | 1000 | 1000 | 0 | 1000 | 2.4 | 2.3 | 1.170 | 1.198 |
| 113 | In | 1000 | 0 | 1000 | 1000 | 2.3 | 2.0 | 1.187 | 1.239 |
| 114 | In | 1000 | 1000 | 1000 | 1000 | 2.2 | 2.5 | 1.186 | 1.237 |
| 115 | Sn | 0 | 0 | 0 | 0 | 5.5 | 10.2 | 1.160 | 1.183 |
| 116 | Sn | 1000 | 0 | 0 | 0 | 4.4 | 6.5 | 1.167 | 1.194 |
| 117 | Sn | 0 | 1000 | 0 | 0 | 2.4 | 2.3 | 1.173 | 1.199 |
| 118 | Sn | 0 | 0 | 1000 | 0 | 2.5 | 2.6 | 1.171 | 1.200 |
| 119 | Sn | 0 | 0 | 0 | 1000 | 2.4 | 4.7 | 1.186 | 1.197 |
| 120 | Sn | 1000 | 1000 | 0 | 0 | 2.7 | 5.0 | 1.166 | 1.186 |
| 121 | Sn | 1000 | 0 | 1000 | 0 | 2.2 | 2.5 | 1.170 | 1.201 |
| 122 | Sn | 1000 | 0 | 0 | 1000 | 2.1 | 2.3 | 1.187 | 1.241 |
| 123 | Sn | 0 | 1000 | 0 | 1000 | 2.2 | 2.5 | 1.170 | 1.201 |
| 124 | Sn | 0 | 1000 | 1000 | 0 | 2.2 | 2.2 | 1.167 | 1.198 |
| 125 | Sn | 0 | 1000 | 1000 | 1000 | 2.2 | 2.5 | 1.171 | 1.241 |
| 126 | Sn | 1000 | 1000 | 1000 | 0 | 2.3 | 2.6 | 1.189 | 1.242 |
| 127 | Sn | 1000 | 1000 | 0 | 1000 | 2.6 | 2.5 | 1.187 | 1.133 |
| 128 | Sn | 1000 | 0 | 1000 | 1000 | 2.6 | 2.3 | 1.172 | 1.200 |
| 129 | Sn | 1000 | 1000 | 1000 | 1000 | 2.4 | 2.4 | 1.186 | 1.239 |
| 130 | Zn.In | 0 | 0 | 0 | 0 | 5.3 | 9.5 | 1.168 | 1.194 |
| 131 | Zn.In | 1000 | 0 | 0 | 0 | 4.6 | 6.6 | 1.171 | 1.201 |
| 132 | Zn.In | 0 | 1000 | 0 | 0 | 2.4 | 2.5 | 1.172 | 1.198 |
| 133 | Zn.In | 0 | 0 | 1000 | 0 | 2.5 | 2.7 | 1.187 | 1.200 |
| 134 | Zn.In | 0 | 0 | 0 | 1000 | 2.3 | 4.6 | 1.168 | 1.185 |
| 135 | Zn.In | 1000 | 1000 | 0 | 0 | 2.6 | 5.0 | 1.170 | 1.200 |
| 136 | Zn.In | 1000 | 0 | 1000 | 0 | 2.3 | 2.3 | 1.188 | 1.241 |

TABLE 16-continued

Characteristics of cell with NaOH electrolyte

| Experimental No. | Kind of plating | Concentration of inhibitor ppm | | | | Self-discharge rate % | | Closed circuit voltage V | |
|---|---|---|---|---|---|---|---|---|---|
| | | Indium sulfate | Lead oxide | barium hydroxide | Cabon fluoride POE | Fresh cell | A part-discharged cell | Fresh cell | A part-discharged cell |
| 137 | Zn.In | 1000 | 0 | 0 | 1000 | 2.2 | 2.4 | 1.171 | 1.198 |
| 138 | Zn.In | 0 | 1000 | 0 | 1000 | 2.4 | 2.5 | 1.169 | 1.199 |
| 139 | Zn.In | 0 | 1000 | 1000 | 0 | 2.6 | 2.5 | 1.167 | 1.237 |
| 140 | Zn.In | 0 | 1000 | 1000 | 1000 | 2.7 | 2.6 | 1.187 | 1.242 |
| 141 | Zn.In | 1000 | 1000 | 1000 | 0 | 2.4 | 2.3 | 1.188 | 1.132 |
| 142 | Zn.In | 1000 | 1000 | 0 | 1000 | 2.6 | 2.7 | 1.167 | 1.201 |
| 143 | Zn.In | 1000 | 0 | 1000 | 1000 | 2.6 | 2.6 | 1.189 | 1.240 |
| 144 | Zn.In | 1000 | 1000 | 1000 | 1000 | 2.5 | 2.5 | 1.186 | 1.240 |

The inhibitor concentration in the table indicates a value with respect to the zinc weight. The measurement of the self-discharge rate was performed after maintaining it at 60° C. for 20 days, which is said to correspond to 1 year.

The self-discharge rate after partial discharge was measured by being left at 60° C. for 20 days after 50% depth discharge (partial discharge). The closed circuit voltage was measured at −10° C. before discharge and after partial discharge.

As compared with the Embodiments of no addition of inhibitors (Embodiments No. 54, 69 and 84 in Table 15 and Embodiments No. 100, 115 and 130 in Table 16), the Embodiments in which inhibitors have been have small self-discharge rates. With respect to the partial discharge, in the case of those added with one of the type for coating the negative electrode can which comprises copper, such as indium sulfate and lead monoxide, the self-discharge rate is improved. It is understood that the closed circuit voltage becomes high in those added with barium hydroxide. It is understood from the table that when the inhibitor of the coating type and barium hydroxide are added, the self-discharge rate before discharge, the self-discharge rate after partial discharge, and the closed circuit voltage are improved. In the present experiment, a behavior in which the closed circuit voltage after partial discharge becomes higher than that before discharge has been observed which is opposite to a case using mercurated zinc. The cause thereof is now under investigation.

The plating onto the negative electrode can was performed in the same manner as Embodiment 22, and results for each film thickness of 0.3 μm have been shown. There was little difference in the result even when those having a film thickness of 0.1–1 μm were used.

Further, with a battery manufactured using an electrolyte of the KOH type and a negative electrode can applied with indium plating, the self-discharge rate after a lapse corresponding to 1 year and the self-discharge rate after partial discharge with respect to the inhibitor concentration were measured.

Figure 13:
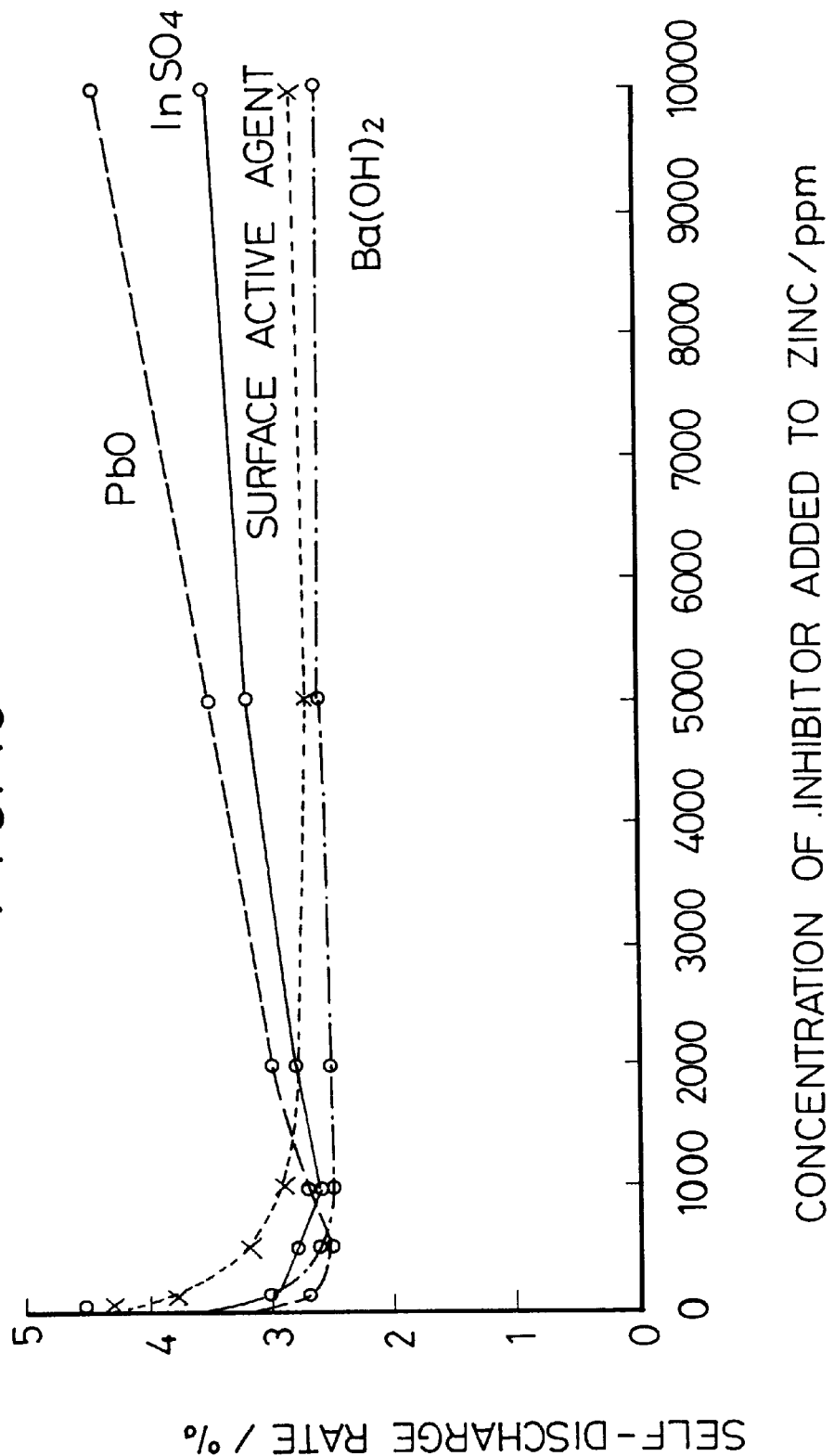
FIG. 13 shows the change in the self-discharge rate with respect to the inhibitor concentration.
Figure 14:
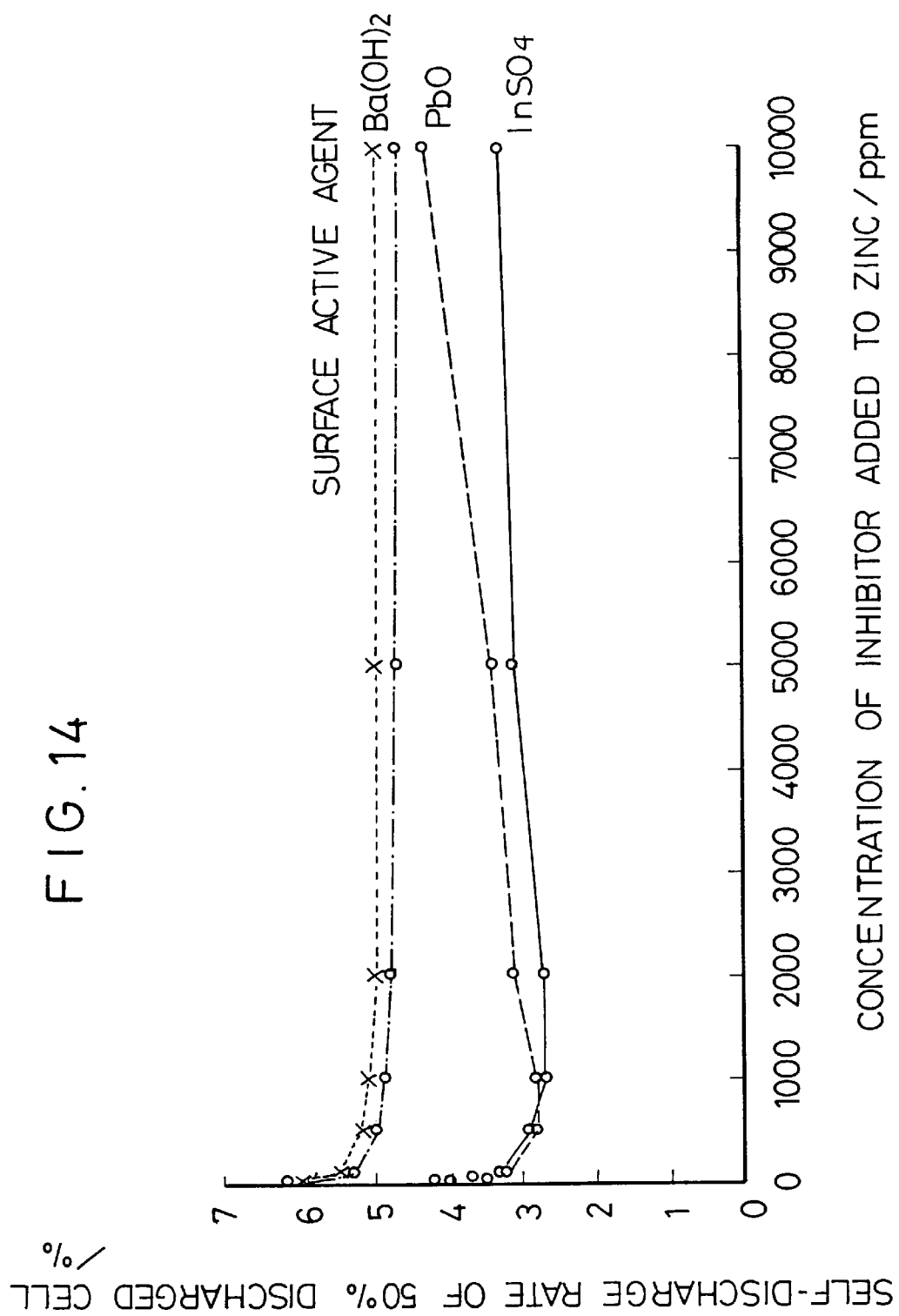
FIG. 14 shows the change in the self-discharge rate after 50% depth discharge with respect to the inhibitor concentration.

Results are shown in FIGS. 13 and 14. Provided that the practical range is not more than about 3% of the self-discharge rate, it has been found that the effect is provided for indium sulfate of 50–5000 ppm, for lead monoxide of 20–5000 ppm, for barium hydroxide of not less than 50 ppm, and for the fluorocarbon-polyoxyethylene type surfactant of not less than 100 ppm as the concentration with respect to zinc. With respect to the self-discharge rate after 50% depth discharge, the effect was provided for indium sulfate of 50–5000 ppm, and for lead monoxide of 20–5000 ppm. The effect is not provided so much after partial discharge for barium hydroxide, and the fluorocarbon-polyoxyethylene series surfactant. The result has been shown in the case of indium sulfate for indium compounds, however, the same effect was also exhibited for other compounds in substantially the same concentration range. In addition, even when an electrolyte solution of the NaOH series and other negative electrode can plating were used, the concentration range of the inhibitor exhibiting the effect was substantially the same.

In accordance with Embodiments 25–29, the effect of the case combining each technique will be explained. In Embodiments 22–24, the evaluation was made using combinations in which the surfactants were changed. In the trial production of batteries, the evaluation was made also by changing the type of zinc.

Before actually investigating characteristics using batteries, a specially prepared test tube was used to investigate the amount of hydrogen gas generated from each of the inhibitors and plated copper plates. The method therefor will be described hereinafter.

Into the specially prepared test tube having a volume of 25 ml and graduated to determine the gas generation amount there were added beforehand 2 g of zinc powder containing 500 ppm of each of bismuth, indium and lead manufactured by the atomization method and a copper piece of the same material as a collector having an area of 0.6 cm$^2$ and a thickness of 0.1 mm. An electrolyte solution to be tested was added thereto and heated 60° C., and the volume of generated hydrogen gas was measured for 7 days. The number of test repetitions was 10, and an average value thereof was used as a result. The electrolyte solution was prepared such as by making a solution in which potassium hydroxide was 30% by weight and zinc oxide was added up to approximate saturation in the case of the potassium hydroxide type, or a solution in which sodium hydroxide was 25% by weight and zinc oxide was added up to approximate saturation in the case of the sodium hydroxide type, as a haze and an inhibitor was optionally added thereto.

Embodiment 25

The hydrogen generation from zinc was measured by the combination of a copper plate coated by electric plating and the substitution plating and the inhibitor. The plating treatment is shown hereinafter.

* Indium (In) plating
    method: electric plating
    plating bath: indium sulfate 60 g/l, sodium sulfate 10 g/l, 25° C
    plating film thickness: 0.3 μm
* Tin (Sn) plating
    method: electric plating
    plating bath: potassium stannate 100 g/l, potassium hydroxide 15 g/l, potassium acetate 5 g/l, 70° C.
    planting film thickness: 0.3 μm
* zinc indium (Zn—In) plating
    method: contact plating; copper plate and zinc are added into the following plating bath heated to 60° C. and left for 1 hour
    plating bath: KOH 30%, ZnO saturation, indium sulfate 0.3%
    plating film thickness: 0.3 μm The plating onto the copper plate and the hydrogen gas generation measurement result with respect to the inhibitor are shown for the case using the electrolyte solution of the KOH series in Table 17, while the case of the NaOH series is show in Table 18. The concentration of the inhibitor is shown by a value with respect to the electrolyte solution.

TABLE 17

Hydrogen evolution rate with plated copper plate

| Experimental No. | Kind of plating | Electrolyte | Inhibitor (concentration: 100 ppm) | Hydrogen evolution rate μL/g/day |
|---|---|---|---|---|
| 1 | In | KOH | — | 31.43 |
| 2 | In | KOH | Indium sulfate | 14.28 |
| 3 | In | KOH | Indium sulfamate | 12.41 |
| 4 | In | KOH | Indium hydroxide | 16.73 |
| 5 | In | KOH | Lead oxide | 17.85 |
| 6 | In | KOH | Barium hydroxide | 8.57 |
| 7 | In | KOH | POERA | 8.42 |
| 8 | Sn | KOH | — | 35.78 |
| 9 | Sn | KOH | Indium sulfate | 16.11 |
| 10 | Sn | KOH | Indium sulfamate | 17.72 |
| 11 | Sn | KOH | Indium hydroxide | 16.53 |
| 12 | Sn | KOH | Lead oxide | 17.91 |
| 13 | Sn | KOH | Barium hydroxide | 10.89 |
| 14 | Sn | KOH | POERA | 10.02 |
| 15 | Zn.In | KOH | — | 32.34 |
| 16 | Zn.In | KOH | Indium sulfate | 15.27 |
| 17 | Zn.In | KOH | Indium sulfamate | 13.35 |
| 18 | Zn.In | KOH | Indium hydroxide | 18.83 |
| 19 | Zn.In | KOH | Lead oxide | 16.82 |
| 20 | Zn.In | KOH | Barium hydroxide | 11.30 |
| 21 | Zn.In | KOH | POERA | 10.98 |

TABLE 18

Hydrogen evolution rate with plated copper plate

| Experimental No. | Kind of plating | Electrolyte | Inhibitor (concentration: 100 ppm) | Hydrogen evolution rate μL/g/day |
|---|---|---|---|---|
| 22 | In | NaOH | — | 29.41 |
| 23 | In | NaOH | Indium sulfate | 14.75 |
| 24 | In | NaOH | Indium sulfamate | 10.58 |
| 25 | In | NaOH | Indium hydroxide | 15.37 |
| 26 | In | NaOH | Lead oxide | 14.14 |
| 27 | In | NaOH | Barium hydroxide | 7.82 |
| 28 | In | NaOH | POERA | 8.13 |
| 29 | Sn | NaOH | — | 30.10 |
| 30 | Sn | NaOH | Indium sulfate | 15.03 |

TABLE 18-continued

Hydrogen evolution rate with plated copper plate

| Experimental No. | Kind of plating | Electrolyte | Inhibitor (concentration: 100 ppm) | Hydrogen evolution rate μL/g/day |
|---|---|---|---|---|
| 31 | Sn | NaOH | Indium sulfamate | 15.28 |
| 32 | Sn | NaOH | Indium hydroxide | 15.38 |
| 33 | Sn | NaOH | Lead oxide | 14.53 |
| 34 | Sn | NaOH | Barium hydroxide | 8.72 |
| 35 | Sn | NaOH | POERA | 9.52 |
| 36 | Zn.In | NaOH | — | 32.83 |
| 37 | Zn.In | NaOH | Indium sulfate | 14.98 |
| 38 | Zn.In | NaOH | Indium sulfamate | 13.19 |
| 39 | Zn.In | NaOH | Indium hydroxide | 14.13 |
| 40 | Zn.In | NaOH | Lead oxide | 14.27 |
| 41 | Zn.In | NaOH | Barium hydroxide | 9.98 |
| 42 | Zn.In | NaOH | POERA | 8.95 |

Polyoxyethylene alkylamide is one (represented by POERA in the table and the figure) in which two polyoxyethylenes (POE) are bonded to the nitrogen in the alkyl group through an amide bond. In this case, a POERA having a carbon number of the alkyl group of 11 and a polymerization degree of POE of 15 was used. Usually, when a POERA having a carbon number of the alkyl group of 3–30 and a polymerization degree of POE of 2–50 is used, the same effect is obtained.

Figure 15:
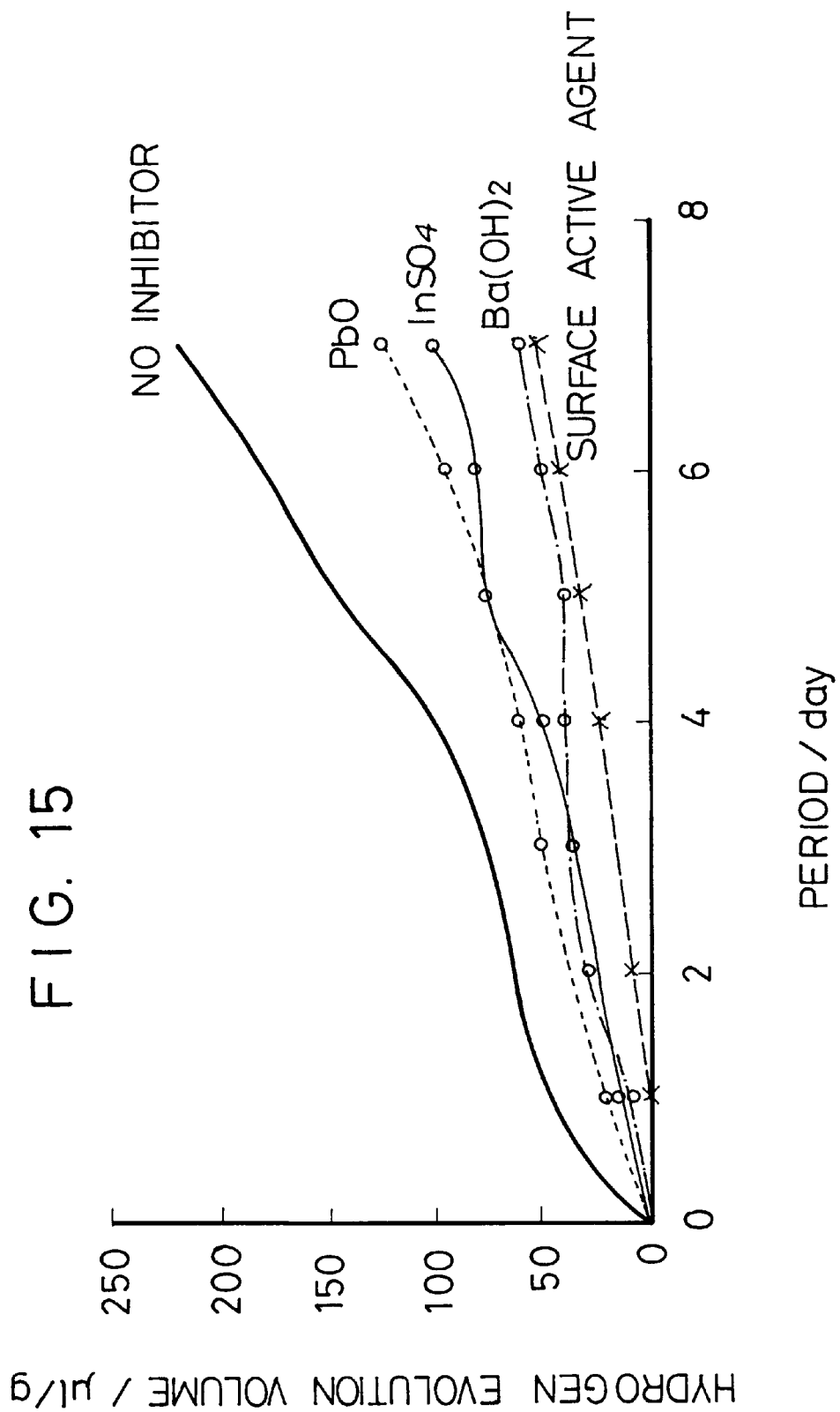
FIG. 15 shows the generation amount of hydrogen gas with respect to days passed when the inhibitor of the present invention is added to the plated copper plate.

As compared with an example in which no inhibitor is added, the case in which the inhibitor of the present invention is added the hydrogen gas generation amount decreases from about ⅓ to ½, and it is understood that there is an effect in relation to suppression of the hydrogen gas generation. The difference due to the plating or the inhibitor is not presented so much. In addition, the hydrogen gas generation amount with respect to the number of test days is shown in FIG. 15 as the measurement result of the case using indium plated copper plates. As for the indium compound, only indium sulfate is shown in the figure.

In the present Embodiment, the result of the case using a plating film thickness of 0.3 μm has been shown, however, in practice, also when a film thickness of 0.1–1 μm was used, there was little difference in the result.

COMPARATIVE EXAMPLE 3

Figure 16:
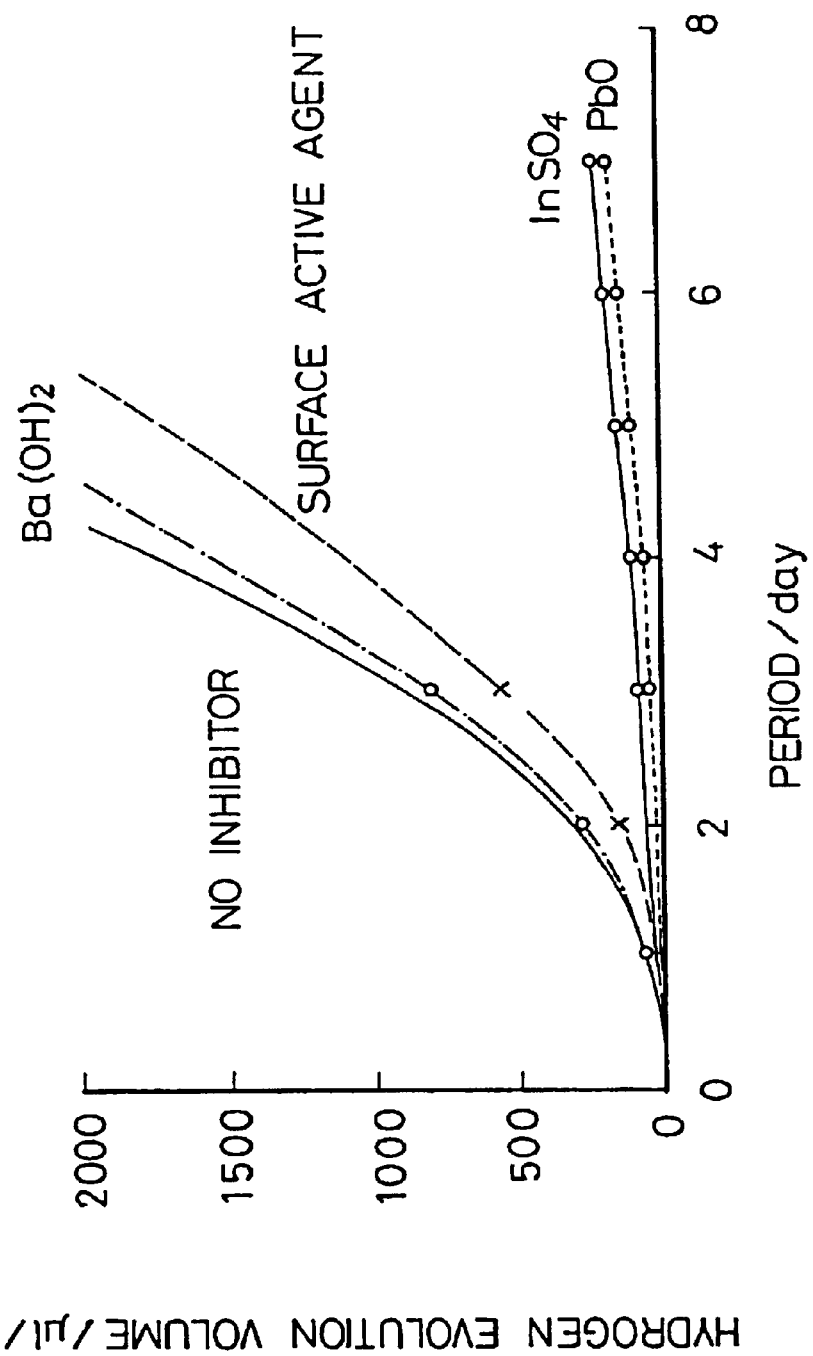
FIG. 16 shows the generation amount of hydrogen gas with respect to days passed when the inhibitor of the present invention is added to the non-plated copper plate.

For comparison, an experiment was performed using non-plates in the same procedure as Embodiment 25. Experiment results are shown in Table 19 and FIG. 16.

TABLE 19

Hydrogen evolution rate with unplated copper plate

| Experimental No. | Electrolyte | Inhibitor (concentration: 100 ppm) | Hydrogen evolution rate μL/g/day |
|---|---|---|---|
| 1 | KOH | — | 516.00 |
| 2 | KOH | Indium sulfate | 30.56 |
| 3 | KOH | Indium sulfamate | 28.73 |
| 4 | KOH | Indium hydroxide | 29.07 |
| 5 | KOH | Lead oxide | 24.15 |
| 6 | KOH | Barium hydroxide | 480.32 |
| 7 | KOH | Carbon fluoride.POE | 432.19 |

It is understood that in the case in which no inhibitor and barium hydroxide or the surfactant of the fluorocarbon-polyoxyethylene series was added, the hydrogen gas generation amount increased exponentially with respect to the number of test days. On the other hand, it is understood that in the case in which indium sulfate and lead oxide were added, the generation of hydrogen gas is suppressed. This is due to the fact that the compound of indium or lead function to coat the copper plate, but barium hydroxide and the surfactant do not effectively perform such function.

Embodiment 26

Using a copper plate plated in the same manner as Example 25, the hydrogen gas generation in the case of the use of a combination of inhibitors was measured using an electrolyte solution of the KOH type. Results are shown in table 20.

TABLE 20

Hydrogen evolution rate with indium plated copper plate and inhibitor

| Experimental No. | Concentration of inhibitor ppm | | | | Hydrogen evolution rate $\mu L/g/day$ |
|---|---|---|---|---|---|
| | Indium sulfate | Lead oxide | Indium hydroxide | POERA | |
| 43 | 100 | 100 | 0 | 0 | 15.82 |
| 44 | 100 | 0 | 100 | 0 | 10.10 |
| 45 | 100 | 0 | 0 | 100 | 12.28 |
| 46 | 0 | 100 | 100 | 0 | 14.64 |
| 47 | 0 | 100 | 0 | 100 | 15.40 |
| 48 | 0 | 0 | 100 | 100 | 9.28 |
| 49 | 100 | 100 | 100 | 0 | 14.87 |
| 50 | 100 | 100 | 0 | 100 | 12.12 |
| 51 | 100 | 0 | 100 | 100 | 8.88 |
| 52 | 100 | 100 | 100 | 100 | 8.54 |

In the column for the inhibitor in the table, the concentration of each inhibitor added to the electrolyte solution with respect to the electrolyte solution is shown. It is understood that the hydrogen gas generation is at a low level in the same manner as in the previous Example, and there is no substantial bad effect even when a plurality of inhibitors are used. Especially, the hydrogen gas generation is less in the case in which barium hydroxide and polyoxyethylene alkylamide are simultaneously added.

Next, a battery was actually manufactured, and the effects of the plating on the collector or the inhibitor were investigated.

Embodiment 27

Into a positive electrode can were added a part of an electrolyte solution and 116 mg of a pellet (silver oxide content of 98%) in which silver oxide was added and molded with a combined agent, and a separator of polyethylene and a separator of cellophane were placed in the can. Next, a gasket of nylon was pushed and fitted into the positive electrode can, and the can was filled with an impregnating agent, a gelling agent, and 30 mg of zinc powder. The remainder of the electrolyte solution was optionally added and an inhibitor was added dropwise. Then a negative electrode can was sealed and 100 pieces for each kind of button type silver oxide batteries were manufactured.

A zinc powder was used containing 130 ppm of bismuth, 500 ppm of indium and 30 ppm of aluminum manufactured by atomization.

The type and the film thickness of the plating onto the negative electrode can, the type and the concentration of the added inhibitor, the closed circuit voltage and the self-discharge rate are shown in Tables 21 and 22.

TABLE 21

Characteristics of cell with KOH electrolyte

| Experimental No. | Kind of plating | Concentration of inhibitor ppm | | | | Self-discharge rate % | | Closed circuit voltage V | |
|---|---|---|---|---|---|---|---|---|---|
| | | Indium sulfate | Lead oxide | barium hydroxide | POERA | Fresh cell | A part-discharged cell | Fresh cell | A part-discharged cell |
| 53 | — | 0 | 0 | 0 | 0 | 5.8 | 9.9 | 1.158 | 1.179 |
| 54 | In | 0 | 0 | 0 | 0 | 4.3 | 5.9 | 1.165 | 1.192 |
| 55 | In | 1000 | 0 | 0 | 0 | 2.7 | 2.7 | 1.169 | 1.198 |
| 56 | In | 0 | 1000 | 0 | 0 | 2.7 | 2.8 | 1.168 | 1.197 |
| 57 | In | 0 | 0 | 1000 | 0 | 2.5 | 4.9 | 1.186 | 1.198 |
| 58 | In | 0 | 0 | 0 | 1000 | 2.6 | 5.0 | 1.165 | 1.185 |
| 59 | In | 1000 | 1000 | 0 | 0 | 2.5 | 2.6 | 1.168 | 1.197 |
| 60 | In | 1000 | 0 | 1000 | 0 | 2.4 | 2.6 | 1.186 | 1.239 |
| 61 | In | 1000 | 0 | 0 | 1000 | 2.4 | 2.5 | 1.168 | 1.199 |
| 62 | In | 0 | 1000 | 0 | 1000 | 2.4 | 2.6 | 1.168 | 1.197 |
| 63 | In | 0 | 1000 | 1000 | 0 | 2.6 | 2.7 | 1.167 | 1.238 |
| 64 | In | 0 | 1000 | 1000 | 1000 | 2.4 | 2.4 | 1.188 | 1.239 |
| 65 | In | 1000 | 1000 | 1000 | 0 | 2.6 | 2.6 | 1.186 | 1.240 |
| 66 | In | 100a | 1000 | 0 | 1000 | 2.5 | 2.6 | 1.170 | 1.200 |
| 67 | In | 1000 | 0 | 1000 | 1000 | 2.3 | 2.5 | 1.185 | 1.240 |
| 68 | In | 1000 | 1000 | 1000 | 1000 | 2.4 | 2.4 | 1.186 | 1.238 |
| 69 | Sn | 0 | 0 | 0 | 0 | 4.7 | 6.8 | 1.167 | 1.193 |
| 70 | Sn | 1000 | 0 | 0 | 0 | 2.8 | 2.7 | 1.168 | 1.198 |
| 71 | Sn | 0 | 1000 | 0 | 0 | 2.7 | 2.8 | 1.170 | 1.199 |
| 72 | Sn | 0 | 0 | 1000 | 0 | 2.6 | 5.0 | 1.187 | 1.199 |
| 73 | Sn | 0 | 0 | 0 | 1000 | 2.6 | 5.1 | 1.165 | 1.185 |
| 74 | Sn | 1000 | 1000 | 0 | 0 | 2.6 | 2.7 | 1.168 | 1.197 |
| 75 | Sn | 1000 | 0 | 1000 | 0 | 2.4 | 2.5 | 1.187 | 1.240 |
| 76 | Sn | 1000 | 0 | 0 | 1000 | 2.4 | 2.4 | 1.168 | 1.201 |
| 77 | Sn | 0 | 1000 | 0 | 1000 | 2.4 | 2.6 | 1.169 | 1.196 |

TABLE 21-continued

Characteristics of cell with KOH electrolyte

| Experimental No. | Kind of plating | Concentration of inhibitor ppm | | | | Self-discharge rate % | | Closed circuit voltage V | |
|---|---|---|---|---|---|---|---|---|---|
| | | Indium sulfate | Lead oxide | barium hydroxide | POERA | Fresh cell | A part-discharged cell | Fresh cell | A part-discharged cell |
| 78 | Sn | 0 | 1000 | 1000 | 0 | 2.7 | 2.8 | 1.167 | 1.240 |
| 79 | Sn | 0 | 1000 | 1000 | 1000 | 2.6 | 2.5 | 1.189 | 1.240 |
| 80 | Sn | 1000 | 1000 | 1000 | 0 | 2.7 | 2.6 | 1.185 | 1.240 |
| 81 | Sn | 1000 | 1000 | 0 | 1000 | 2.5 | 2.6 | 1.172 | 1.200 |
| 82 | Sn | 1000 | 0 | 1000 | 1000 | 2.3 | 2.6 | 1.186 | 1.241 |
| 83 | Sn | 1000 | 1000 | 1000 | 1000 | 2.4 | 2.5 | 1.188 | 1.241 |
| 84 | Zn.In | 0 | 0 | 0 | 0 | 4.9 | 7.1 | 1.171 | 1.199 |
| 85 | Zn.In | 1000 | 0 | 0 | 0 | 2.6 | 2.7 | 1.167 | 1.197 |
| 86 | Zn.In | 0 | 1000 | 0 | 0 | 2.9 | 3.0 | 1.188 | 1.200 |
| 87 | Zn.In | 0 | 0 | 1000 | 0 | 2.6 | 5.0 | 1.166 | 1.186 |
| 88 | Zn.In | 0 | 0 | 0 | 1000 | 2.6 | 5.0 | 1.168 | 1.197 |
| 89 | Zn.In | 1000 | 1000 | 0 | 0 | 2.5 | 2.6 | 1.186 | 1.239 |
| 90 | Zn.In | 1000 | 0 | 1000 | 0 | 2.5 | 2.7 | 1.169 | 1.200 |
| 91 | Zn.In | 1000 | 0 | 0 | 1000 | 2.4 | 2.7 | 1.168 | 1.199 |
| 92 | Zn.In | 0 | 1000 | 0 | 1000 | 2.5 | 2.5 | 1.168 | 1.237 |
| 93 | Zn.In | 0 | 1000 | 1000 | 0 | 2.6 | 2.9 | 1.188 | 1.241 |
| 94 | Zn.In | 0 | 1000 | 1000 | 1000 | 2.5 | 2.5 | 1.187 | 1.241 |
| 95 | Zn.In | 1000 | 1000 | 1000 | 0 | 2.5 | 2.6 | 1.169 | 1.200 |
| 96 | Zn.In | 1000 | 1000 | 0 | 1000 | 2.7 | 2.6 | 1.187 | 1.240 |
| 97 | Zn.In | 1000 | 0 | 1000 | 1000 | 2.4 | 2.6 | 1.187 | 1.239 |
| 98 | Zn.In | 1000 | 1000 | 1000 | 1000 | 2.5 | 2.6 | 1.188 | 1.240 |

TABLE 22

Characteristics of cell with NaOH electrolyte

| Experimental No. | Kind of plating | Concentration of inhibitor ppm | | | | Self-discharge rate % | | Closed circuit voltage V | |
|---|---|---|---|---|---|---|---|---|---|
| | | Indium sulfate | Lead oxide | barium hydroxide | POERA | Fresh cell | A part-discharged cell | Fresh cell | A part-discharged cell |
| 99 | — | 0 | 0 | 0 | 0 | 5.5 | 9.6 | 1.157 | 1.181 |
| 100 | In | 0 | 0 | 0 | 0 | 4.0 | 5.5 | 1.167 | 1.194 |
| 101 | In | 1000 | 0 | 0 | 0 | 2.3 | 2.4 | 1.169 | 1.199 |
| 102 | In | 0 | 1000 | 0 | 0 | 2.2 | 2.5 | 1.169 | 1.198 |
| 103 | In | 0 | 0 | 1000 | 0 | 2.2 | 4.7 | 1.185 | 1.199 |
| 104 | In | 0 | 0 | 0 | 1000 | 2.2 | 4.8 | 1.166 | 1.184 |
| 105 | In | 1000 | 1000 | 0 | 0 | 2.1 | 2.3 | 1.169 | 1.199 |
| 106 | In | 1000 | 0 | 1000 | 0 | 1.9 | 2.2 | 1.188 | 1.240 |
| 107 | In | 1000 | 0 | 0 | 1000 | 1.9 | 2.2 | 1.168 | 1.200 |
| 108 | In | 0 | 1000 | 0 | 1000 | 2.1 | 2.4 | 1.167 | 1.199 |
| 109 | In | 0 | 1000 | 1000 | 0 | 2.2 | 2.4 | 1.169 | 1.238 |
| 110 | In | 0 | 1000 | 1000 | 1000 | 1.8 | 1.9 | 1.189 | 1.240 |
| 111 | In | 1000 | 1000 | 1000 | 0 | 2.4 | 2.2 | 1.187 | 1.241 |
| 112 | In | 1000 | 1000 | 0 | 1000 | 2.2 | 2.1 | 1.171 | 1.202 |
| 113 | In | 1000 | 0 | 1000 | 1000 | 2.0 | 2.2 | 1.186 | 1.240 |
| 114 | In | 1000 | 1000 | 1000 | 1000 | 2.0 | 2.0 | 1.188 | 1.240 |
| 115 | Sn | 0 | 0 | 0 | 0 | 4.4 | 6.4 | 1.169 | 1.195 |
| 116 | Sn | 1000 | 0 | 0 | 0 | 2.5 | 2.2 | 1.169 | 1.200 |
| 117 | Sn | 0 | 1000 | 0 | 0 | 2.5 | 2.3 | 1.170 | 1.200 |
| 118 | Sn | 0 | 0 | 1000 | 0 | 2.4 | 4.7 | 1.189 | 1.200 |
| 119 | Sn | 0 | 0 | 0 | 1000 | 2.3 | 4.7 | 1.167 | 1.184 |
| 120 | Sn | 1000 | 1000 | 0 | 0 | 2.2 | 2.1 | 1.169 | 1.196 |
| 121 | Sn | 1000 | 0 | 1000 | 0 | 2.1 | 2.3 | 1.188 | 1.240 |
| 122 | Sn | 1000 | 0 | 0 | 1000 | 1.9 | 2.1 | 1.169 | 1.200 |
| 123 | Sn | 0 | 1000 | 0 | 1000 | 2.2 | 2.3 | 1.168 | 1.198 |
| 124 | Sn | 0 | 1000 | 1000 | 0 | 2.5 | 2.4 | 1.169 | 1.240 |
| 125 | Sn | 0 | 1000 | 1000 | 1000 | 2.4 | 2.2 | 1.190 | 1.240 |
| 126 | Sn | 1000 | 1000 | 1000 | 0 | 2.4 | 2.3 | 1.186 | 1.241 |
| 127 | Sn | 1000 | 1000 | 0 | 1000 | 2.3 | 2.4 | 1.174 | 1.199 |
| 128 | Sn | 1000 | 0 | 1000 | 1000 | 2.0 | 2.4 | 1.186 | 1.241 |
| 129 | Sn | 1000 | 1000 | 1000 | 1000 | 2.1 | 2.2 | 1.89 | 1.241 |
| 130 | Zn.In | 0 | 0 | 0 | 0 | 4.6 | 6.7 | 1.172 | 1.201 |

TABLE 22-continued

Characteristics of cell with NaOH electrolyte

| Experi-mental No. | Kind of plating | Concentration of inhibitor ppm | | | | Self-discharge rate % | | Closed circuit voltage V | |
|---|---|---|---|---|---|---|---|---|---|
| | | Indium sulfate | Lead oxide | barium hydroxide | POERA | Fresh cell | A part-discharged cell | Fresh cell | A part-discharged cell |
| 131 | Zn.In | 1000 | 0 | 0 | 0 | 2.3 | 2.4 | 1.169 | 1.198 |
| 132 | Zn.In | 0 | 1000 | 0 | 0 | 2.7 | 2.5 | 1.188 | 1.201 |
| 133 | Zn.In | 0 | 0 | 1000 | 0 | 2.4 | 4.8 | 1.168 | 1.187 |
| 134 | Zn.In | 0 | 0 | 0 | 1000 | 2.3 | 4.8 | 1.170 | 1.197 |
| 135 | Zn.In | 1000 | 1000 | 0 | 0 | 2.1 | 2.4 | 1.188 | 1.240 |
| 136 | Zn.In | 1000 | 0 | 1000 | 0 | 2.2 | 2.4 | 1.170 | 1.199 |
| 137 | Zn.In | 1000 | 0 | 0 | 1000 | 2.2 | 2.5 | 1.169 | 1.199 |
| 138 | Zn.In | 0 | 1000 | 0 | 1000 | 2.2 | 2.2 | 1.167 | 1.236 |
| 139 | Zn.In | 0 | 1000 | 1000 | 0 | 2.1 | 2.6 | 1.187 | 1.243 |
| 140 | Zn.In | 0 | 1000 | 1000 | 1000 | 2.3 | 2.0 | 1.187 | 1.242 |
| 141 | Zn.In | 1000 | 1000 | 1000 | 0 | 2.3 | 2.4 | 1.168 | 1.201 |
| 142 | Zn.In | 1000 | 1000 | 0 | 1000 | 2.2 | 2.4 | 1.189 | 1.241 |
| 143 | Zn.In | 1000 | 0 | 1000 | 1000 | 2.2 | 2.4 | 1.187 | 1.240 |
| 144 | Zn.In | 1000 | 1000 | 1000 | 1000 | 2.3 | 2.3 | 1.187 | 1.241 |

The inhibitor concentration in the table indicates a value with respect to the zinc weight. The measurement of the self-discharge rate was performed after maintaining at 60° C. for 20 days said to be equivalent to 1 year. The self-discharge rate after partial discharge was measured after maintaining at 60° C. for 20 days after 50% depth discharge (partial discharge). The closed circuit voltage was measured at −10° C. before discharge and after partial discharge.

As compared with the Examples in which no inhibitor was added (Example No. 54, 69 and 84 in Table 21 and Example No. 100, 115 and 130 in Table 22), the Examples added with the inhibitor have small self-discharge rates. With respect to the partial discharge, in the case of the Examples added with one of the type for coating the collector and the zinc surface such as indium sulfate and lead monoxide, the self-discharge rate is improved. It is apparent that the closed circuit voltage is high for the Examples added with barium hydroxide. It is understood from the table that when the inhibitor of the coating type and barium hydroxide are added, the self-discharge rate before discharge, the self-discharge rate after partial discharge, and the closed circuit voltage are improved. In the present experiment, a behavior that the closed circuit voltage after partial discharge becomes higher than that before discharge has been presented which is opposite to a case using mercurated zinc. The cause thereof is now under investigation.

The plating of the negative electrode can was performed in the same manner as Example 25, and results for each film thickness of 0.3 g m have been shown. There was little difference in the result even when those having a film thickness of 0.1–1 μm were used.

Embodiment 28

Further, with a battery manufactured using an electrolyte of the KOH type and a negative electrode can applied with indium plating, the self-discharge rate corresponding to the one after 1 year and the self-discharge rate after partial discharge with respect to the inhibitor concentration were measured.

Figure 17:
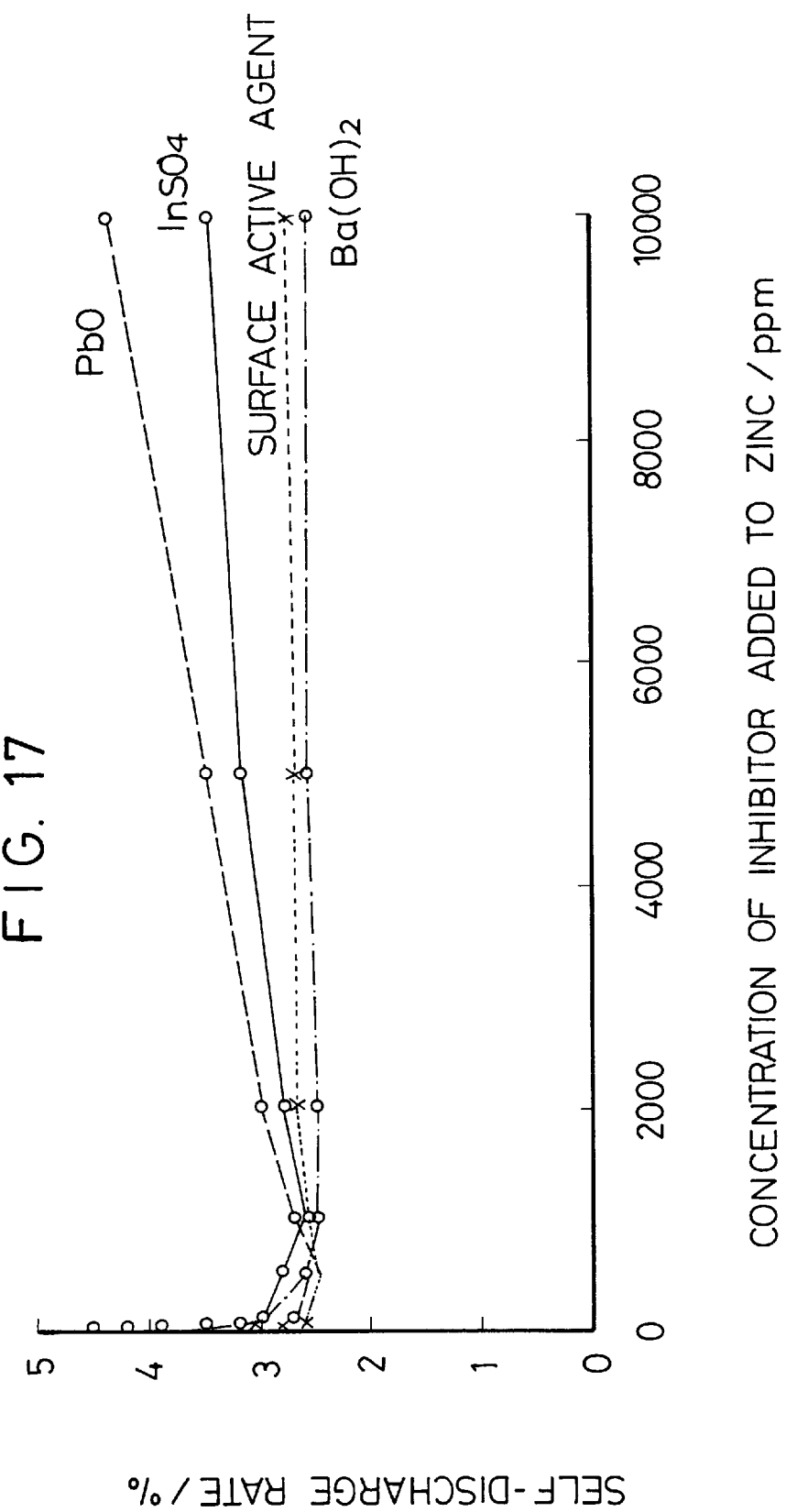
FIG. 17 shows the change in the self-discharge rate with respect to the inhibitor concentration.
Figure 18:
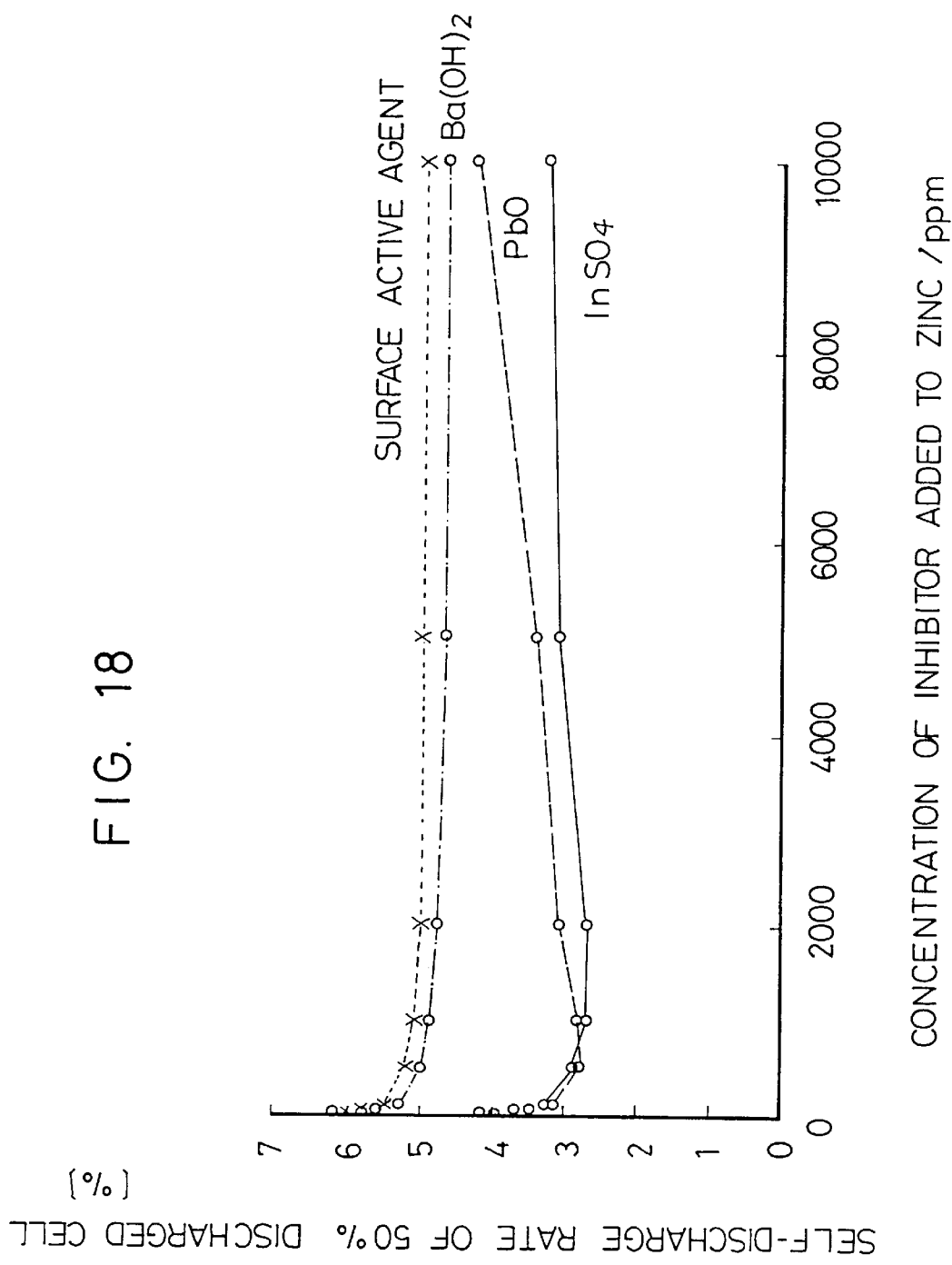
FIG. 18 shows the change in the self-discharge rate after 50% depth discharge with respect to the inhibitor concentration.

Results are shown in FIGS. 17 and 18. Provided that the practical range is not more than about 3% of the self-discharge rate, according to FIG. 17, it has been found to be effective for indium sulfate of 50–5000 ppm, for lead monoxide of 20–5000 ppm, for barium hydroxide of not less than 50 ppm, and for polyoxyethylene alkylamide of not less than 5 ppm as the concentration with respect to zinc.

With respect to the self-discharge rate after 50% depth discharge, according to FIG. 18, it was effective for indium sulfate of 50–5000 ppm, and for lead monoxide of 20–5000 ppm. After partial discharge, the effect is not so much for barium hydroxide and polyoxyethylene alkylamide. In order to lower the self-discharge rate after partial discharge, it has been found to be effective to combine and use indium sulfate or lead monoxide and barium hydroxidepolyoxyethylene alkylamide. However, it is desirable that in the combined use polyoxyethylene alkylamide is not more than 1000 ppm. The result has been shown in the case of indium sulfate for indium compounds, however, other compounds were also effective when used in substantially the same concentration range. In addition, even when an electrolyte solution of the NaOH type or other negative electrode can plating were used, the concentration range of the inhibitor exhibiting the effect was substantially the same.

Embodiment 29

Trial production of batteries was performed in the same manner as Example 27 by changing the zinc composition. Using an electrolyte solution of the KOH type and plating indium onto a negative electrode can, an inhibitor was added comprising 1000 ppm of indium sulfate, lead monoxide, barium hydroxide and polyoxyethylene alkylamide with respect to zinc. Results are shown in Table 23.

TABLE 23

Characteristics of cell with KOH electrolyte

| Experi-mental No. | Concentration of metal added to zinc ppm | | | | | Self-discharge rate % | | Closed circuit voltage V | |
|---|---|---|---|---|---|---|---|---|---|
| | Pb | Bi | In | Al | Ca | Fresh cell | A part-discharged cell | Fresh cell | A part-discharged cell |
| 145 | 500 | — | — | — | — | 2.9 | 2.8 | 1.186 | 1.200 |
| 146 | 500 | 50 | — | — | — | 2.8 | 2.8 | 1.187 | 1.235 |
| 147 | 500 | — | — | 250 | — | 2.8 | 2.7 | 1.186 | 1.235 |
| 148 | 500 | 500 | 500 | — | — | 2.3 | 2.5 | 1.186 | 1.234 |
| 149 | 10 | 100 | 515 | 30 | — | 2.7 | 2.7 | 1.188 | 1.222 |
| 150 | 23 | 240 | — | — | — | 2.9 | 2.9 | 1.189 | 1.200 |
| 151 | 28 | 240 | 1780 | — | — | 2.5 | 2.6 | 1.189 | 1.240 |
| 152 | — | 140 | 480 | — | — | 2.4 | 2.6 | 1.185 | 1.239 |
| 153 | — | 130 | 500 | 30 | — | 2.4 | 2.4 | 1.186 | 1.238 |
| 154 | — | 130 | 500 | — | 50 | 2.3 | 2.4 | 1.188 | 1.236 |

It is apparent that the self-discharge rate is included in a practical range of not more than 3% in the compositions of additives defined in the claims. In order to lower the self-discharge rate, it is desirable to form an alloy of several species.

In Examples 30–31, results of evaluation mainly for combinations with gelling agents are shown.

Embodiment 30

Before practically manufacturing batteries, the effect of the present invention was confirmed in a form of a hydrogen gas generation test. The test was performed using a combination of zinc powder, a gelling agent of the present invention, barium hydroxide and a copper plate of the same material as that of the collector. Into a specially prepared test tube having a volume of 25 ml graduated to determine the amount gas generation amount was added 2 g of zinc powder containing 500 ppm of each of bismuth, indium and lead manufactured by the atomization method. An electrolyte solution to be tested was added thereto and heated to 60° C., and the volume of generated hydrogen gas was measured for 7 days. The gelling agent was added by 1.5% with respect to zinc. Using 2 g of zinc powder and 5 copper pieces of the same material as the collector having a surface area of 0.6 cm² and a thickness of 0.1 mm together so as to provide the same ratio of the negative electrode zinc weight to the negative electrode collector surface area of the battery, the gas generation was measured in the same manner. The number of test repetitions was 6, and an average value thereof was used as a result.

The electrolyte solution was prepared by providing a base solution in which potassium hydroxide was 30% by weight and zinc oxide was added up to approximate saturation in the case of the potassium hydroxide type, or a base solution in which sodium hydroxide was 25% by weight and zinc oxide was added up to approximate saturation in the case of the sodium hydroxide type, and barium hydroxide was added thereto. Barium hydroxide was made by Wako Pure Chemical Industries., Ltd., CMC was No. 1260 and No. 1380 made by Daicel Chemical Industries, Ltd., and PAS was a reagent made by Wako Pure Chemical Industries., Ltd. and Rheogic 250H made by Nihon Pure Chemicals Co., Ltd. The added amount of barium hydroxide was 0–50000 ppm with respect to the electrolyte solution. Results are shown for the hydrogen generation amount in Table 24.

TABLE 24

Hydrogen evolution rate

| Experi-mental No. | Kind of electro-lyte | Geled agent | Copper pieces | Amount of added barium hydroxide ppm | Hydrogen evolution rate μl/g/day |
|---|---|---|---|---|---|
| 1 | KOH | CMC 1260 | none | 0 | 35.71 |
| 2 | KOH | CMC 1380 | none | 0 | 30.43 |
| 3 | KOH | PAS WAKO | none | 0 | 22.12 |
| 4 | KOH | PAS 250H | none | 0 | 13.58 |
| 5 | KOH | CMC 1260 | none | 1000 | 24.73 |
| 6 | KOH | CMC 1380 | none | 1000 | 19.39 |
| 7 | KOH | PAS WAKO | none | 1000 | 8.65 |
| 8 | KOH | PAS 250H | none | 1000 | 6.82 |
| 9 | KOH | CMC 1260 | include | 1000 | 215.31 |
| 10 | KOH | CMC 1380 | include | 1000 | 189.56 |
| 11 | KOH | PAS WAKO | include | 1000 | 99.49 |
| 12 | KOH | PAS 250H | include | 1000 | 81.72 |
| 13 | KOH | none | none | 50000 | 2.02 |
| 14 | KOH | none | none | 10000 | 1.99 |
| 15 | KOH | none | none | 5000 | 2.01 |
| 16 | KOH | none | none | 1000 | 2.10 |
| 17 | KOH | none | none | 500 | 2.24 |
| 18 | KOH | none | none | 100 | 2.55 |
| 19 | KOH | none | none | 0 | 3.19 |
| 20 | KOH | none | include | 50000 | 238.42 |
| 21 | KOH | none | include | 10000 | 31.54 |
| 22 | KOH | none | include | 1000 | 46.37 |
| 23 | NaOH | none | include | 100 | 84.25 |
| 24 | NaOH | none | include | 0 | 516.63 |
| 25 | NaOH | none | none | 50000 | 1.90 |
| 26 | NaOH | none | none | 10000 | 1.95 |
| 27 | NaOH | none | none | 5000 | 2.00 |
| 28 | NaOH | none | none | 1000 | 2.02 |
| 29 | NaOH | none | none | 500 | 2.12 |
| 30 | NaOH | none | none | 100 | 2.31 |
| 31 | NaOH | none | none | 0 | 3.46 |
| 32 | NaOH | none | include | 50000 | 25.13 |
| 33 | NaOH | none | include | 10000 | 27.58 |
| 34 | NaOH | none | include | 1000 | 31.49 |
| 35 | NaOH | none | include | 100 | 95.61 |
| 36 | NaOH | none | include | 0 | 252.89 |

The unit is μl/g/day. According to the result in Table 24, it is understood that one added with barium hydroxide has a small hydrogen generation amount irrespective to comparison in the gelling agent type, the zinc powder simple substance and the zinc powder+copper piece. The electrolyte solution type, and the gas generation is also small due to PAS being a cross-linked type acrylic water-soluble resin with respect to the gelling agent type.

It is apparent that the combination of PAS as a cross-linked type acrylic water-soluble resin and barium hydroxide is especially good. When the added amount of barium hydroxide was not less than 500 ppm, there was supersaturation, so that the electrolyte solution in a turbid state was used. In addition, barium hydroxide was added to the electrolyte solution in Example 30, however, the same effect was obtained even when the whole amount was added to powdery zinc.

Embodiment 31

A button type silver oxide battery of the SR621 size was prepared. As a negative electrode can a collector applied with tin plating of 0.1 $\mu$m was used. The zinc was the one used in Example 30, Rheogic 250H as a cross-linked type acrylic water-soluble resin for a gelling agent, and a potassium hydroxide 30% by weight solution or a sodium hydroxide 25% by weight solution added with zinc oxide up to approximate saturation respectively for an electrolyte solution. The added amount of the gelling agent was 1.5% with respect to zinc, and the added amount of barium hydroxide was 0–50000 ppm with respect to zinc. As Conventional example, a battery was manufactured in which CMC 1260# was used for the gelling agent with no barium hydroxide added. Evaluation results of electric characteristics are shown in the discharge index in Table 25.

TABLE 25

| | | Chacteristics of cell | | |
|---|---|---|---|---|
| Experi-mental No. | Kind of electro-lyte | Amount of added barium hydroxide ppm | Comparison of discharge capacity | Hydrogen evolution rate $\mu l/g/day$ |
| 1 | KOH | 50000 | 97 | 0.208 |
| 2 | KOH | 10000 | 100 | 0.205 |
| 3 | KOH | 1000 | 103 | 0.227 |
| 4 | KOH | 100 | 1023 | 0.708 |
| 5 | KOH | 10 | 102 | 1.693 |
| 6 | KOH | 0 | 101 | 1.812 |
| Conventional | KOH | 0 | 100 | 2.513 |
| 7 | NaOH | 50000 | 98 | 0.192 |
| 8 | NaOH | 10000 | 101 | 0.185 |
| 9 | NaOH | 1000 | 102 | 0.183 |
| 10 | NaOH | 100 | 102 | 0.228 |
| 11 | NaOH | 10 | 101 | 0.342 |
| 12 | NaOH | 0 | 101 | 0.549 |
| Conventional | NaOH | 0 | 100 | 0.712 |

The electric characteristics were measured by the direct current method with a load resistance of 200 $\Omega$ when the electrolyte solution was the potassium hydroxide type or the pulse method with a load resistance of 2 $\Omega$ when it was the sodium hydroxide type. In either case, The conventional example had a discharge index of 100. As being apparent also from the result, one in which the gelling agent of the present invention and the cross-linked type acrylic water-soluble resin were used and barium hydroxide was added had a good discharge performance as compared with the Conventional example.

Figure 19:
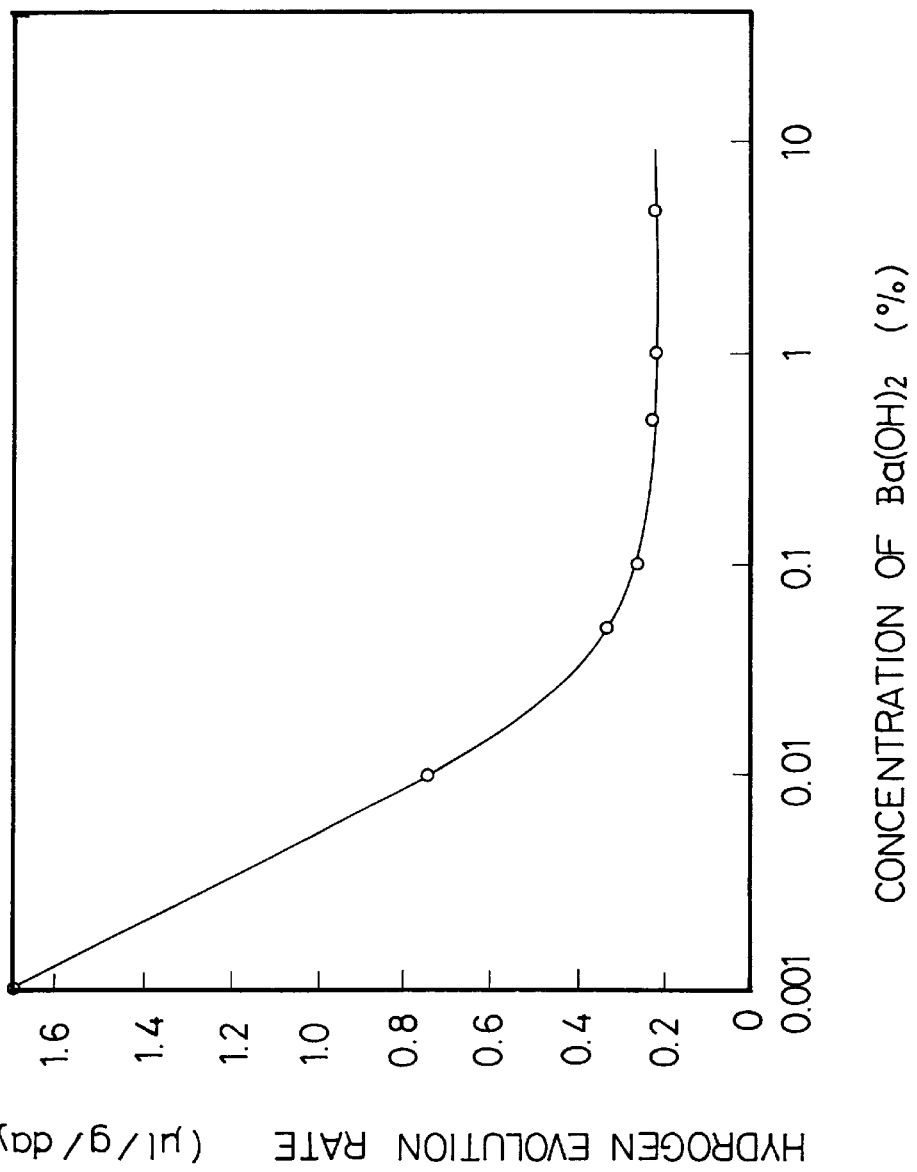
FIG. 19 is a figure showing the hydrogen gas generation amount with respect to barium hydroxide.

Using a gasket of polypropylene specially prepared for allowing hydrogen to penetrate, a button type silver oxide battery was manufactured in the same manner. As a gelling agent, 1.5% of Rheogic 250H being a cross-linked type acrylic water-soluble resin was used with respect to zinc. Barium hydroxide were tested with a concentration of 10 ppm to 5% with respect to a weight of zinc. Ten pieces of the manufactured silver oxide batteries were placed in a vessel made of glass filled with liquid paraffin in a high temperature tank, a collecting tube having graduations at an upper portion was attached, and the amount of generated hydrogen was measured. This state was maintained at 60° C. for 20 days, and the hydrogen gas generation amount after 20 days was investigated. Evaluation results are shown in the hydrogen gas generation amount in Table 25, and a result of a case using a potassium hydroxide 30% by weight solution as the electrolyte solution is shown in FIG. 19. According to the figure, it is apparent that barium hydroxide works effectively at 100 ppm to 1%.

Usin a gasket made of polypropylene was returned to one made of nylon, a button type silver oxide battery was manufactured in a range of barium hydroxide concentration of 100 ppm to 1% which had less gas generation. Ten pieces of the manufactured batteries were placed in a vessel made of glass filled with liquid paraffin in a high temperature tank in the same manner, and a collecting tube for generating hydrogen gas was attached to an upper portion. Hydrogen gas generation, expansion of the battery can and liquid leakage were not observed after 20 days at 60° C.

The hydrogen gas generation amount in the actual battery has a value smaller than that of the hydrogen gas generation amount in the experiment in Example 30. For this fact, it is considered that the copper piece used in Example 30 is different from the structure of an actual collector, a part of generated hydrogen gas has been consumed by the reduction of silver oxide and the like. The method in Example 30 is different in the amount order of hydrogen gas generation, but it is sufficient as a method for observing substituted characteristics for predicting hydrogen generation in an actual battery.

In accordance with Examples 32–35, the effect of a case in which the collector is provided with a zinc alloy layer and evaluation results of a case in which the alkaline battery of the present invention is used for a clock or watch are shown.

Before actually investigating characteristics using batteries, a specially prepared test tube was used to investigate what amount of hydrogen gas was generated from a plated copper plate (the same material as a collector). The method therefor will be described hereinafter.

Into a specially prepared test tube having a volume of 25 ml graduated to determine the gas generation amount, there were previously added 2 g of zinc powder containing 500 ppm each of bismuth, indium and lead manufactured by the atomization method, and a copper piece being the same material as the collector and having an area of 0.6 cm$^2$ and a thickness of 0.1 mm being applied with the plating of the present invention. An electrolyte solution was added thereto and heated to 60° C. and the volume of generated hydrogen gas was measured for 7 days. The number of test repetitions was 10, and an average value thereof was used as a result. As the electrolyte solution there was used a solution in which potassium hydroxide was 30% by weight and zinc oxide was added up to approximate saturation in the case of the potassium hydroxide type, and a solution in which sodium hydroxide was 25% by weight and zinc oxide was added up to approximate saturation in the case of the sodium hydroxide type.

Embodiment 32

The hydrogen generation from zinc and a copper piece coated with the electric plating and the substitution plating was measured. Four kinds of plating treatments onto the copper piece were performed. Conditions are shown hereinafter.

=Contact plating (zinc-indium)

method: |contact plating: A copper piece and zinc were placed into the following plating bath heated to 60° C. and left for 1 hour.

plating bath: KOH 30%, ZnO saturation, indium sulfate 0–3000 ppm temperature: 60° C.

plating film thickness: Adjustment was made depending on time. The thickness was determined from weights before and after the plating.

=Contact plating (zinc-lead)

method: contact plating: A copper piece and zinc were placed into the following plating bath heated to 60° C. and left for 1 hour.

plating bath: KOH 30%, ZnO saturation, lead oxide 0–3000 ppm temperature: 60° C.

plating film thickness: Adjustment was made depending on time. The thickness was determined from weights before and after the plating.

=Electric plating (cyanide type)

method: A copper piece was clamped in a net made of copper to allow a current to flow, and plating was performed. The copper piece was suitably moved so as not to make a portion not subjected to plating.

plating bath: zinc cyanide 70 g/l, sodium cyanide 50 g/l, sodium hydroxide 100 g/l, indium cyanide 0–3000 ppm temperature: 25° C.

current density: 5 A/dm$^2$ plating film thickness: Adjustment was made depending on time. The thickness was determined from weights before and after the plating.

=Electric plating (acidic)

method: A copper piece was clamped in a net made of copper to allow a current to flow, and plating was performed. The copper piece was suitably moved so as not to make a portion not subjected to plating.

plating bath: zinc sulfate 240 g/l, sodium sulfate 30 g/l, sodium acetate 15 g/l, indium sulfate 0–3000 ppm temperature: 25° C.

current density: 2 A/dm$^2$ plating film thickness: Adjustment was made depending on time. The thickness was determined from weights before and after the plating.

A copper piece subjected to each treatment, zinc powder and an electrolyte solution were added in a specially prepared test tube, and the amount of hydrogen gas generated therefrom was investigated. It is supposed that the larger the hydrogen gas generation, the larger is the self-discharge in an actual battery.

TABLE 26

Hydrogen evolution rate in KOH electrolyte

| Experimental No. | Condition of plating | | Hydrogen evolution rate ($\mu$l/g/day) vs concentration of additive in plating solution (ppm) | | | | |
|---|---|---|---|---|---|---|---|
| | Kind of plating | Additive | 0 | 10 | 100 | 1000 | 3000 |
| 1 | Contact plating | Indium sulfate | 516.92 | 14.29 | 10.71 | 12.14 | 8.57 |
| 2 | Contact plating | PbO | ↑ | 13.28 | 12.96 | 96.34 | 120.36 |
| 3 | Electroplating | Indium cyanide | ↑ | 15.47 | 13.22 | 10.25 | 10.81 |
| 4 | Electroplating | Indium sulfate | ↑ | 18.24 | 15.26 | 15.13 | 7.41 |

TABLE 27

Hydrogen evolution rate in NaOH electrolyte

| Experimental No. | Condition of plating | | Hydrogen evolution rate ($\mu$l/g/day) vs concentration of additive in plating solution (ppm) | | | | |
|---|---|---|---|---|---|---|---|
| | Kind of plating | Additive | 0 | 10 | 100 | 1000 | 3000 |
| 5 | Contact plating | Indium sulfate | 480.23 | 13.00 | 10.17 | 11.53 | 7.11 |
| 6 | Contact plating | PbO | ↑ | 12.75 | 11.28 | 90.56 | 102.31 |
| 7 | Electroplating | Indium cyanide | ↑ | 14.54 | 12.82 | 9.43 | 9.84 |
| 8 | Electroplating | Indium sulfate | ↑ | 18.06 | 14.19 | 14.98 | 6.45 |

In Table 26, the hydrogen generation amount in the KOH type electrolyte solution with respect to the copper piece plated with each concentration of lead oxide is shown. In Table 27, the result in the NaOH type electrolyte solution is shown.

According to Tables 26 and 27, it is understood that the hydrogen gas generation can be greatly suppressed as by adding a little amount of indium compound and lead oxide of about 10 ppm into the plating solution, and forming an alloy of the plating film as compared with no addition. However, in the case of addition of lead oxide in a high concentration, needle-like lead becomes deposited on the plating film, and the hydrogen gas generation is deteriorated.

When the copper piece subjected to the substitution plating was quantitatively measured by the Auger spectroscopic analysis, it was found that about 0.3% of indium existed in the plating film in the case of adding indium sulfate in an amount of 1000 ppm, and about 0.1% of indium existed in the case of adding indium sulfate in an amount of 100 ppm. In the case of the plating film manufactured by adding indium sulfate to the plating solution by not more than 100 ppm, it was impossible to measure indium as being not more than the detection limit. However, it is considered that the hydrogen gas generation suppressing effect is obtained by the inclusion of an extremely minute amount of indium into the plating film. For other kinds of plating, it is considered that the hydrogen gas generation suppressing effect is also obtained because indium and lead are deposited in zinc to lower the hydrogen overvoltage of zinc.

TABLE 28

Hydrogen evolution rate in KOH electrolyte

| Experi-mental No. | Condition of plating | | Hydrogen evolution rate ($\mu$l/g/day) vs plating thickness ($\mu$m) | | | | | |
|---|---|---|---|---|---|---|---|---|
| | Kind of plating | Additive | 0 | 0.015 | 0.074 | 0.082 | 0.152 | 0.222 |
| 9 | Contact plating | Indium sulfate | 516.9 | 11.79 | 7.50 | 13.21 | 8.93 | 8.75 |

TABLE 29

Hydrogen evolution rate in NaOH electrolyte

| Experi-mental No. | Condition of plating | | Hydrogen evolution rate ($\mu$l/g/day) vs plating thickness ($\mu$m) | | | | | |
|---|---|---|---|---|---|---|---|---|
| | Kind of plating | Additive | 0 | 0.015 | 0.074 | 0.082 | 0.152 | 0.222 |
| 10 | Contact plating | Indium sulfate | 480.2 | 12.36 | 6.23 | 6.02 | 7.71 | 7.11 |

In Tables 28 and 29, the hydrogen gas generation amount with respect to the film thickness is shown in the substitution plating added with 1000 ppm of indium sulfate. According to Tables 28 and 29, it is apparent that the effect is provided from 0.015 $\mu$m as being fairly thin.

Embodiment 33

Next, trial production of a battery was actually performed to confirm the effect on the negative electrode can.

Into a positive electrode can there were added a part of an electrolyte solution 116 mg of a pellet (silver oxide content of 98%) made by adding silver oxide molded with a combined agent, a separator of polyethylene and a separator of cellophane. Next, a gasket of nylon was pushed and fitted into the positive electrode can, an impregnating agent, a gelling agent, and 30 mg of zinc powder were added, and the remainder of the electrolyte solution optionally provided with an inhibitor was added dropwise. Thereafter, a negative electrode can was placed and sealed to manufacture 100 pieces for each kind of button type silver oxide batteries.

As the zinc powder, one containing 500 ppm of bismuth, 500 ppm of indium and 500 ppm of lead manufactured by atomization was used. The plating onto the negative electrode can was performed in the same manner as Example 32.

The self-discharge rate with respect to the type of the plating onto the negative electrode can is shown in Tables 30 and 31. The measurement of the self-discharge rate was performed after maintaining 60° C. for 20 days which said to be equivalent to 1 year.

TABLE 30

Self-discharge rate of cell with KOH electrolyte

| Experi-mental No. | Condition of plating | | Self-discharge rate after 1 year storage % |
|---|---|---|---|
| | Kind of plating | Additive | |
| 11 | none | — | 5.8 |
| 12 | Contact plating | Indium sulfate | 2.5 |
| 13 | Contact plating | PbO | 2.8 |
| 14 | Electroplating | Indium cyanide | 2.4 |
| 15 | Electroplating | Indium sulfate | 2.4 |

TABLE 31

Self-discharge rate of cell with NaOH electrolyte

| Experi-mental No. | Condition of plating | | Self-discharge rate after 1 year storage % |
|---|---|---|---|
| | Kind of plating | Additive | |
| 16 | none | — | 5.5 |
| 17 | Contact plating | Indium sulfate | 2.2 |
| 18 | Contact plating | PbO | 2.5 |
| 19 | Electroplating | Indium cyanide | 2.1 |
| 20 | Electroplating | Indium sulfate | 2.2 |

According to Tables 30 and 31, it is understood that the self-discharge rate can be suppressed by using the plated negative electrode can of the present invention as compared with the negative electrode can not subjected to plating.

In this case, results are shown in which the added amount of the indium compound into the plating solution was 1000 ppm, the added amount of lead oxide was 100 ppm, and each film thickness was 0.1 μm. There was little difference in the result even when those having a film thickness of 0.01–3 μm were used. In addition, equivalent effects were obtained in ranges in which the amount of the indium compound added into the plating solution was 10–3000 ppm, and the amount of lead oxide added was 10–100 ppm. When the same test was performed for potassium stannate and sodium stannate, equivalent effects were obtained in a range of the adding amount of 10–3000 ppm. In addition, equivalent effects were obtained even when plating solutions mixed and added with indium compounds, lead oxide, potassium stannate and sodium stannate in these concentration ranges have been used.

Embodiment 34

A test was performed for the impurity shielding effect of the plating film.

Plating was performed for a negative electrode can having the SR521 size in which iron type foreign matters had adhered to the collector surface during press processing causing deficiency in gas generation. The deficiency in gas generation may become a cause of expansion and explosion when a battery is made, which can be confirmed by instant gas generation after adding an electrolyte solution and several zinc powder particles of about 100 μm to a concave surface at the copper side as the collector of the negative electrode can. This is due to the fact that zinc serves as an anode and iron having a lower hydrogen overvoltage serves as a cathode to generate hydrogen. The plating was performed by substitution plating using a barrel. Conditions are described hereinafter.

=Contact plating (zinc-indium)
   method: contact plating: Using a barrel, a negative electrode can and a zinc piece were added into the following plating solution heated to 60° C. to perform plating.
   negative electrode can: SR521 size, about 1000 pieces
   zinc piece: 3×3×0.1, about 1500 sheets
   plating solution: KOH 30%, ZnO saturation, indium sulfate 0–300 ppm
   temperature: 60° C.
   time: 5, 15 and 30 minutes
   plating film thickness: The thickness was measured from weights of a copper plated added as a dummy before and after the plating.

The film thickness against time was 0.041 μm for 5 minutes, 0.090 μm for 15 minutes, and 0.148 μm for 30 minutes. 100 pieces were picked out respectively, and the confirmation of gas generation was performed. As a result, the gas generation was found in 78 pieces out of 100 pieces in the case of those subjected to plating for 5 minutes. No gas generation was found in those subjected to plating for 15 and 30 minutes. According to this fact, it has been found that a plating thickness of about 0.1 μm has shielding effect for impurities.

Embodiment 35

Next, results are shown for a case in which the shaping into a negative electrode can was performed after plating onto a hoop material instead of the direct negative electrode can plating as done in Example 33. In this case, although there is a merit that the plating can be made thick by the electric plating, however, there is a problem that deficiency is apt to be caused in a soft plating film by mechanical processing. Plating conditions are shown hereinafter.

* Electric plating (cyanide type)
   method: The nickel side of a hoop material was clad with three-layers of nickel, stainless and copper was subjected to masking, and plating was performed onto the copper side.
   plating bath: zinc cyanide 70 g/l, sodium cyanide 50 g/l, sodium hydroxide 100 g/l, indium cyanide 1000 ppm
   bath temperature: 25° C.
   current density: 5 A/dm$^2$
   plating film thickness: Adjustment was made depending on time. The thickness (adjustment of the feed speed of the hoop material) was determined by embedding in a resin and taking a picture using an optical microscope.

Those having a film thickness of 1, 2, 3, 4, 7 or 10 μm were manufactured. Negative electrode cans of 100 pieces were manufactured using each hoop material plated with a zinc alloy of each film thickness. The number of negative electrode cans in which the copper surface became exposed by processing was investigated. Results are shown in Table 7.

According to the result, it is apparent that the copper surface ceases to be exposed in the case of not less than 3 μm.

The negative electrode cans for each film thickness were used to perform trial production of 100 pieces of batteries respectively with an NaOH type electrolyte solution in the same manner as Example 33.

TABLE 32

| | Number of anode cap with generated pinhole and self-discharge rate | | | | | | |
|---|---|---|---|---|---|---|---|
| Plating thickness (μm) | 1 | 2 | 3 | 4 | 7 | 10 | Cell using analgamated zinc |
| Number of anode cap with generated pinhole | 8 | 3 | 0 | 0 | 0 | 0 | |
| Initial capacity (mAh) | 23.2 | 23.3 | 23.4 | 23.6 | 24.1 | 24.8 | 23.1 |
| Capacity after 2 years storage (mAh) | 21.2 | 21.7 | 22.0 | 22.7 | 23.0 | 23.8 | 22.6 |
| Self-discharge rate (%/year) | 4.4 | 3.5 | 2.9 | 1.9 | 2.1 | 2.0 | 1.1 |

The initial capacity and the capacity corresponding to the one after 2 years (after storage at 60° C. for 40 days) are shown in Table 32. A result of a case where mercurated zinc was used is also described at the right end in the table for the purpose of comparison. According to Table 32, the plating of not more than 2 μm has a capacity smaller than that of the case in which direct plating was performed to the negative electrode can in Example 33 due to deficiency in the plating film by processing. When the film thickness is 4 μm, the capacity after 2 years becomes approximately the same as the one in which mercurated zinc is used. For example, when the battery is incorporated into a clock or watch, the battery service life is about 2 years. In order to expect a capacity equivalent to or not less than that of a battery using mercurated zinc after 2 years, it is necessary to plate the zinc alloy by not less than 4 μm according to Table 32. In the design of a battery, it is available that the zinc alloy plating thickness may be not less than 3 μm so as to have a thickness with which an aimed capacity is obtained in 2 years.

Embodiment 36

A conventional battery in which zinc having a mercuration ratio of 10% was used and a battery in which a 4 μm zinc-indium alloy was applied to a negative electrode can of the present invention by the same method as Example 35 using mercuryless zinc were actually installed in wristwatches, and a carrying test was performed to measure the number of days until the watch stopped. The test was done for each 10 pieces.

TABLE 33

Cell life by watch

|  | Cell using amalgamated zinc | Cell using zinc without mercury and plated anode cap (plating thickness: 4 μm) |
| --- | --- | --- |
| Cell life (days) | 751.1 | 758.3 |
| σ | 14.8 | 23.6 |

Results are shown in Table 33. The number of days until the watch stopped was substantially the same, and coming off with the capacity not being lowered even in the case of no mercury.

As shown in Example 35, it is apparent that when using as a standard a film thickness, in which the capacity after 2 years in the acceleration test becomes the same as that of the battery using mercurated zinc, it is possible to obtain a capacity equivalent to the one in which mercurated zinc is used also when used in an actual clock or watch.

Namely, in the design of a battery, the zinc alloy plating thickness may be made to be not less than 3 μm so as to provide a thickness with which an aimed capacity is obtained in 2 years. For example, provided that the weight of zinc in the battery using mercurated zinc of an aimed capacity (excluding an amount of mercury) is W0, the self-discharge rate/year is SD0, the weight of zinc in the battery using mercuryless zinc to be designed is W0 (the same as mercurated zinc), the self-discharge rate is SD1, the area of the collector is S, and the specific gravity of zinc is 7.13, the film thickness D1 of the zinc alloy may be as follows:

$$D1=(W0\times(1-2\times SD0)/(1-2\times SD1)-W0)/7.13/S$$

In the present Examples 35 and 36, it has been described that the clad material is plated with the zinc-indium alloy of not less than 3 μm, however, as shown in Examples 32 and 33, approximately the same effect is obtained provided that the zinc alloy is an alloy containing zinc as an essential element and containing one or more species selected from indium, lead and tin as a selective element. In addition, it is understod that the same effect is obtained even when the formation method of the zinc alloy layer is another method. For example, methods cladding a zinc alloy with one more layer, or using dry plating or flame coating and the like are applicable.

In addition, the effect of the invention is not deteriorated even when elements which raise the hydrogen overvoltage of the zinc alloy such as bismuth, gallium, aluminum, calcium and the like exist in the zinc alloy layer containing indium or lead. Depending on the way of addition, further self-discharge suppressing effects can be expected.

As also described in Examples hereinbefore, according to the present invention, it is possible to manufacture the alkaline battery in which the generation of hydrogen is suppressed without deteriorating battery characteristics. This is especially effective for coin-type or button-type alkaline batteries which require high performance but are sensitive to gas generation.

In addition, with respect to the zinc alloy plating onto the collector of the present invention, when it is used for minute discharge for clocks or watches or the like, it is possible to achieve a capacity which is equivalent to or not less than those of batteries in which mercurated zinc is used. Further, when clocks or watches carrying the alkaline batteries of the present invention are discarded, the environment is never polluted because mercury as an environmental pollution substance is not contained. Similarly, when an electronic apparatus carrying the alkaline batteries are discarded, the environment is never polluted because mercury as an environmental pollution substance is not contained.

What is claimed is:

1. An alkaline primary battery without mercury comprising: a negative electrode having an active material comprised of mercuryless zinc powder; a positive electrode; and an electrolyte containing one or more indium compounds forming a complex ion of indium selected from the group consisting of indium sulfamate and indium chloride.

2. An alkaline primary battery without mercury as claimed in claim 1; wherein the electrolyte is a solution of potassium hydroxide and zinc oxide.

3. An alkaline primary battery without mercury as claimed in claim 1; wherein the electrolyte is a solution of sodium hydroxide and zinc oxide.

4. An alkaline battery without mercury as claimed in claim 1; wherein the positive electrode has an active material comprised of a compound selected from the group consisting of silver oxide and manganese dioxide.

5. An alkaline primary battery without mercury as claimed in claim 4; wherein the electrolyte is a solution of potassium hydroxide and zinc oxide.

6. An alkaline primary battery without mercury as claimed in claim 4; wherein the electrolyte is a solution of sodium hydroxide and zinc oxide.

7. An alkaline primary battery without mercury comprising: an electrolyte comprised of a solution of potassium hydroxide and zinc oxide; a positive electrode; and a negative electrode having an active material comprised of mercuryless zinc powder; wherein the negative electrode contains one or more indium compounds forming a complex ion of indium selected from the group consisting of indium sulfamate and indium chloride.

8. An alkaline battery without mercury as claimed in claim 7; wherein the positive electrode has an active material comprised of a compound selected from the group consisting of silver oxide and manganese dioxide.

9. An alkaline primary battery without mercury as claimed in claim 7; further comprising an electrolyte; and a wherein the positive electrode has having an active material comprised of a compound of silver oxide and manganese dioxide.

10. An alkaline primary battery without mercury as claimed in claim 9; wherein the electrolyte is a solution of potassium hydroxide and zinc oxide.

11. An alkaline primary battery without mercury as claimed in claim 9; wherein the electrolyte is a solution of sodium hydroxide and zinc oxide.

12. In combination with an electronic apparatus: an alkaline primary battery without mercury for supplying electric power to the electronic apparatus, the alkaline battery comprising a negative electrode having an active material comprised of mercuryless zinc powder, and an electrolyte containing one or more indium compounds forming a complex ion of indium selected from the group consisting of indium sulfamate and indium chloride.

13. The combination as claimed in claim 12; wherein the electrolyte is a solution selected from the group consisting of potassium hydroxide and sodium hydroxide.

14. The combination as claimed in claim 12; further comprising a positive electrode having an active material comprised of a compound selected from the group consisting of silver oxide and manganese dioxide.

15. The combination as claimed in claim 12; further comprising a positive electrode having an active material comprised of a compound selected from the group consisting of silver oxide and manganese dioxide.

16. The combination as claimed in claim 15; wherein the electrolyte is a solution of potassium hydroxide and zinc oxide.

17. The combination as claimed in claim 15; wherein the electrolyte is a solution of sodium hydroxide and zinc oxide.

18. In combination with an electronic apparatus: an alkaline primary battery without mercury for supplying electronic power to the electronic apparatus, the alkaline battery comprising an electrolyte, and a negative electrode having an active material comprised of mercuryless zinc powder, wherein the negative electrode contains one or more indium compounds forming a complex ion of indium selected from the group consisting of indium sulfamate and indium chloride.

19. The combination as claimed in claim 18; wherein the electrolyte is a solution selected from the group consisting of potassium hydroxide and sodium hydroxide.

20. The combination as claimed in claim 19; further comprising a positive electrode having an active material comprised of a compound selected from the group consisting of silver oxide and manganese dioxide.

21. The combination as claimed in claim 18; further comprising a positive electrode having an active material comprised of a compound selected from the group consisting of silver oxide and manganese dioxide.

22. An alkaline primary battery without mercury comprising: an electrolyte comprised of a solution of sodium hydroxide and zinc oxide; a positive electrode; and a negative electrode having an active material comprised of mercuryless zinc powder; wherein the negative electrode contains one or more indium compounds forming a complex ion of indium selected from the group consisting of indium sulfamate and indium chloride.

* * * * *